(12) United States Patent
de Jong

(10) Patent No.: US 12,535,235 B2
(45) Date of Patent: Jan. 27, 2026

(54) APPARATUS, SYSTEM, AND METHOD FOR PREVENTING SPREAD OF AIR-BORNE CONTAMINANTS

(71) Applicant: AirTulip Inc., New York, NY (US)

(72) Inventor: Arjen de Jong, New York, NY (US)

(73) Assignee: AirTulip Inc., New York, NY (US)

( * ) Notice: Subject to any disclaimer, the term of this patent is extended or adjusted under 35 U.S.C. 154(b) by 457 days.

(21) Appl. No.: 18/077,748

(22) Filed: Dec. 8, 2022

(65) Prior Publication Data

US 2023/0109493 A1  Apr. 6, 2023

Related U.S. Application Data

(63) Continuation of application No. PCT/US2021/038009, filed on Jun. 18, 2021.

(60) Provisional application No. 63/041,027, filed on Jun. 18, 2020.

(51) Int. Cl.
| | |
|---|---|
| *F24F 8/80* | (2021.01) |
| *F24F 8/10* | (2021.01) |
| *F24F 8/22* | (2021.01) |
| *F24F 9/00* | (2006.01) |

(52) U.S. Cl.
CPC .............. *F24F 8/80* (2021.01); *F24F 8/10* (2021.01); *F24F 8/22* (2021.01); *F24F 9/00* (2013.01); *F24F 2009/007* (2013.01); *F24F 2221/38* (2013.01)

(58) Field of Classification Search
CPC ........ F24F 8/10; F24F 8/80; F24F 3/00; F24F 3/22; F24F 2009/007; F24F 2221/38
USPC ......................................................... 454/191
See application file for complete search history.

(56) References Cited

U.S. PATENT DOCUMENTS

| | | | | |
|---|---|---|---|---|
| 2,507,634 | A | * | 5/1950 | Hill ..................... F24F 13/0604 |
| | | | | 454/231 |
| 3,462,920 | A | * | 8/1969 | Denny .................... F24F 3/163 |
| | | | | 55/467 |
| 3,511,162 | A | * | 5/1970 | Truhan ...................... F24F 9/00 |
| | | | | 454/189 |

(Continued)

FOREIGN PATENT DOCUMENTS

| | | |
|---|---|---|
| CN | 204120614 U | 1/2015 |
| CN | 205994086 U | 3/2017 |

(Continued)

OTHER PUBLICATIONS

Pure Air Zone® Headboard; Retrieved from the Internet URL: https://pureairzone.se/ on Jul. 9, 2022.

(Continued)

*Primary Examiner* — Avinash A Savani
*Assistant Examiner* — Dana K Tighe
(74) *Attorney, Agent, or Firm* — Myers Wolin, LLC

(57) ABSTRACT

An apparatus is provided for preventing the spread of air-borne contaminants in a defined space. The apparatus comprises an air flow outlet adjacent to or within the defined space, an air flow inlet adjacent to or within the defined space, and a conduit for transporting air from the air flow inlet to the air flow outlet. An air treatment module is provided within or adjacent the conduit for extracting air-borne contaminants from air transported from the air flow inlet to the air flow outlet. The air flow outlet deposits air into the defined space substantially evenly across an outlet area.

22 Claims, 44 Drawing Sheets

(56) References Cited

U.S. PATENT DOCUMENTS

| | | |
|---|---|---|
| 3,776,121 A | 12/1973 | Truhan |
| 4,854,224 A * | 8/1989 | Hirayama ............. F24D 11/003 |
| | | 454/252 |
| 5,232,401 A * | 8/1993 | Fujita ................... F24F 13/068 |
| | | 454/187 |
| 5,312,465 A | 5/1994 | Riutta |
| 5,865,880 A | 2/1999 | Matsui |
| 6,261,332 B1 | 7/2001 | Richard |
| 6,869,458 B2 * | 3/2005 | Iijima ..................... F24F 3/163 |
| | | 55/318 |
| 8,122,540 B2 | 2/2012 | Ardis |
| 8,414,671 B2 | 4/2013 | Augustine et al. |
| 10,034,550 B2 | 7/2018 | Rydsund |
| 11,207,630 B2 * | 12/2021 | Sahiholnasab ....... B01D 46/444 |
| 2003/0033790 A1 | 2/2003 | Hague |
| 2004/0221554 A1 | 11/2004 | Iijima et al. |
| 2006/0199503 A1 | 9/2006 | Wang |
| 2009/0120047 A1 * | 5/2009 | Perrier ..................... A61L 9/22 |
| | | 422/186.04 |
| 2010/0003912 A1 * | 1/2010 | Jeng ........................ F24F 3/163 |
| | | 454/251 |
| 2019/0234645 A1 | 8/2019 | Haar |

FOREIGN PATENT DOCUMENTS

| | | |
|---|---|---|
| CN | 113662386 A | 11/2021 |
| DE | 102011002155 A1 | 10/2012 |
| JP | 2012002393 A | 1/2012 |

OTHER PUBLICATIONS

Pure Air Zone® Headboard; Retrieved from the Internet URL: https://www.youtube.com/watch?v=SFdz163WVr0 on Jul. 9, 2022.

International Search Report Issued by the USPTO for International Patent Application No. PCT/US2021/038009, mailed on Sep. 23, 2021.

* cited by examiner

APPARATUS, SYSTEM, AND METHOD FOR PREVENTING SPREAD OF AIR-BORNE CONTAMINANTS

CROSS-REFERENCE TO RELATED APPLICATIONS

This application is a continuation of International Application No. PCT/US2021/038009, filed Jun. 18, 2021, which takes priority from U.S. Provisional Patent Application No. 63/041,027, filed Jun. 18, 2020, the entire contents of each of which are incorporated herein by reference.

FIELD OF THE INVENTION

The invention relates to air ventilation and treatment systems.

BACKGROUND

In scenarios where undesirable airborne particles, or other airborne contaminants, exist, there is a risk that people might breathe those particles or contaminants. Various restrictions might be implemented and certain risks may be known. For example, with a contagion, such as the current COVID outbreak there may be restrictions related to the distance between people in various settings. Also, indoors there is an increased risk of spreading viruses and other airborne diseases. Contaminants may also include gasses or general poor quality air.

Modern ventilation systems typically operate by mixing air streams throughout the system. This however promotes the spread of Covid-19 virus either alone or in micro-droplets across a room or space. Further, while filtering may be incorporated into HVAC systems, filtering alone cannot control the origin of the air around a person, as there can be no certainty that the air being breathed at any given time or during any given interaction originated at the filter.

Also, single sided systems cannot protect both paths of spread, namely the risk of a specified person from becoming infected by a larger group of people in the space as well as the risk of the specified person from spreading an invention through the larger group of people.

Displacement-by-stratification ventilation exists, but such ventilation is typically up-flow and is imprecise, with a goal of creating a single striated air level adjacent a return. For instance, a ventilation system may use striation to move all heated air upwards so that it collects in an upper portion of a space and is then collected by a return. It is therefore difficult to control the entire flow path of air, including the origin, the path of air past surfaces, and the ultimate destination. Further, such systems typically need temperature stratification to stabilize the flow itself.

There is a need for ways to enable protection for subject and community by controlling the flow of air and treatment thereof.

SUMMARY

Embodiments compromise one or more flow control elements encompassing at least part of a space having an air treatment system, in which a zone of controlled and treated air is created around subjects.

In some embodiments, an apparatus is provided for preventing the spread of air-borne contaminants in a defined space. The apparatus comprises an air flow outlet adjacent to or within the defined space, an air flow inlet adjacent to or within the defined space, and a conduit for transporting air from the air flow inlet to the air flow outlet. An air treatment module is provided within or adjacent the conduit for extracting air-borne contaminants from air transported from the air flow inlet to the air flow outlet. The air flow outlet deposits air into the defined space substantially evenly across an outlet area.

In some embodiments, the air flow outlet and the air flow inlet are on or at opposite sides of the defined space, such that the air flow outlet deposits air into the space from a first side and the air flow inlet retrieves air from the space from a second side. The conduit then transports the air from the second side to the first side. In some such embodiments, the air flow outlet comprises a diffusor or plenum for evenly distributing the deposit of air across the outlet area.

In some embodiments, the first side of the defined space is a top of the defined space and the second side is a bottom of the defined space. In such embodiments, the diffusor or plenum may form an at least partial ceiling for the defined space. In some such embodiments, the partial ceiling may be angled towards adjacent sides of the defined space, such that at least a portion of the air is deposited in a lateral direction. The defined space may thereby include space not below the partial ceiling.

In some embodiments, the conduit may pass through the defined space forming a pillar supporting the air flow outlet.

In some embodiments, the second side is a tabletop or other functional surface.

In some embodiments, the air flow inlet is within the defined space and adjacent the second side.

In some embodiments, the air flow outlet and the air flow inlet are on or at a single side of the defined space, and air deposited by the air flow outlet follows a circuitous path from the air flow outlet to the air flow inlet. In some such embodiments, the air flow outlet and the air flow inlet are on or in a wall defining the single side of the defined space. The conduit may then be within the wall or within a slender return adjacent the wall.

In some such embodiments, the conduit is within a slender return and the slender return forms a wall-like structure.

In some embodiments, the apparatus further comprises a plurality of air flow inlets adjacent to or within the defined space, as well as a plurality of conduits. Each conduit then transports air from a corresponding air flow inlet to the air flow outlet.

In some such embodiments, the defined space may take the form of a substantially parallelepiped shape, and the plurality of air flow inlets are at lower corners of the shape and facing inward, and each of the plurality of conduits extends vertically along a corner of the shape.

In some embodiments, a majority of air flow drawn by the air flow inlet during use has been previously output by the air flow outlet.

In some embodiments, the defined space is not defined by a physical barrier. Alternatively, in some embodiments, the defined space is an enclosed space. In some such embodiments, the conduit is within a wall or adjacent the wall of the enclosed space.

In some embodiments, the air flow outlet comprises an inflatable plenum, and the plenum is inflated with air drawn from the conduit. A side of the plenum facing the defined space may then be at least partially permeable. In some such embodiments, the at least partially permeable side of the plenum is perforated.

In some embodiments having an inflatable plenum, the at least partially permeable side of the plenum is formed from a first semipermeable material, and a second side of the plenum opposite the first side when inflated is formed from a second material less permeable than the first material.

In some embodiments, the air treatment module comprises at least one air filter or a UV treatment lamp.

In some embodiments, the apparatus further comprises an air flow generator located within the conduit or within the air flow outlet for generating at least one of the air flow at the outlet and the air flow at the inlet.

In some embodiments, the air flow outlet deposits air into the defined space at a flow velocity of less than 0.5 m/s on average.

In some embodiments, the air flow outlet further comprises an internal space having guide vanes for directing air flow to different locations across the outlet area.

In some embodiments, the apparatus further comprises an edge extension for extending or isolating an edge of the defined space.

In some embodiments, an alternate apparatus is provided for preventing spread of air-borne contaminants in a defined space. The apparatus comprises an air flow outlet adjacent to or within the defined space, an air flow inlet adjacent to or within the defined space, and a conduit for transporting air from the air flow inlet to the air flow outlet.

The apparatus further comprises an air treatment module within or adjacent the conduit for extracting air-borne contaminants from air transported from the air flow inlet to the air flow outlet.

In such embodiments, the air flow inlet generates a suction force for drawing at least a portion of an air flow deposited into the defined space by the outlet.

In some such embodiments, the air flow outlet and the air flow inlet are on or at opposite sides of the defined space, such that the air flow outlet deposits air flow into the space from a first side and the air flow inlet retrieves air from the space from a second side, and the conduit transports the air from the second side to the first side.

In some such embodiments, the air flow outlet comprises a jet having a horizontal direction component and is located adjacent a top of the defined space. The air flow inlet draws the air flow from the jet downwards through the defined space.

In some such embodiments, the apparatus is located at a central location within the defined space, and the air flow outlet distributes the jet in a plurality of directions.

In some embodiments, the air flow outlet is positioned such that during use, the horizontal component of the jet is above the heads of people located within the defined space, and such that during use the air flow inlet is below the heads of people located within the defined space.

In some embodiments, the apparatus is located adjacent a first side of the defined space, and wherein the air flow outlet comprises a jet having a horizontal directional component and is located adjacent a top of the defined space at the first side, the horizontal directional component being in a first direction away from the first side of the defined space towards a center of the defined space, and wherein the air flow inlet is located adjacent a bottom of the defined space at the first side and draws the air flow from the jet downwards through the defined space.

In some embodiments, the air flow outlet comprises internal vanes for distributing the air flow to different locations within the air flow outlet.

BRIEF DESCRIPTION OF THE DRAWINGS

Some embodiments of the present invention are illustrated as an example but are not limited by the figures in the drawings, like references may indicate similar elements, and in which.

DETAILED DESCRIPTION OF THE PREFERRED EMBODIMENTS

Figure 1A:
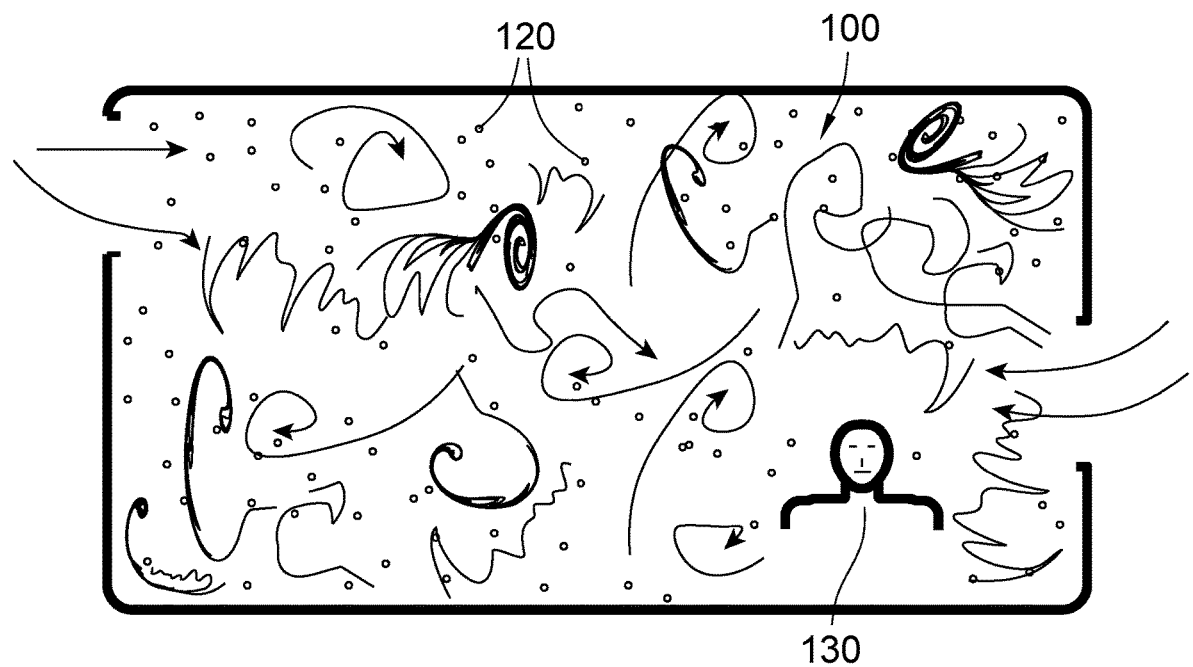
FIG. 1A shows airflow in a typical defined space without implementing any system or device to control flow.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 1B:
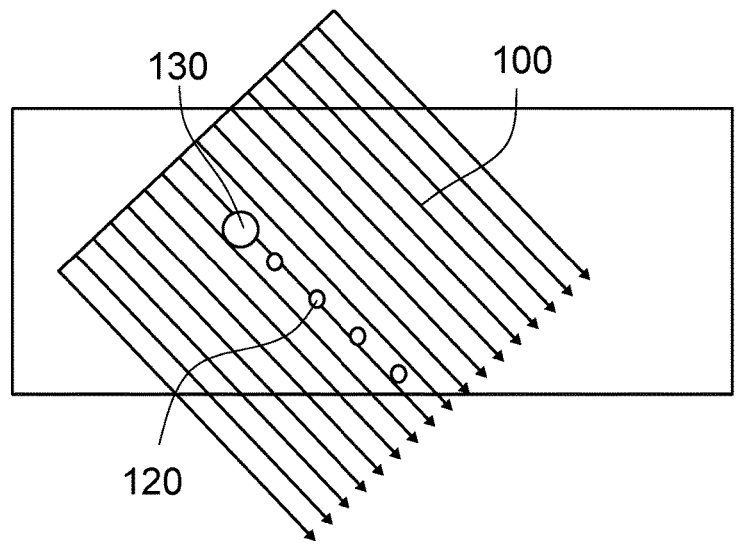
FIG. 1B shows airflow in the context of the device and system described herein.

FIG. 1A shows airflow in a typical defined space without implementing any system or device to control flow. FIG. 1B shows airflow in the context of the device and system described herein. As shown, with the system and device described herein implemented, airflow is predominantly displacement flow 100, while airflow is predominantly mixing flow 110 without any such system implemented.

Existing airflow typically mixes as shown in FIG. 1A, and by utilizing the systems and methods disclosed herein, the amount of mixing may be limited, thereby limiting and controlling spreading contaminants 120. This creates a controlled bubble or plug of flow or zone from a flow source towards a location of a user 130 in the context of the system discussed. As such, a defined space can have air that is constantly replaced by fresh air, thereby behaving like a moving reference frame. By controlling airflow in the defined space, the system and device can minimize the spread of any airborne contaminants by controlling the flow of such contaminants.

Figure 2:
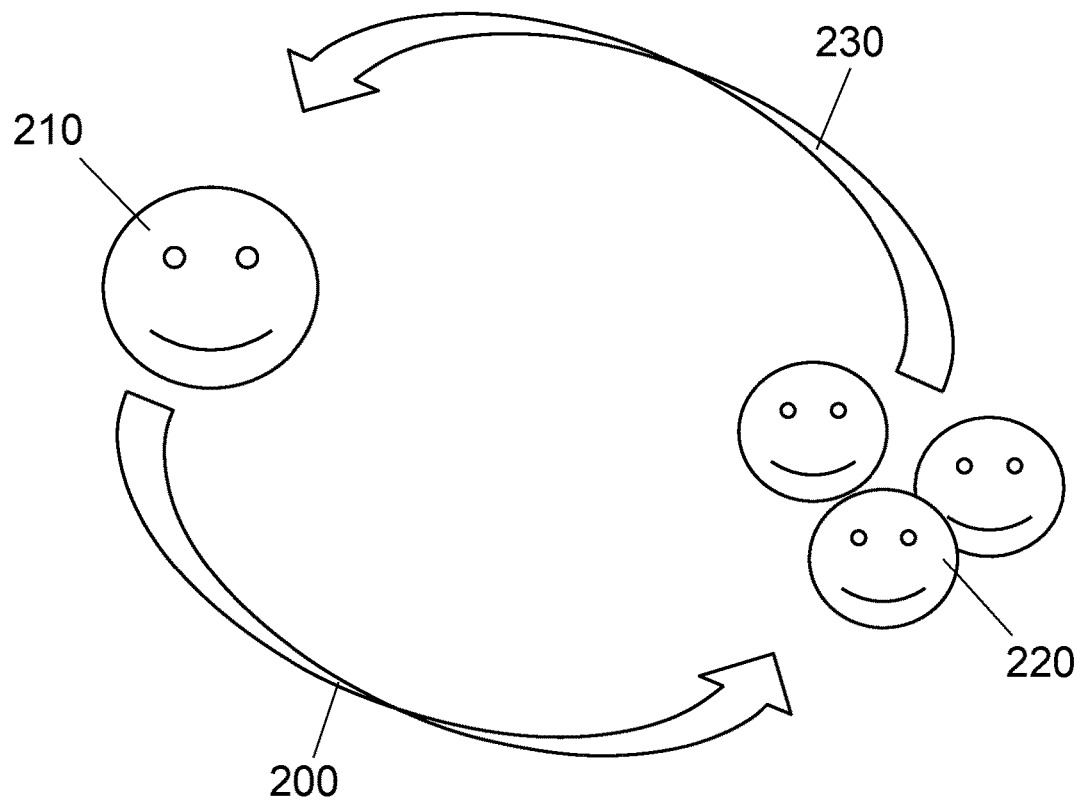
FIG. 2 shows schematically the protection provided by controlling airflow in a space.

FIG. 2 shows schematically the protection provided by controlling airflow in a space. As shown, without any such system or method provided, contaminants 200 can spread from the subject 210 to the local community 220 present in any given space. Similarly, contaminants 230 can spread from the community 220 towards the subject 210. Not shown is any additional shielding that the system and method may provide from other sources of contaminants, such as pollen, fungi, dust, vapors, gasses, and the like.

Figure 3A:
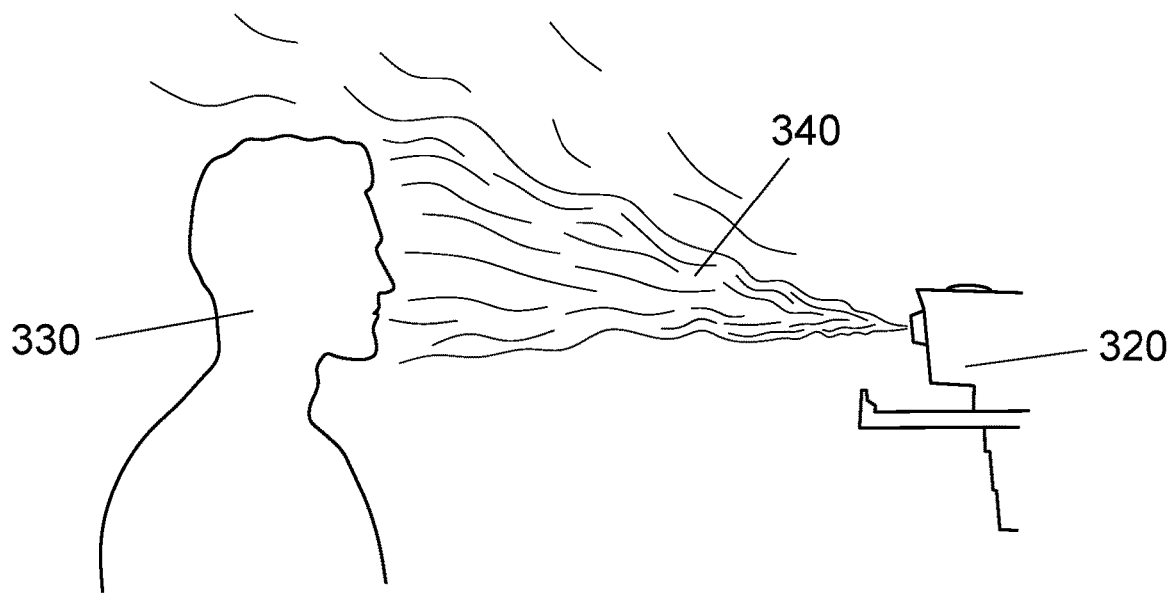
FIGS. 3A-3B show, schematically, the effect of the device and system described herein on airflow in a space.
Figure 3B:
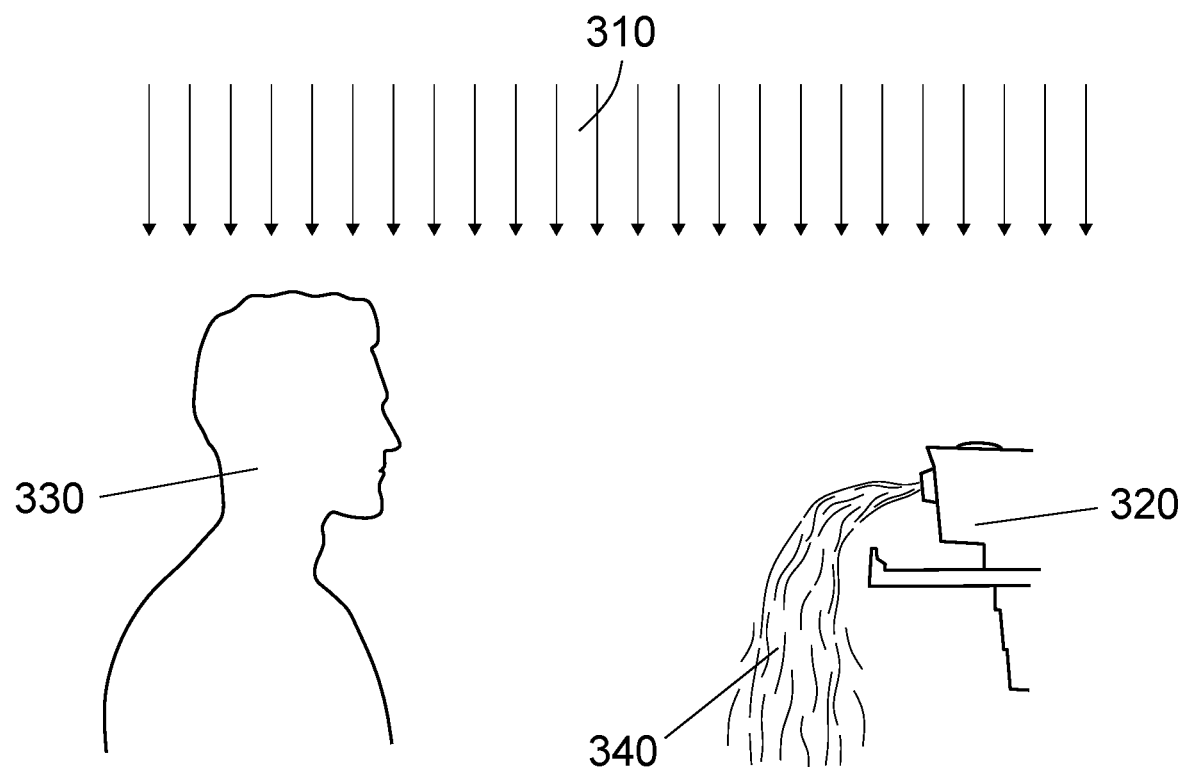

FIGS. 3A-3B show, schematically, the effect of the device and system described herein on airflow in a space. FIGS. 3A and 3B depict the effect of a typical embodiment of the apparatus and system described herein to show the principle of down-draft plug flow 310 created in a test prototype. In FIG. 3A, the system is inactive and in FIG. 3B the system is active. A particle generator 320 is blowing into the test persons face 330, in line with a Covid-19 patient, for example, releasing micro droplets. In the 'on' state, the mixing of the plume of particles 340 is displaced as a whole downwards away from the face of our test person. Note that the reach of the particle generator (still operating) is greatly reduced in FIG. 3B.

Figure 4A:
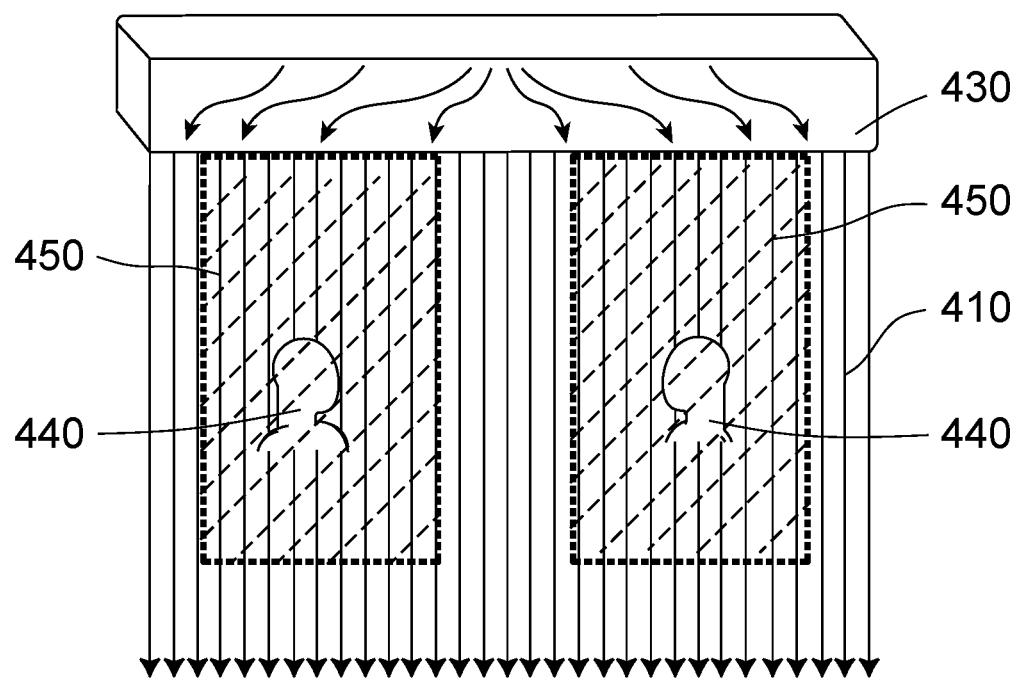
FIGS. 4A-4B show one embodiment of a system in accordance with this disclosure.
Figure 4B:
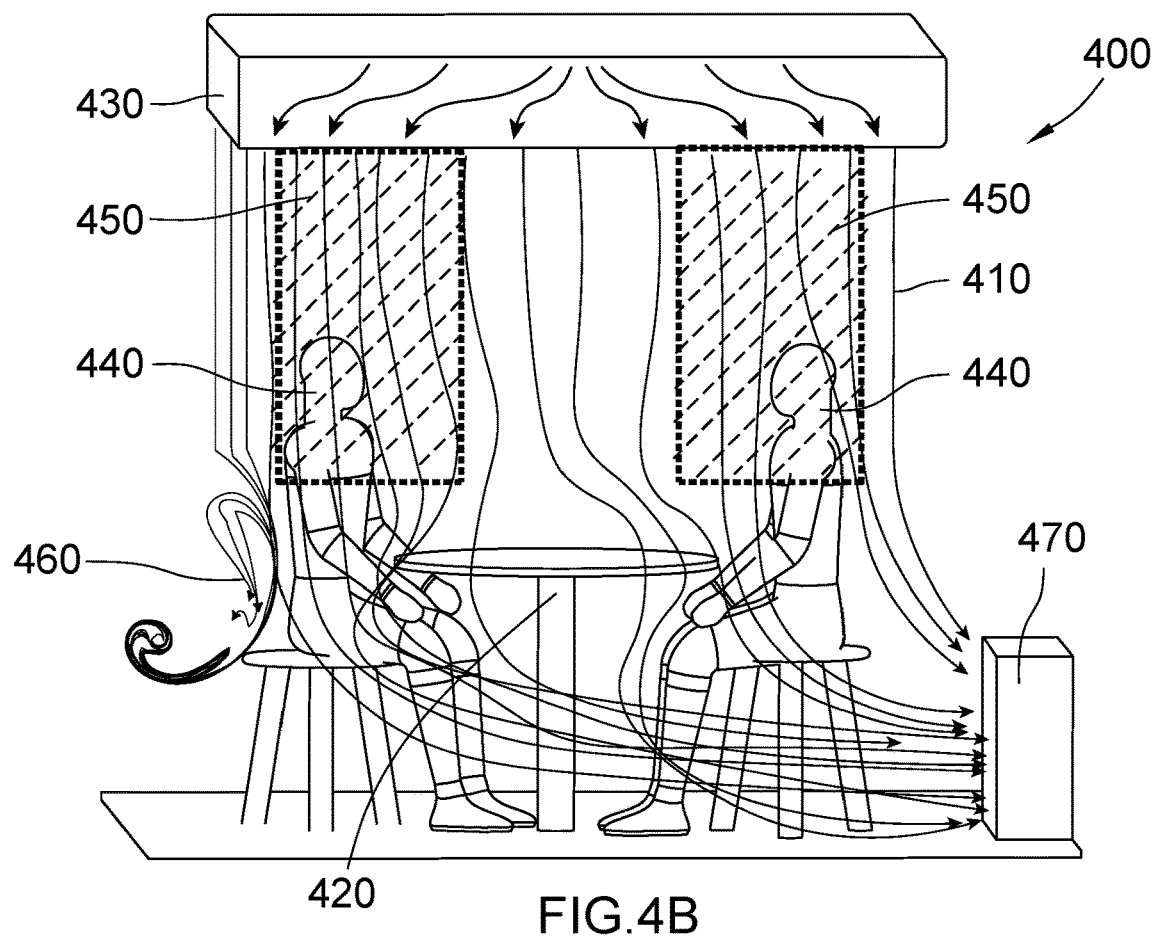

FIGS. 4A and 4B show one embodiment of a system 400 in accordance with this disclosure. FIGS. 4A and 4B show example flow direction in a dominantly down-draft direction 410. Due to less obstructions 420 between the flow source or diffusor 430 and subject or subjects 440, it is easier to create said protective zones 450 and minimize uncontrolled flow 460, particularly adjacent the faces of the subjects. In some embodiments of the system described herein, a substantial down-flow component is provided. The area above subject's heads 440 is relatively more free of obstructing elements, such as furniture 420 in the case of down-flow than in the case of up-flow. In combination with laminarization in many cases, this can create an air bubble 450 in which the flow is coming fresh from the flow source or diffusor 430 in a controlled way. The air may also be drawn by an air-inlet 470, as discussed in more detail below. Depending on the context in which the system 400 is to be used, a more horizontal cross-flow component can be introduced.

Figure 5A:
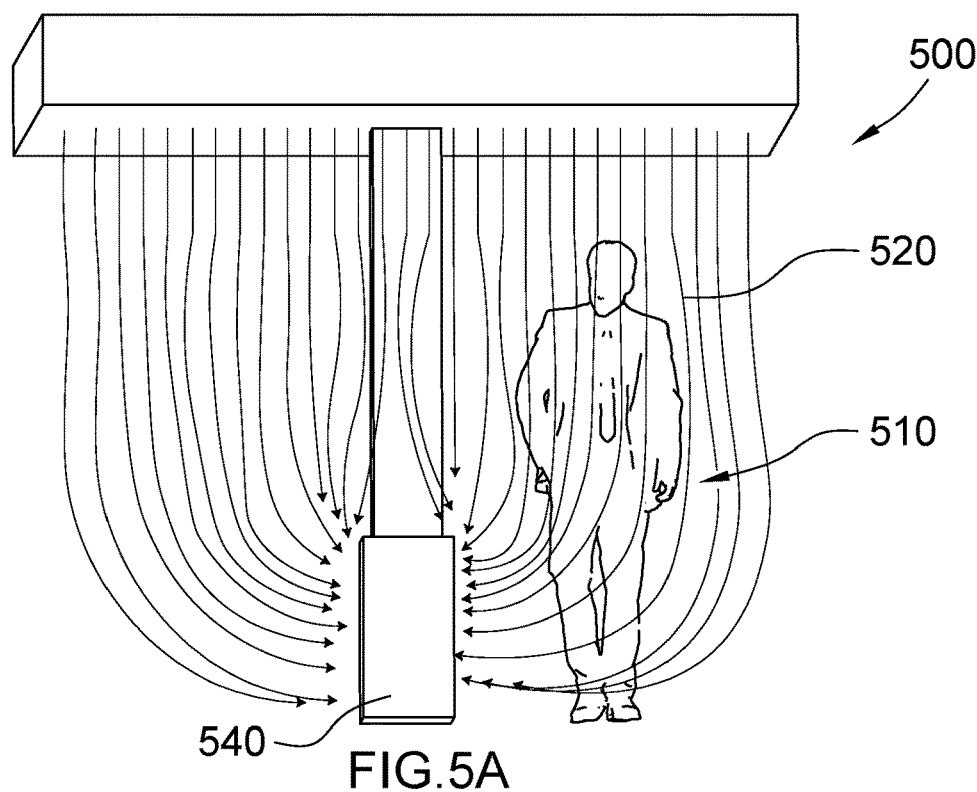
FIG. 5A-5C show airflow generated by embodiments of systems in accordance with this disclosure.
Figure 5B:
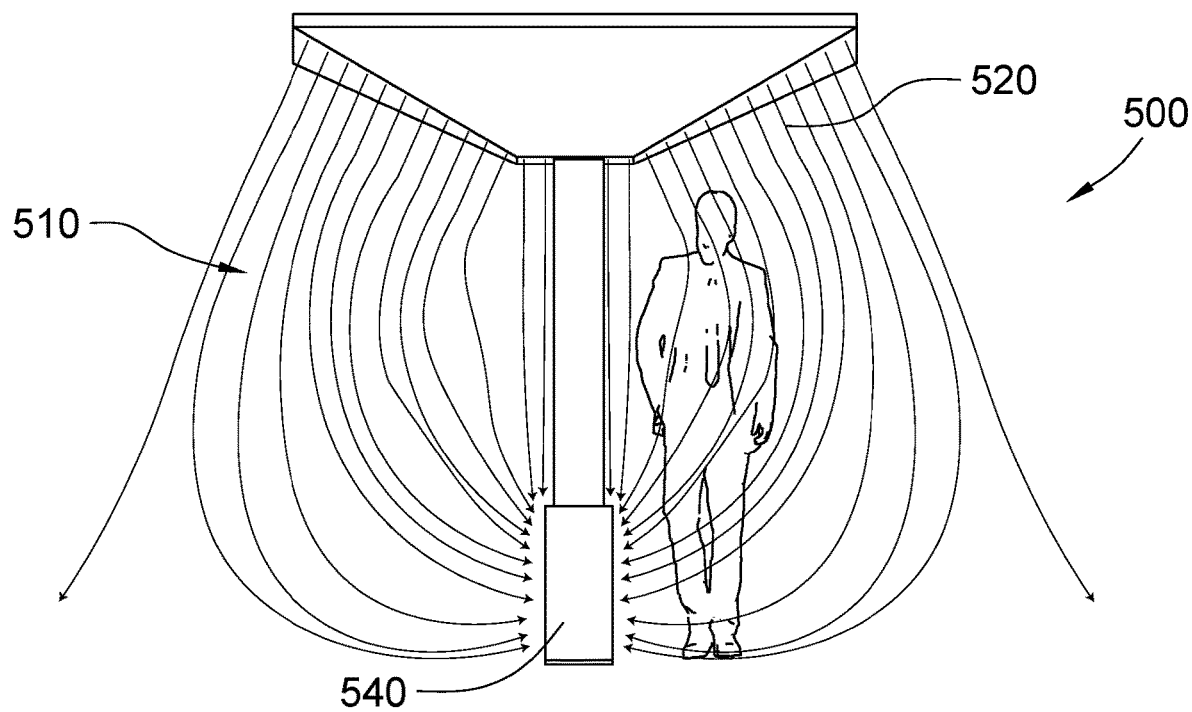
Figure 5C:
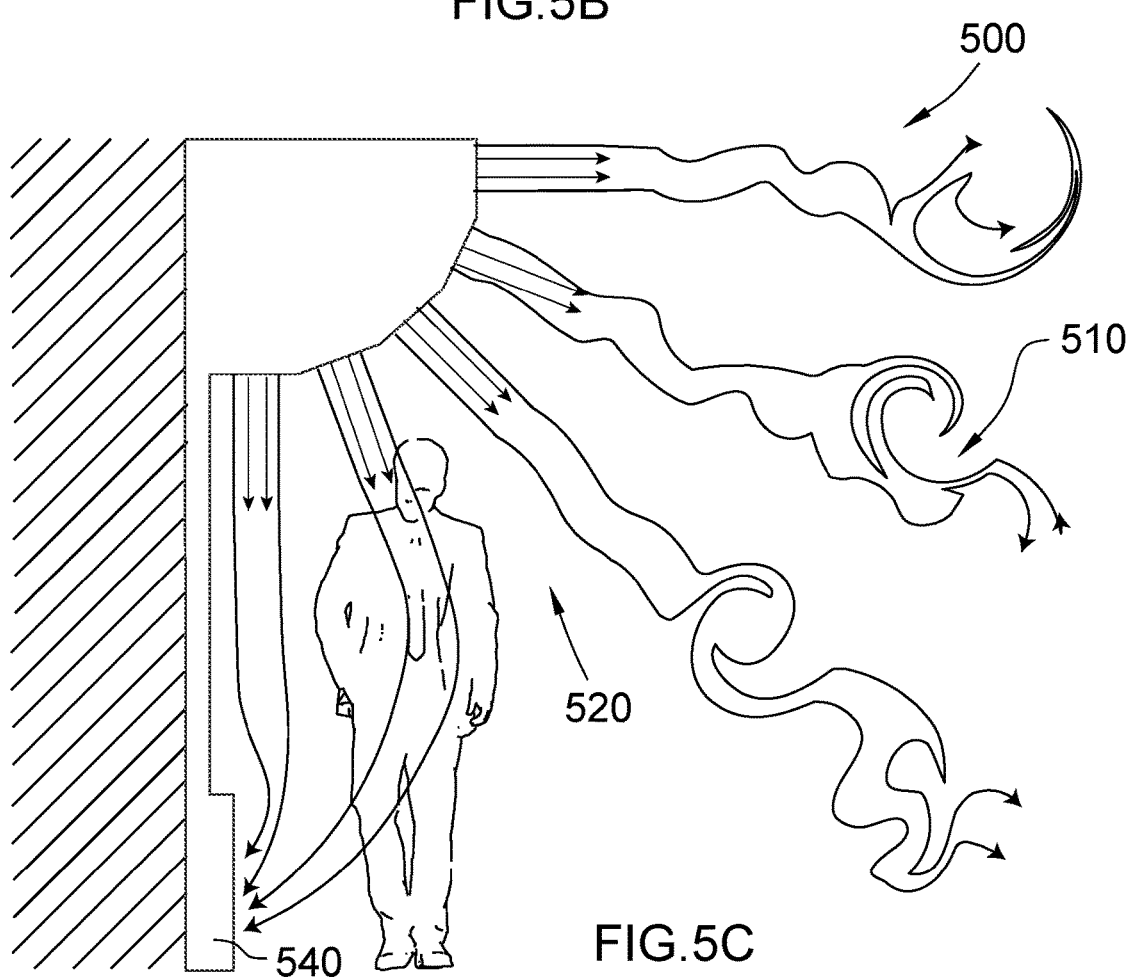

FIG. 5A-5C show airflow generated by embodiments of systems 500 in accordance with this disclosure. Such embodiments provide flow in a generally open environment 510, where care is taken to create said protective zones 520 and, in some embodiments, maximize the reach in an open environment. The boundary between the protective zone and environment can be a shear layer or mixing layer. A return collector 540, such as an air inlet, can be used for aiding in flow control.

Figure 6A:
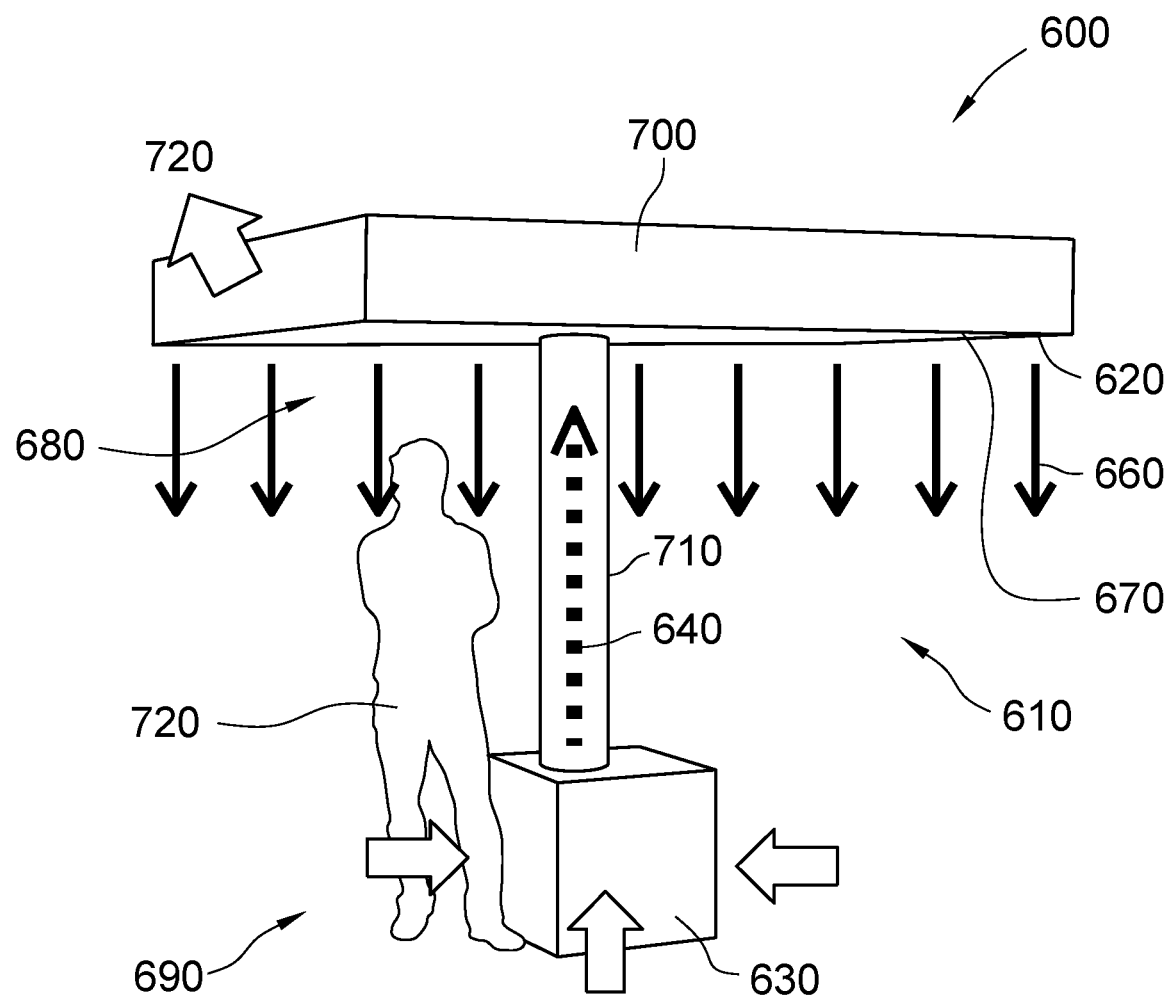
FIG. 6A shows a perspective view of a device in accordance with this disclosure.
Figure 6B:
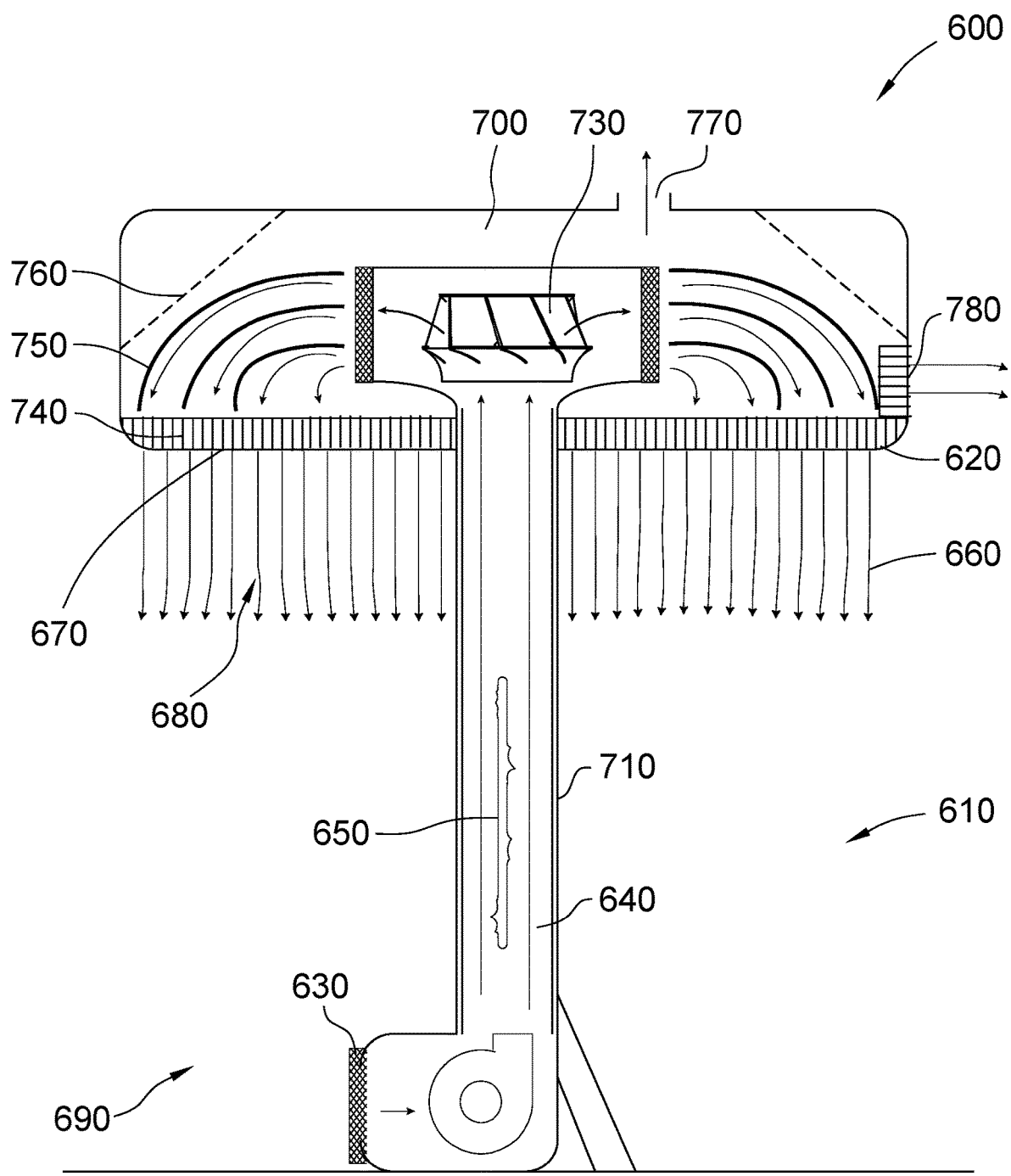
FIG. 6B-C show schematic views of certain components of the device of FIG. 6A.
Figure 6C:
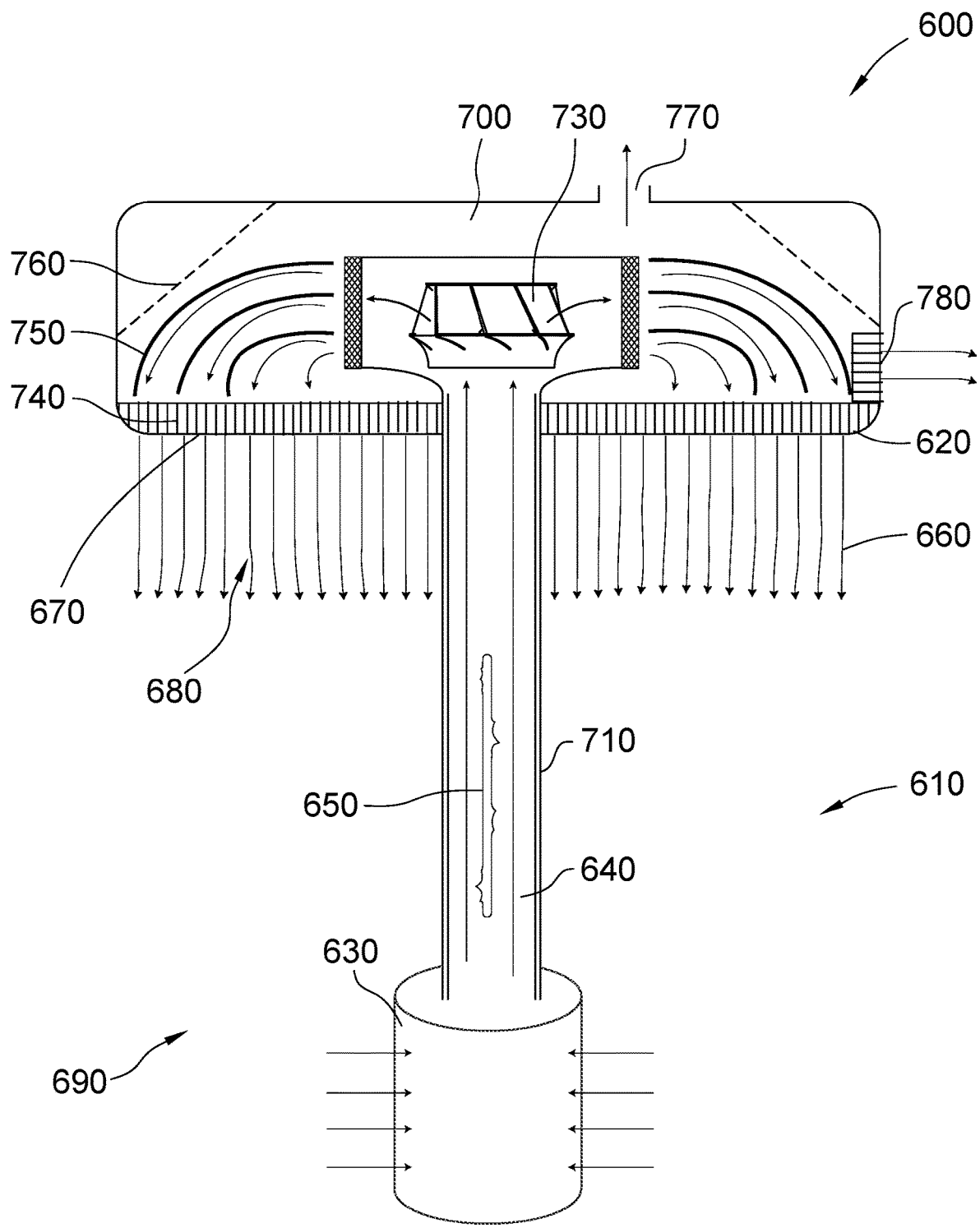

FIG. 6A shows a perspective view of a device 600 in accordance with this disclosure. FIGS. 6B and 6C schematically show a sectioned view of the device 600 of FIG. 6A.

As shown, the device 600 is for preventing spread of air-borne contaminants in a defined space 610. The device 600 comprises an air flow outlet 620 adjacent to or within the defined space 610 and an air flow inlet 630, sometimes referred to herein as a collector, adjacent to or within the defined space. The device 600 further comprises a conduit 640 extending from the air flow inlet 630 to the air flow outlet 620 and for transporting air from the inlet to the outlet.

Within or adjacent to the conduit 640, an air treatment module 650 is provided for extracting air-borne contaminants from air transported from the air flow inlet 630 to the air flow outlet 620.

During use, the air flow outlet 620 deposits air 660 into the defined space substantially evenly across an outlet area 670. As discussed in more detail below, the outlet area 670 may be a large defined area, as shown, and may comprise a diffuser, or it may be a narrower outlet. In some embodiments, as discussed in more detail below, a diffusor functioning as the air flow outlet 620 may be served by a plenum within the air flow outlet. As such, the plenum and/or diffusor section making up the air flow outlet 620 controls and distributes air flow as a source of flow into the defined space 610.

In additional embodiments, as discussed below, the air flow outlet outputs a jet of air, rather than outputting air through a diffusor or resistive element.

As shown, the air flow outlet 620 and the air flow inlet 630 may be provided on or at opposite sides of the defined space 610, such that the air flow outlet deposits air into the space from a first side 680 and the air flow inlet 630 retrieves air from the space from a second side 690. The conduit 640 then transports the air retrieved by the air flow inlet 630 from the second side 690 to the air flow outlet 620 to be deposited into the defined space 610 at the first side 680.

While transporting the air retrieved from the defined space from the second side 690 to the first side 680, the air is treated by the air treatment module 650. As shown, the air treatment module may be located within the conduit 640. Alternatively, as detailed below in reference to alternative embodiments, the air treatment module may take several forms and may be implemented in the conduit 640, in the air flow inlet 630, or in the air flow outlet 620. Accordingly, as shown and discussed in reference to FIGS. 27A-27F, the air treatment module 650 may be a filter applied at the air flow inlet 630. Similarly, as shown and discussed in reference to FIGS. 28A-28E, the air treatment module 650 may be a filter applied at the air flow outlet 620.

As shown, the air flow outlet 620 may be a diffusor, or other resistive element, for diffusing air across a large outlet area 670 and it may be served by an air flow outlet housing 700 forming a plenum. In this way, the air flow outlet 620 may deposit air evenly into a relatively large area at the first side 680 of the defined space 610.

The first side 680 of the defined space 610 may be a top of the defined space 610. As such, the air flow outlet 620, such as the diffusor shown, may form a ceiling for the defined space 610 where the air flow outlet 620 covers a large area. In some embodiments, the air flow outlet 620 may be at the top of the defined space 610, but may not cover the entirety of the space. In such embodiments, the air flow outlet 620 may be angled or otherwise configured to cover a larger area. Such embodiments are discussed in detail below, including, for example, in reference to FIG. 8A.

The air flow inlet 630 may be adjacent the second side 690 of the defined space 610, such that it is located within the defined space. In any event, where the first side 680 is the top of the defined space 610, the air flow outlet 620 is typically positioned to be located above the head of a person 720 located within the defined space. The air flow inlet 630 would then be located adjacent the second side 690 and within the defined space 610, but low enough such that any air breathed by the person 720 would be below a height of the air flow outlet 620 and above a height of the air flow inlet 630. Accordingly, in such embodiments, the air flow inlet 630 would be located consistently below the air flow outlet 620 such that air flow moves downwards from the outlet to the inlet.

This configuration results in a draft plug flow style of flow in the defined space 620, possibly with a down-draft or cross-draft component.

As shown, the conduit 640 may pass through the defined space 610. Where the first side 680 is a top of the defined space 610 and the second side 690 is a floor of the defined space, the conduit 640 may thereby be provided with a housing 710 taking the form of a column passing through the middle of the defined space. In such embodiments, the air flow outlet 620, along with associated components, such as a diffuser and/or plenum 700, may be supported by the housing 710 of the conduit 640. Accordingly, the conduit 640 and associated housing 710 may provide structural stability for the device 600 described herein. In some embodiments, such as those described below with respect to FIG. 24, additional structural support is provided to enhance the stability of the device.

Figure 22A:
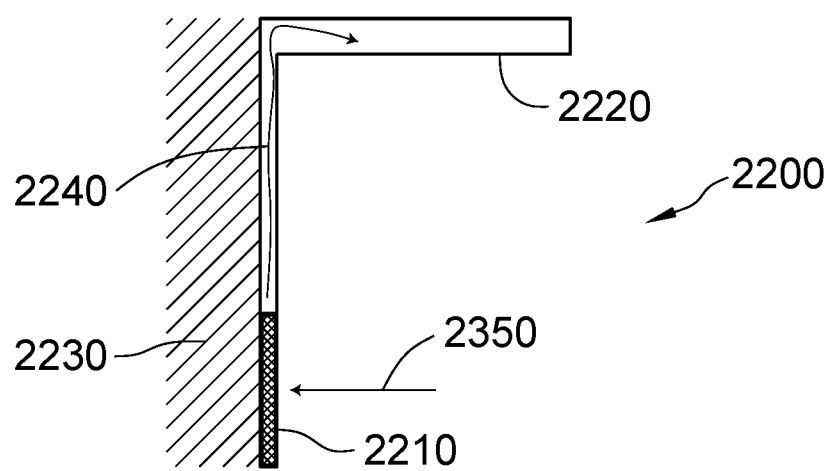
FIGS. 22A-22B show alternative embodiments of systems in accordance with the current disclosure.

As discussed in more detail below, the conduit 640 need not pass through the center of the defined space 610, but may instead be embedded into a wall of the space, as shown in FIG. 22A and others.

Further, while the embodiment shown in FIG. 6A shows the air flow outlet 620 functioning as a ceiling for the defined space and the air flow inlet 630 being adjacent a floor of the defined space, the air flow inlet 630 may instead be embedded into a table surface or the like. Such an approach is shown, for example, in FIGS. 21A and 21B, discussed in more detail below.

In some embodiments, the air flow within the defined space 610 is controlled by the air flow outlet 620 and the air flow inlet 630 such that a majority of air flow drawn by the air flow inlet during use originates at the air flow outlet 620. Similarly, in some embodiments, a majority of air flow deposited into the defined space 610 by the air flow outlet 620 may be drawn by the air flow inlet 630. In this way, the air may be consistently recirculated by way of the conduit 640 and cleaned by the air treatment module 650.

In some embodiments shown, such as that of FIG. 6A, the defined space 610 is not enclosed by or defined by a physical barrier. Instead, the defined space 610 is defined buy an envelope of air flow passing from the air flow outlet 620 to the air flow inlet 630.

Generally, the device shown 600 generates air flow that draws air from the air flow inlet 630, drives the air through the air flow conduit 640 and outputs the air flow at the air flow outlet 620. As such, one or more air flow generator 730, such as a fan and/or a motor, is typically provided. Such an air flow generator 730 may be provided in a base, adjacent the air flow inlet 630 as shown in FIG. 6B, or it may be provided in a plenum 660 as also shown in FIG. 6B. In some embodiments, an air flow generator 730 may be provided in the conduit 640 in addition to or in place of the air flow generators shown. Such air flow generators are discussed in more detail below in reference to FIGS. 26A-26D. As discussed below, the air flow generators 730 may be configured to deposit air into the defined space 610 from the air flow outlet 620 at a relatively low speed, such as less than 0.5 m/s.

Such an approach, including depositing air at a low speed, may provide a low turbulence air flow with lower flow speeds than usual over an area larger than usual in traditional ventilation configurations.

FIGS. 6B-6C show schematic views of certain components of the device of FIG. 6A. In typical embodiments, the air outlet 620, such as a diffusor, will output air flow and an air inlet 630 will retrieve that air flow. The flow of air from the diffusor 620 to the air inlet 630 thereby forms a controlled pocket of air in which any air that comes in contact with a person 720 is directed towards the air inlet 630 by the overall flow. As all air flow tends towards the air inlet 630, all such air can then be removed from circulation or filtered and returned to the diffusor 620 by one or more driving motors or fans 730. Typically, air flow is forcibly output from the diffusor 620 and suction is applied at the air flow inlet 630 continuously such that the flow of air is continuous during use.

The airflow is generated by typically a positive pressure in the diffusor/plenum 620 and negative pressure at the air flow inlet 630. All such flow is typically driven by one or more fans functioning as an air flow generator 730. Distribution in the plenum/diffusor 620 in which the air flow is controlled by eliminating high velocity peaks as to prevent mixing and jetting, laminarizing the flow and redistributed more evenly over the workable area and aligning the flow. This flow control can be done using various means including usage of materials with varying or variable flow resistance 740 and/or guide vanes 750 and/or flow straightening elements and/or shape control 760 and/or designed leakages 770 and/or distributed motors or fans 730. In some embodiments, the materials providing flow resistance may function as a filter. Many of these approaches and features are discussed in more detail below.

In some embodiments, various components of the device and system shown and discussed may be modular. In some embodiments, such as those discussed below in reference to FIGS. 18A-18F, among others, various side and top surface diffusors or edge control devices may be provided to control the air flow and define and maximize the effective zone of the device 600.

In some embodiments, such as those discussed below in reference to FIGS. 13-16, the plenum and diffusor components may be foldable, collapsible, modular, and/or inflatable.

In some embodiments, a designed leakage 770 may be provided to control leakage in the system and to aid in balancing the flow amount between the air flow inlet 630 and the air flow outlet 620. This could optimize the pick-up of flow between the diffusor 620 and the air flow inlet 630, and may be dynamically adjustable and/or set depending on environmental conditions.

Further, in some embodiments, portions of the airflow may be output in a horizontal direction from a secondary air flow output 780. This may be used to shape the defined space, and to expand it horizontally.

The diffusor flow can be designed to be below a detectable draft limit flow speed. The flow can be redistributed, straightened, laminarized, and directed in a more uniform way as to prevent mixing and uncontrolled flow around the subject. In a typical embodiment, flow resistance elements are used in combination with a driving pressure to redistribute the air. The air will find the way of least resistance and therefore equalize out where zones with less flow will be favored over zones with more flow. A material porosity at the micro (fabric) or macro (holes/slots) level can be used. Guide tubes and flow straighteners can be implemented to minimize vortices. These can be like open tube bundles of a certain length, or other means with more resistance in a direction not aligned with the main designed flow. Guide vanes and porous materials can also be used to help redistributing the flow inside the plenum volume as a means to aid in the redistribution done at the diffuser surface. Note that in case of using controlled resistance, the overall system pressure drop is increased in order to benefit from passive flow distribution properties. This extra pressure drop can be overcome by implementing larger, more or more aggressive motors and fans. Such a controlled resistance may function as an air filter, or a filter may be tuned for flow redistribution and resistance, as appropriate.

Figure 7A:
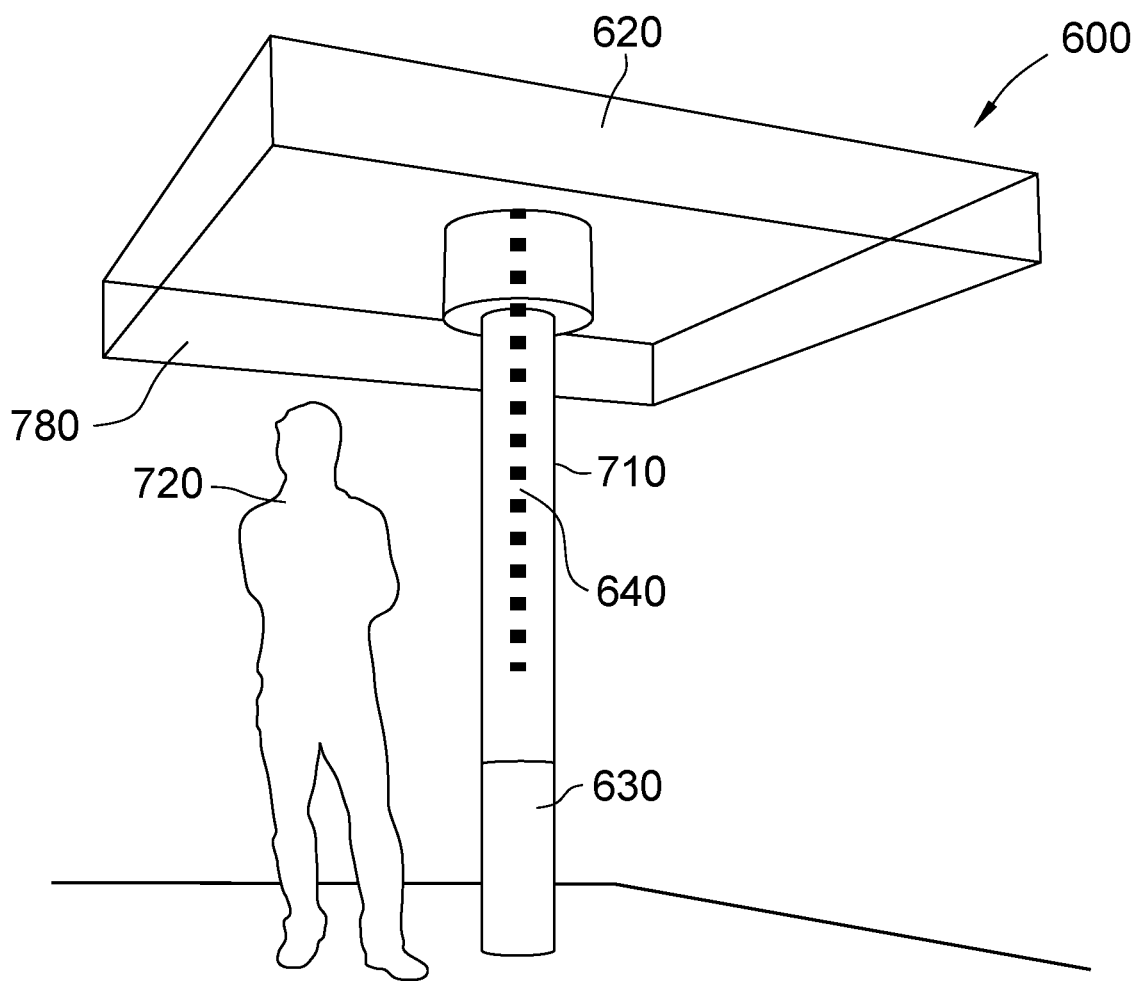
FIG. 7A shows a perspective view of a device in accordance with this disclosure.

FIG. 7A shows a perspective view of a device 600 in accordance with this disclosure. As shown, the device 600 shown is similar to that discussed above with respect to FIG. 6A and provides a plenum and diffusor section, shown schematically, which function as an air flow outlet 620. The plenum can be a volume used to control the air and redistribute airflows, and the diffusor element is used to (partly) laminarize the flow and/or distribute over a larger area. Accordingly, flow is controlled and, relative to standard HVAC implementations, mixing of the air flow is discouraged.

As shown in various figures, the shape and orientation of the diffusor can be made such that a larger area receives a controlled flow. FIG. 7A shows how the fact that typically no obstructions are above a subjects head enables a controlled 'air bubble' or air cylinder around the subjects 720 head. Accordingly, where no obstruction is located between the air flow outlet 620 and the subject 720, down flow, or having a downwards component (which may include some cross flow) aids in this control zone. This specific example embodiment shows an example embodiment where a square box shape 780 is used to serve the air flow outlet 620, and thereby distribute the flow from the source in a predominantly downwards direction. The lower panel containing the air flow outlet 620 here is semi-transparent, or semipermeable, to the flow allowing the creation of a controlled air flow. An air flow inlet 630 is located at the bottom of the pillar. Note that this specific example contains a transparent support structure comprising an air flow conduit 640 and a housing 710 which may include an air treatment module 650, which may include a UV-C light source, to deactivate any viruses, molds, and/or bacteria.

Figure 7B:
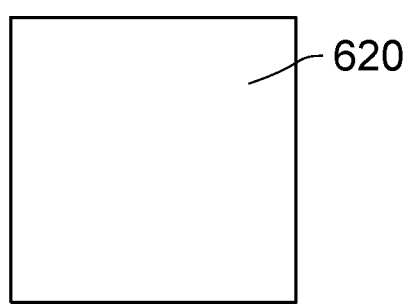
FIGS. 7B and 7C show potential shapes for a diffuser for us in the embodiment of FIG. 7A.
Figure 7C:
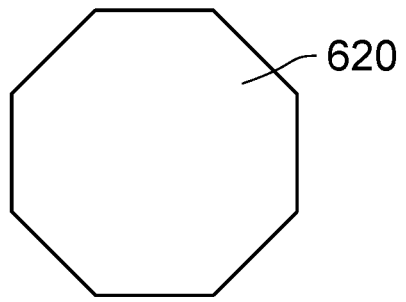

FIGS. 7B and 7C show potential shapes for a diffuser for us in the embodiment of FIG. 7A. The top view of the air flow outlet 620 may have a variety of projected shapes, with only limited examples shown here, and additional examples shown throughout this disclosure.

Figure 7D:
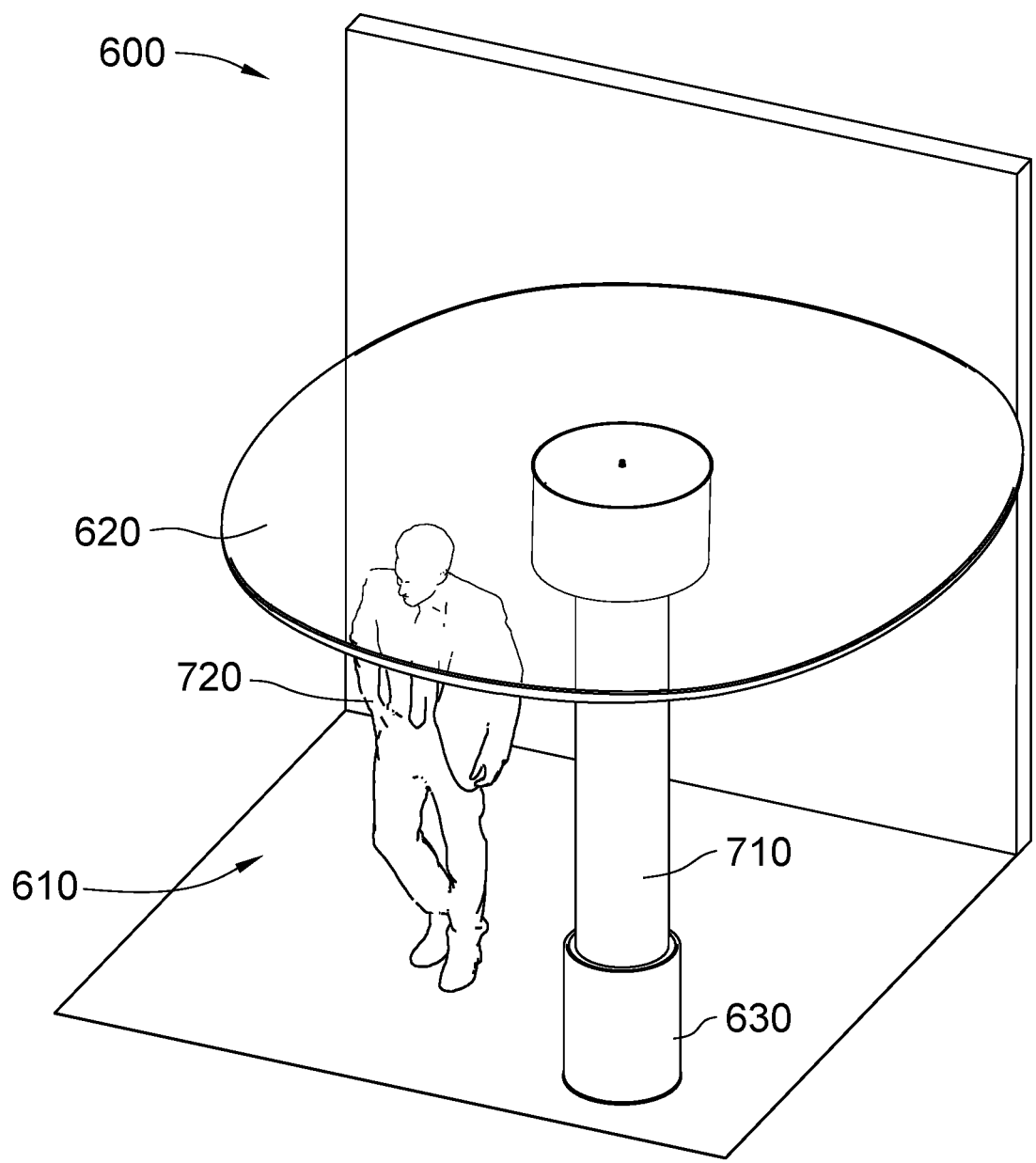
FIG. 7D shows a perspective view of a device in accordance with this disclosure.

As shown, and as illustrated further in FIG. 7D, a possible embodiment of the diffusor can be transparent. An example embodiment is using clear transparent plastics with holes to provide needed flow resistance. Also flexible transparent sheets can be encompassed, as well as structured elements that are either clear or diffuse in transmitting part of any light. Not depicted, light sources can be added to the device to illuminate the location, either from inside the diffuser and/or attached to its surface.

Figure 8A:
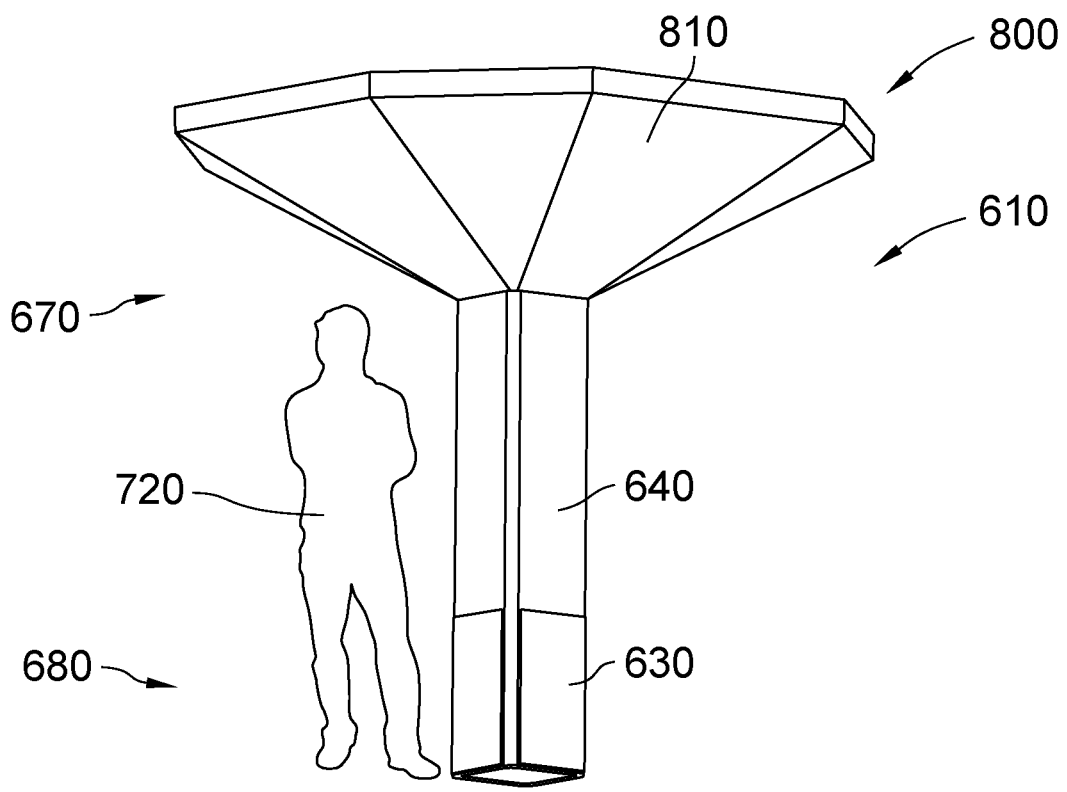
FIG. 8A shows a perspective view of a device in accordance with this disclosure.

FIG. 8A shows a perspective view of a device 800 in accordance with this disclosure. As shown, the device may include a diffusor 810, functioning as an air flow outlet, which may be angled relative to the horizontal plane. The device 800 shown is generally similar to the device 600 discussed above in reference to FIG. 6A, and only the differences between the two will be discussed herein at length. Components similar to those in the embodiment of FIG. 6A will be labeled with the same reference numerals.

Figure 8B:
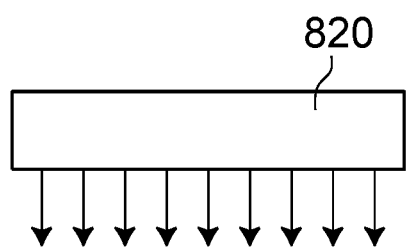
FIGS. 8B-8D show potential profile shapes for a diffuser for use in the embodiment of FIG. 8A.
Figure 8C:
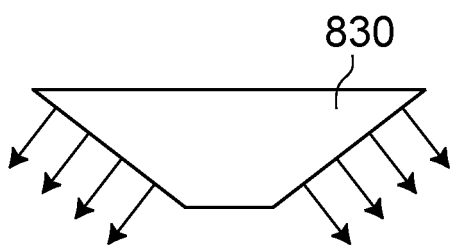
Figure 8D:
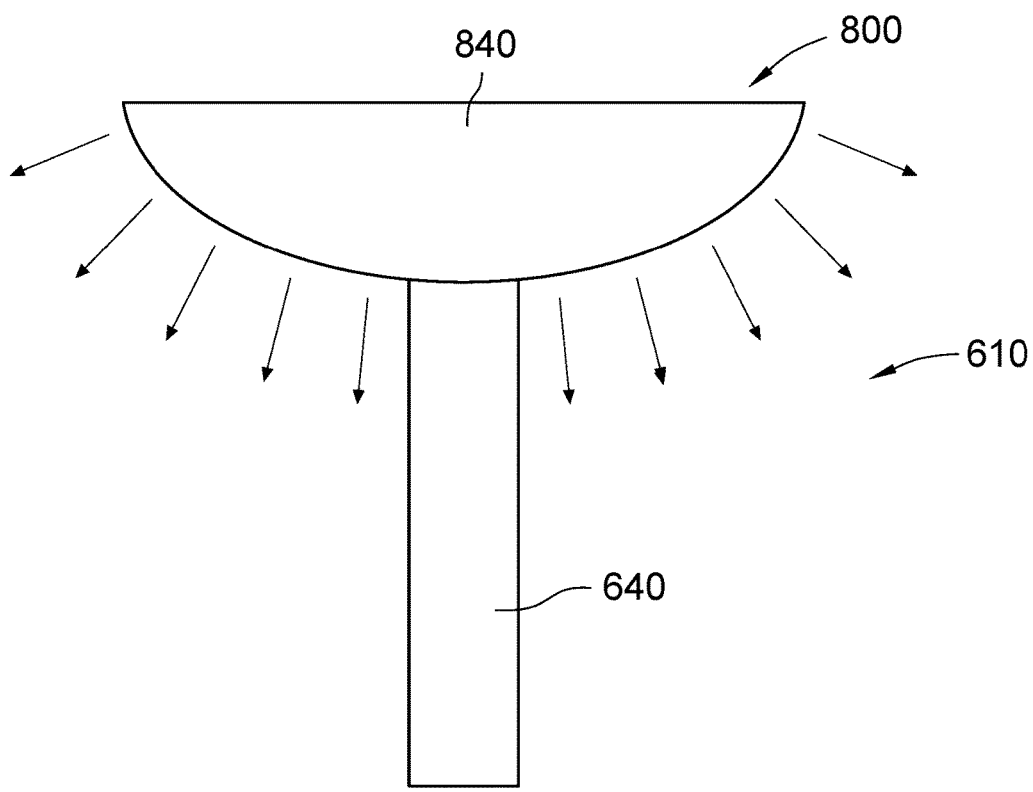

FIGS. 8B-8D show potential profile shapes for a diffuser 810 for use in the device 800 shown in the embodiment of FIG. 8A. As shown in FIG. 8B, the diffusor may have a consistent cross section, thereby creating a controlled pocket of air directly below the consistent cross section. This is shown in FIGS. 5A and 5B, for example. The embodiment shown in FIG. 8C shows a profile of the diffusor 810 shape provided in the device 800 of FIG. 8A.

As discussed above, in reference to the embodiment of FIG. 6A, in some embodiments, the first side 670 of the defined space 610 may be the top of the defined space, such that the diffusor or plenum acting as the air flow outlet 620 form a partial ceiling for the defined space. When the device 800 is provided with a consistent cross section 820, as shown in FIGS. 6A, 7A, and 8B, the air flow will proceed straight downwards, thereby forming a controlled air bubble around a subject 720 below the diffusor 810. As shown in FIG. 8C, in some embodiments, the partial ceiling formed by the air flow outlet, or diffusor 830 may be angled towards adjacent sides of the defined space 610, such that the defined space includes space not directly below the partial ceiling. This may be by providing a conical shape in the diffusor 830, or by a pyramid shape, such as that shown in FIG. 8A. Similarly, FIG. 8D shows a diffusor 840 having a semispherical shape, thereby being curved relative to the horizontal plane. This approach can widen the workable area acting as the defined area 610 or minimize the size of the device.

Figure 8E:
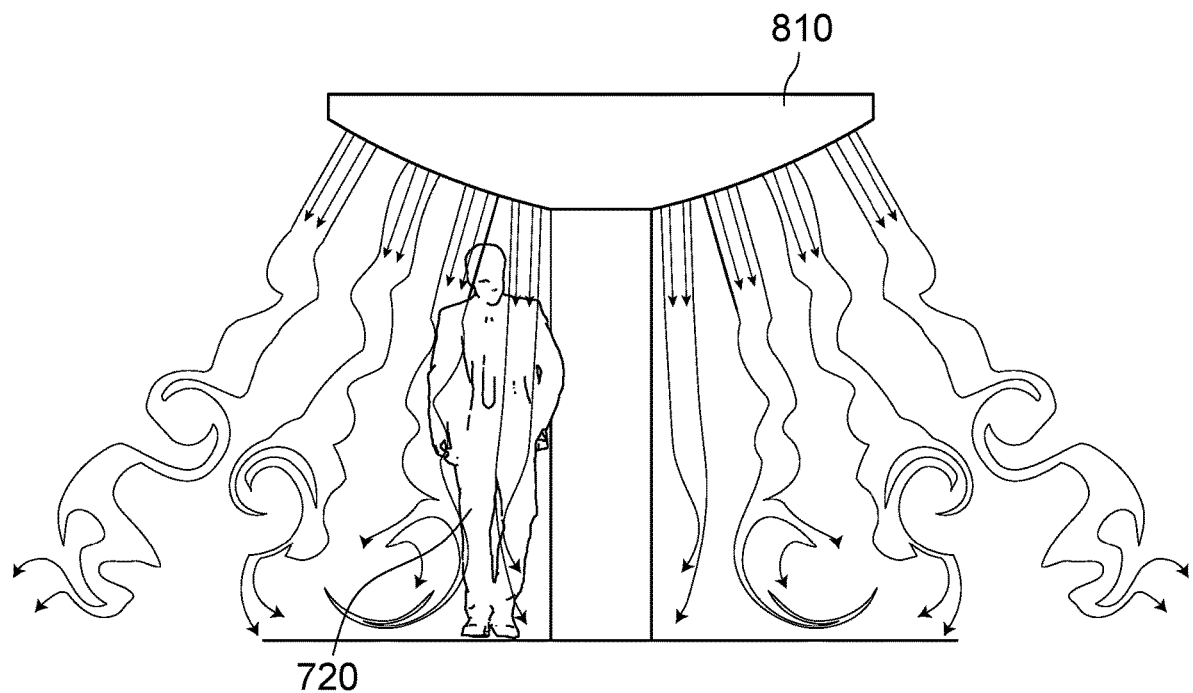
FIG. 8E shows air flow generated by the embodiment of FIG. 8A.

FIG. 8E shows air flow generated by diffusor 810 of the embodiment of FIG. 8A. As shown, the shaping of the diffusor 810 may be used to optimize the shear layer between the controlled flow and any entrained flow.

Figure 9A:
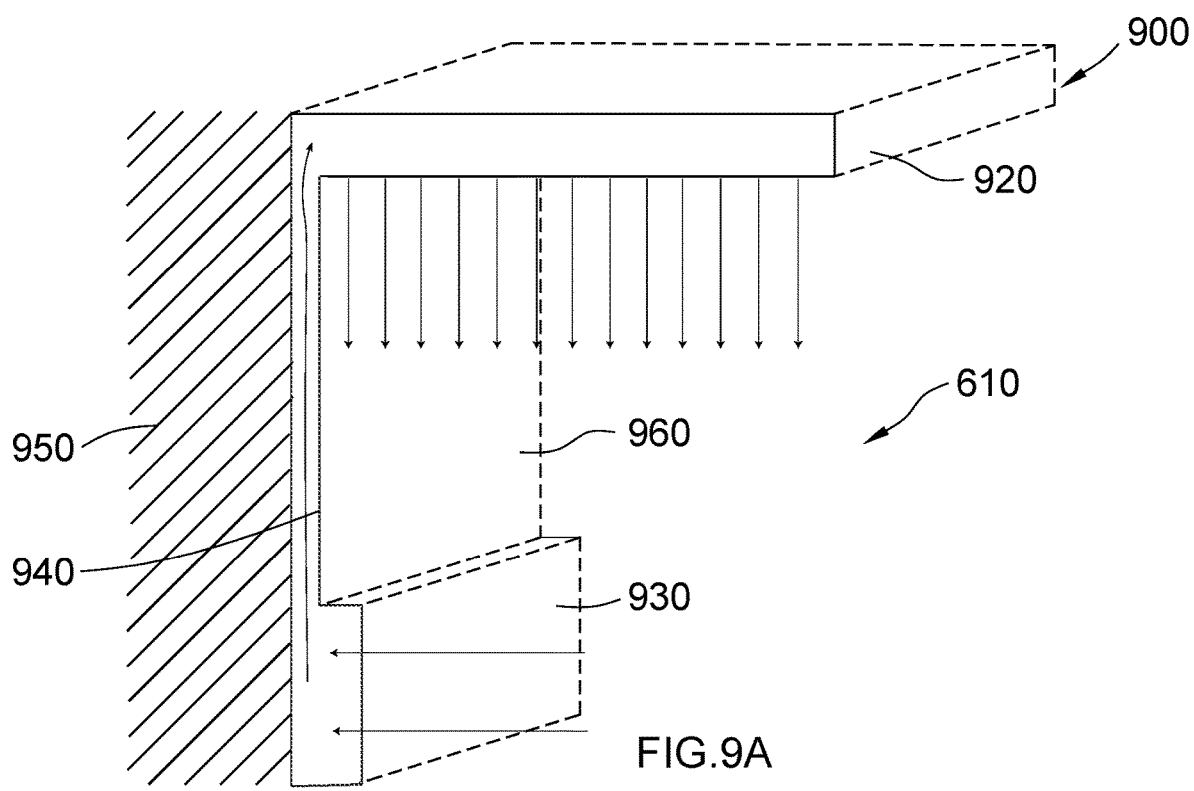
FIG. 9A-9C show embodiments of wall mounted systems in accordance with this disclosure as well as airflow generated by such systems.
Figure 9B:
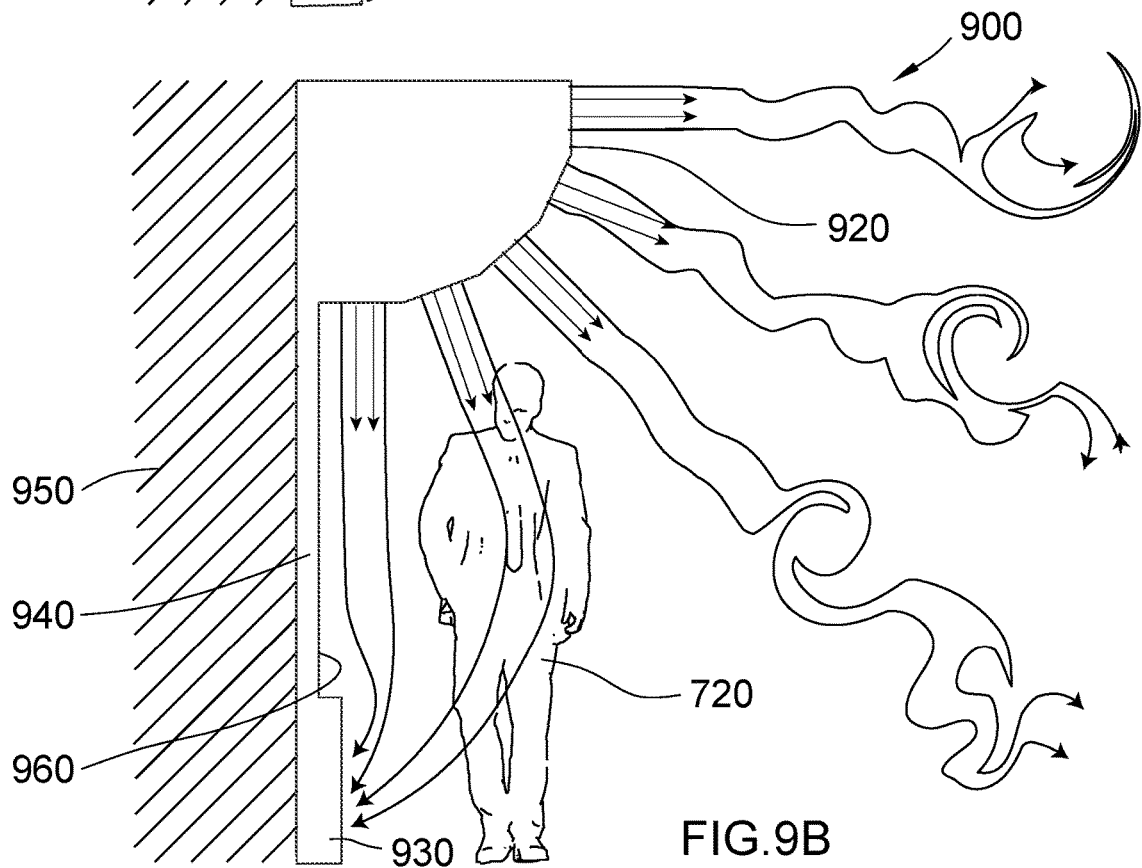
Figure 9C:
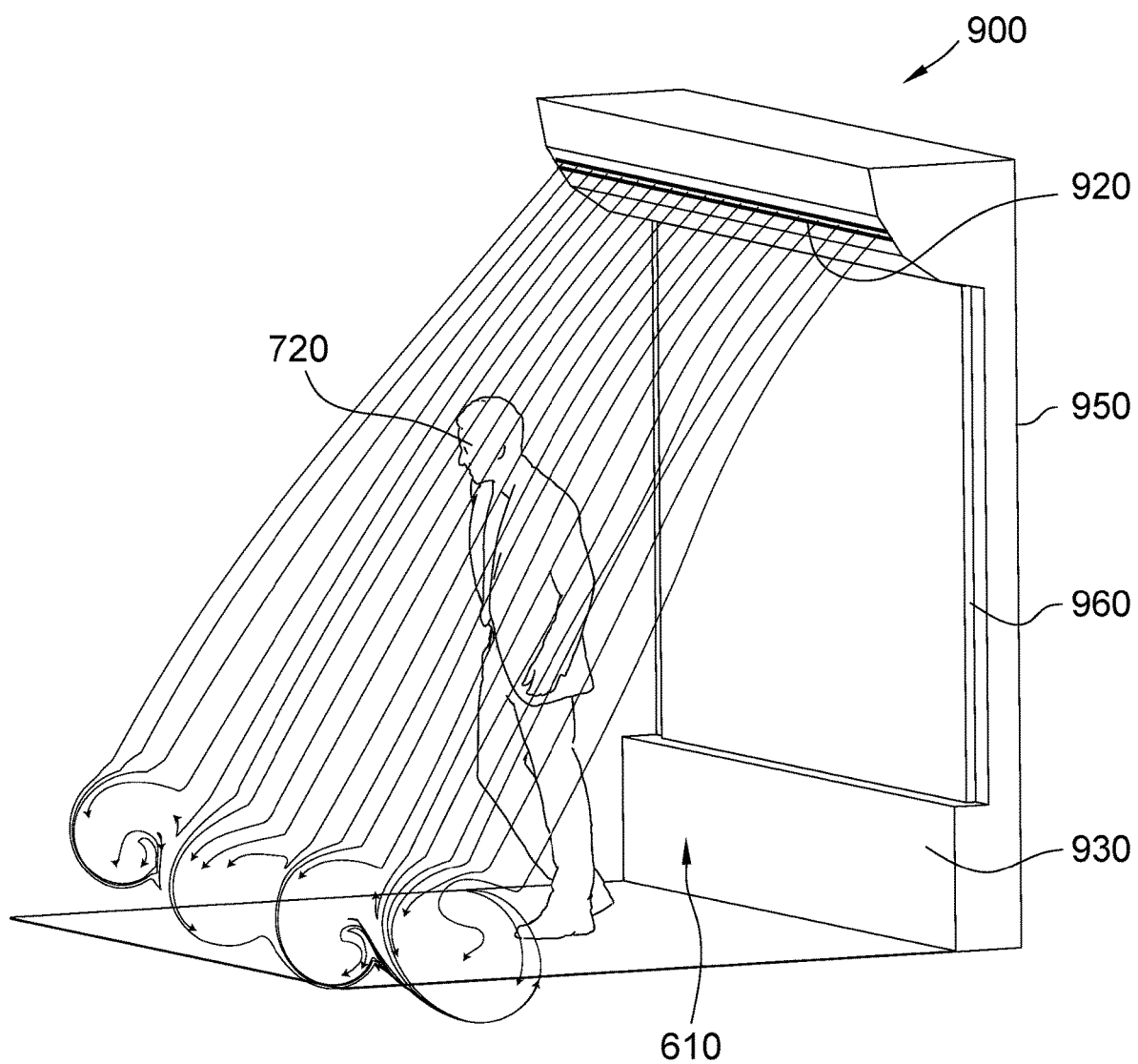

FIG. 9A-9C show embodiments of wall mounted systems 900 in accordance with this disclosure as well as airflow generated by such systems. As shown in FIG. 9A, the air flow outlet 920 and the air flow inlet 930 may be on adjacent sides of the defined space 610, or, as shown in FIGS. 9B-9C, they may be on the same side of the defined space. In such embodiments, air deposited into the defined space 610 by the air flow outlet 920 may follow a circuitous path from the air flow outlet to the air flow inlet 930.

Accordingly, where the air flow outlet 920 and the air flow inlet 930 are on a single side or on adjacent sides of the defined space, the air flow conduit 940 may be in a wall 950 defining that side, or it may be adjacent the wall 950 defining that side. Where the conduit is adjacent the wall, it may be within a slender return 960 that lies flat against the wall 950. As shown, the slender return 960 may be formed as a wall-like structure.

As shown in FIG. 9A, the air flow outlet 920 may be a diffusor that deposits air flow generally evenly below the diffusor, and the air flow may then flow downwards and towards the wall, thereby forming an air pocket below the air flow outlet 920.

Alternatively, as shown in FIGS. 9B-9C, the air flow outlet 920 may be angled away from the wall 950, such that air flow deposited into the defined space 610 initially moves away from the wall and then flows back towards the wall after following a longer more circuitous route. In some embodiments, a cross-flow blower may be implemented as well.

Figure 10A:
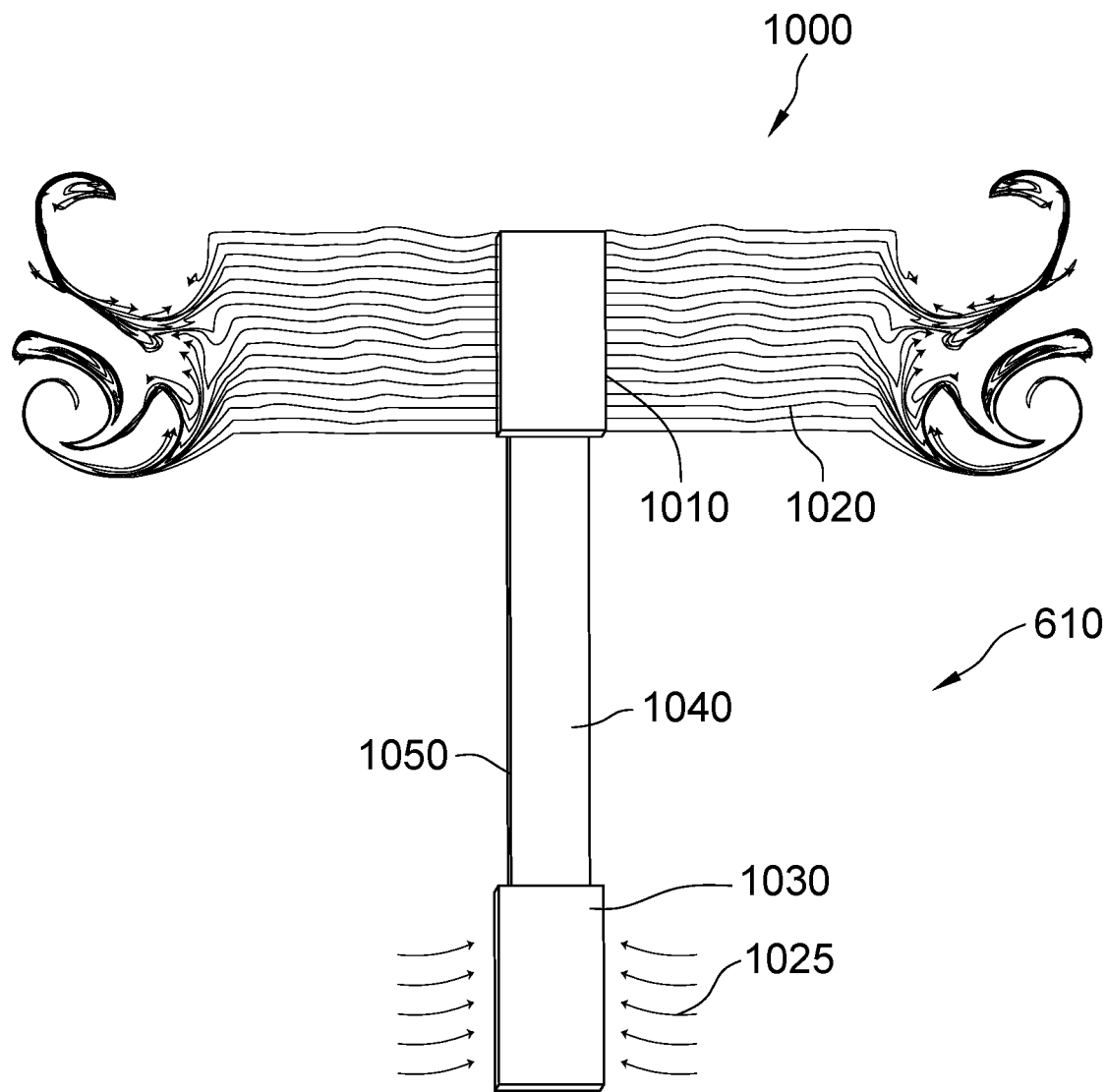
FIG. 10A shows a schematic diagram of airflow generated by an alternative embodiment of a device of the current disclosure.

FIG. 10A shows a schematic diagram of airflow generated by an alternative embodiment of a device 1000 of the current disclosure. As shown, the embodiment shown has an air flow outlet 1010 adjacent to or within the defined space 610 from which air flow 1020 is shown exiting schematically. An air flow inlet 1030 is provided adjacent to or within the defined space, and a conduit 1040 extends from the air flow inlet to the air flow outlet 1010. The conduit 1040 in the embodiment shown is incorporated into a conduit housing 1050 forming a pillar. Such a conduit 1040 is for transporting air from the air flow inlet 1030 to the air flow outlet 1010. As in the embodiments discussed above, an air treatment module 1040 is provided within or adjacent the conduit for extracting air-borne contaminants from air transported from the air flow inlet to the air flow outlet.

As shown schematically, the air flow inlet 1030 generates a suction force 1025 for drawing at least a portion of an air flow 1020 deposited into the defined space by the air flow outlet 1010.

In the embodiment shown, the air flow inlet 1030 and the air flow outlet 1010 are on or at opposite sides of the defined space 610. For example, the air flow outlet 1010 is at a top of the defined space 610 and the air flow inlet 1030 is at a bottom of the defined space. As such, the air flow outlet 1010 deposits air flow 1020 into the defined space from the first side, in this case the top, and the air flow inlet 1030 retrieves at least a portion of that air flow 1020 from the second side, in this case the bottom, of the defined space 610. The conduit 1040 then transports air from the air flow 1020 from the bottom of the defined space 610 to the top of the defined space.

Also, as shown, the device 1000 air flow outlet 1010 may deposit the air flow 1020 into the defined space in the form of a jet having a horizontal directional component. As shown, the direction of the air flow 1020 may be purely horizontal, or it may be angled, as discussed above with respect to diffuser embodiments or as discussed below with respect to additional embodiments. In such embodiments, the jet may be provided at the top of the defined space 610 as shown, and the air flow inlet 1030 may provide suction to draw the air flow 1020 from the jet downwards through the defined space. In such embodiments, the device 1000 may be centrally located within the defined space 610, such that the air flow 1020 may be distributed in multiple directions around the device.

FIGS. 10B-10E show perspective views of alternative embodiments of devices 1000 similar to that shown in FIG. 10A and in accordance with the current disclosure.

Figure 10B:
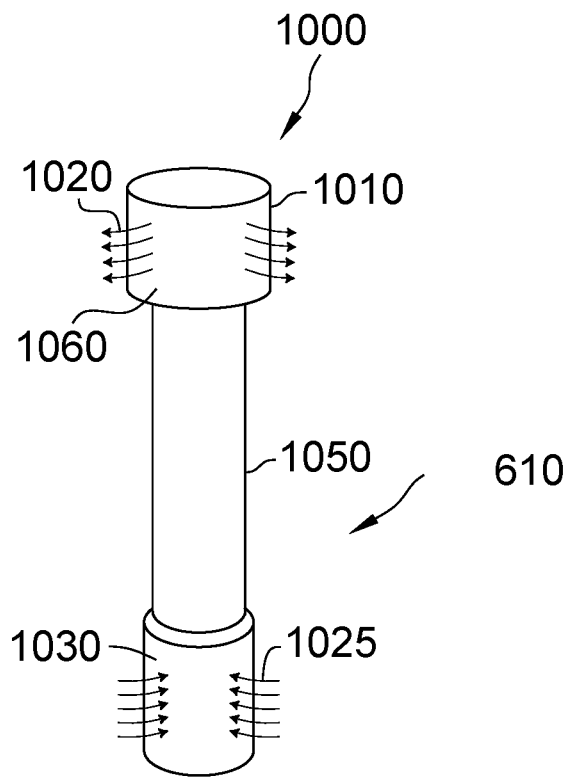
FIGS. 10B-10E show perspective views of alternative embodiments of devices in accordance with the current disclosure.

In all of the embodiments shown, a pillar like housing 1050 is provided for the conduit 1040, and the housing provides structural support for locating the air flow outlet 1010. In the embodiments shown, the air flow outlets 1010 are relatively small and have only a minimal air flow outlet area 1060 compared to those embodiments discussed above in reference to FIG. 6A, for example. In some such embodiments, the air flow outlet 1010 may be a diffuser, and in other embodiments, it may be a jet. Because the air flow outlet 1010 area 1060 is minimal, air flow 1020 may be directed horizontally, as shown in FIGS. 10A and 10B, or it may be directed at an angle relative to an axis of the pillar, as shown in FIGS. 10D and 10E.

Figure 10C:
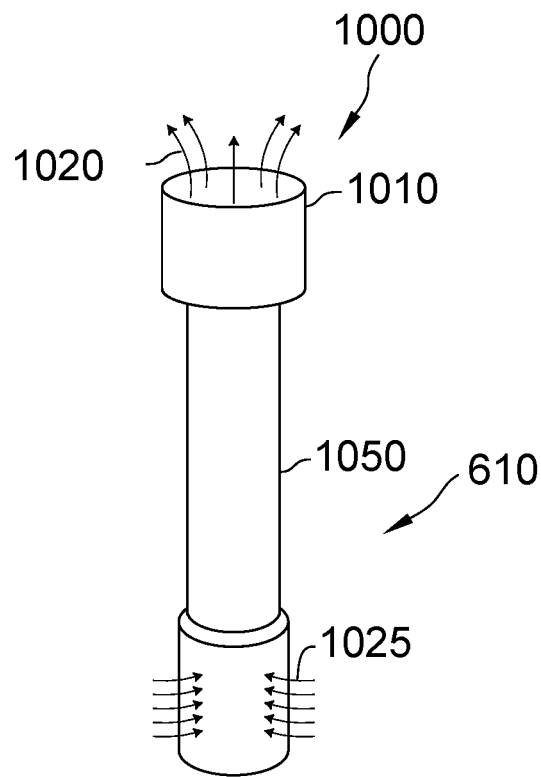
Figure 10D:
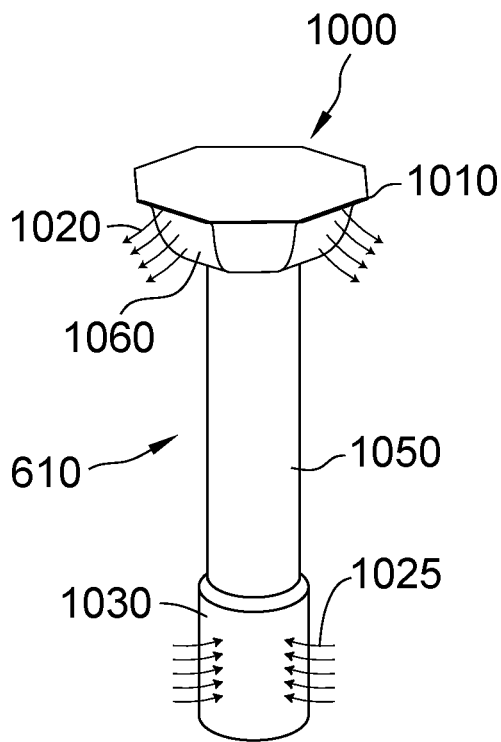
Figure 10E:
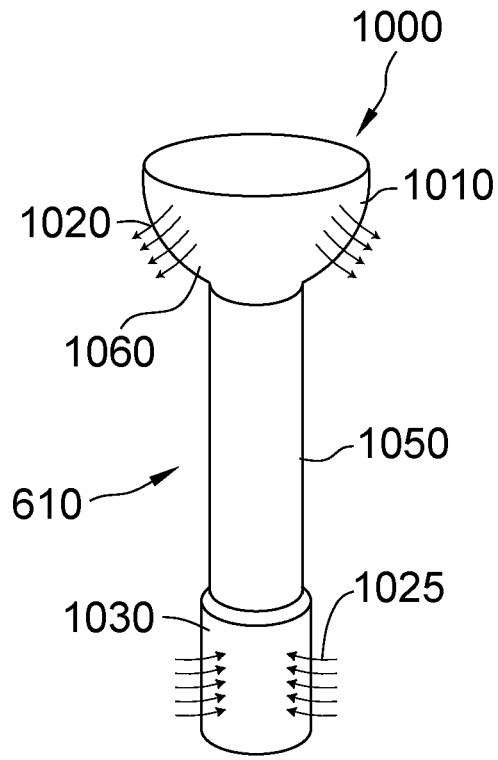

In some embodiments, as shown in FIG. 10C, the air flow outlet 1010 may be located within the defined area 610, near the top but not at the top of the area, and the air flow 1020 may be deposited vertically above the device 1000, such that it can be drawn back downwards around the device by the air flow inlet 1030.

Filter elements at the air flow outlet 1010 area 1060 and resistors, diffusers, or guides can aid in the flow distribution in some embodiments.

In the embodiments shown, the device 1000 relies on the air flow output from the outlet 1010 in combination with a suction effect generated by the air flow inlet 1030 to circulate air flow through the defined space 610 surrounding the device. Further, some embodiments, such as that shown in FIG. 10C, may allow for air to be output out of a top of the pillar like housing 1050.

Figure 10F:
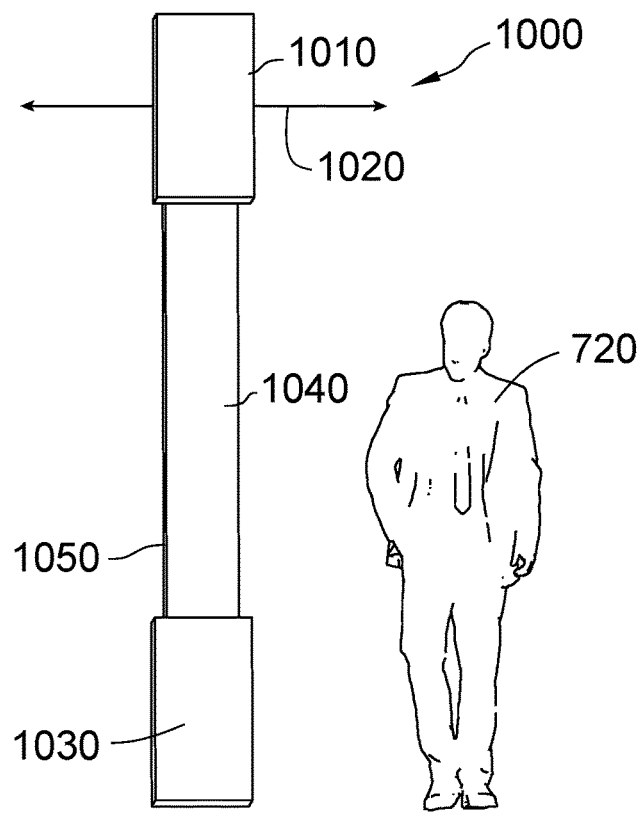
FIG. 10F shows a simplified version of the device of FIG. 10A, with much of the air flow illustration removed.

FIG. 10F shows a simplified version of the device 1000 of FIG. 10A, with much of the air flow 1020 illustration removed.

Figure 10G:
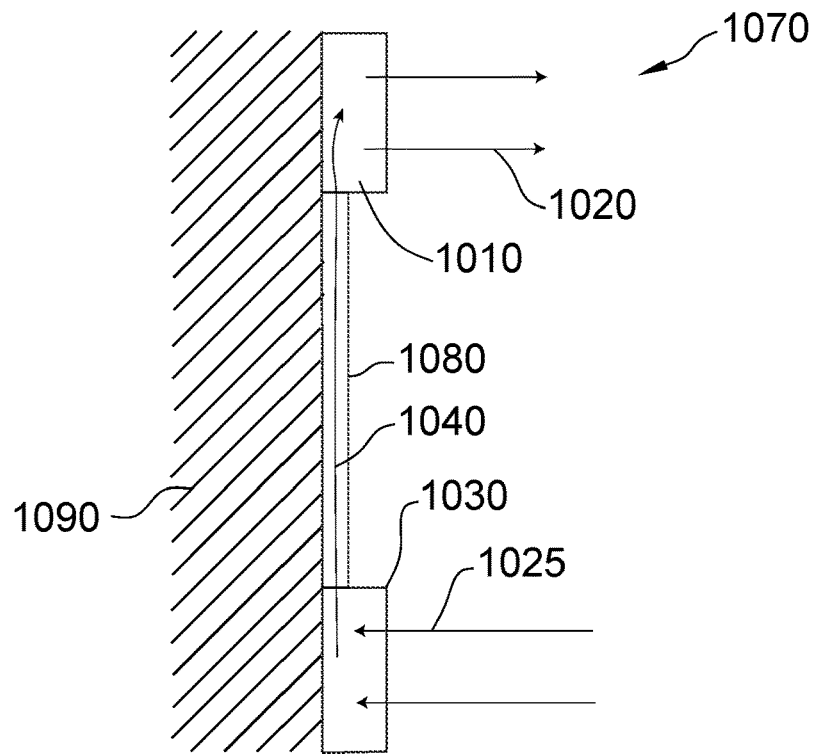
FIG. 10G shows a side mounted version of device in accordance with this disclosure.

FIG. 10G shows a side mounted version of device 1070 in accordance with this disclosure. As in the embodiment 1000 of FIG. 10A, the device 1070 has an air flow outlet 1010 adjacent to or within the defined space 610 from which air flow 1020 is shown exiting schematically. An air flow inlet 1030 is provided adjacent to or within the defined space, and a conduit 1040 extends from the air flow inlet to the air flow outlet 1010. The conduit 1040 in the embodiment shown is incorporated into a slender return 1080 adjacent a wall 1090 of the defined space 610. Such a conduit 1040 is for transporting air from the air flow inlet 1030 to the air flow outlet 1010. As in the embodiments discussed above, an air treatment module is provided within or adjacent the conduit 1040 for extracting air-borne contaminants from air transported from the air flow inlet to the air flow outlet.

As shown schematically, the air flow inlet 1030 generates a suction force 1025 for drawing at least a portion of an air flow 1020 deposited into the defined space by the air flow outlet 1010.

As shown, the device 1070 is located adjacent a side of the defined space 610, in this case against a wall 1090 of the space. The air flow outlet 1010 then comprises a jet having a horizontal directional component and is located adjacent a top of the defined space 610 at the first side. The horizontal direction is away from the first side, in this case the wall 1090, and is towards a center of the defined space 610. The air flow inlet 1030 is then located adjacent a bottom of the defined space 610, but still against the same first side, and the air flow inlet applies suction 1025 to draw the air flow 1020 from the jet downwards through the defined space 610.

In some of the embodiments shown, vanes may be provided within the air flow outlet 1010 in order to direct flow prior to outputting the flow in the form of jets, or across diffusers or other air flow outlets having a reduced space.

Figure 11:
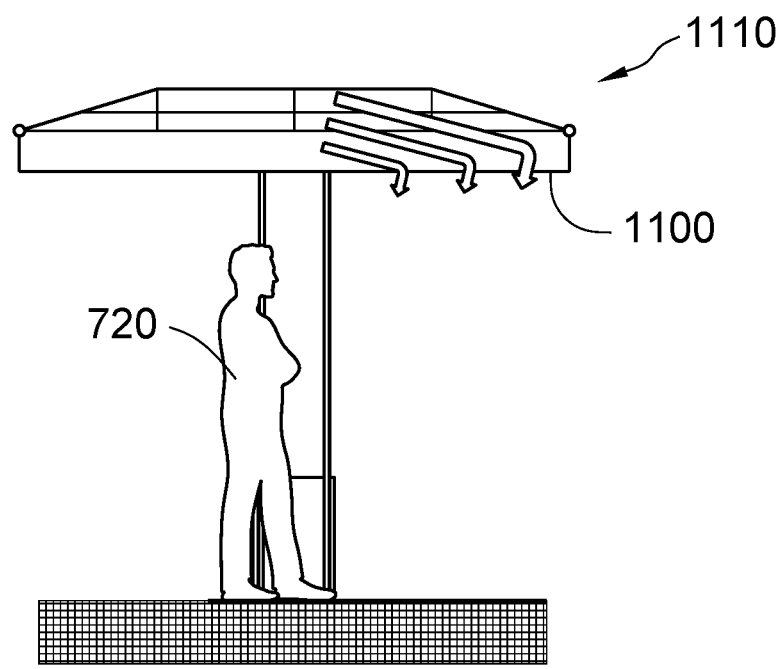
FIG. 11 shows a tapering profile of a diffusor in accordance with the current disclosure.

FIG. 11 shows a tapering profile of a diffusor 1100 in accordance with the current disclosure. Such tapering can be decided as a function of the amount of crossflow in a plenum 1110 to the location. The tapering can thereby optimize the flow distribution.

Figure 12A:
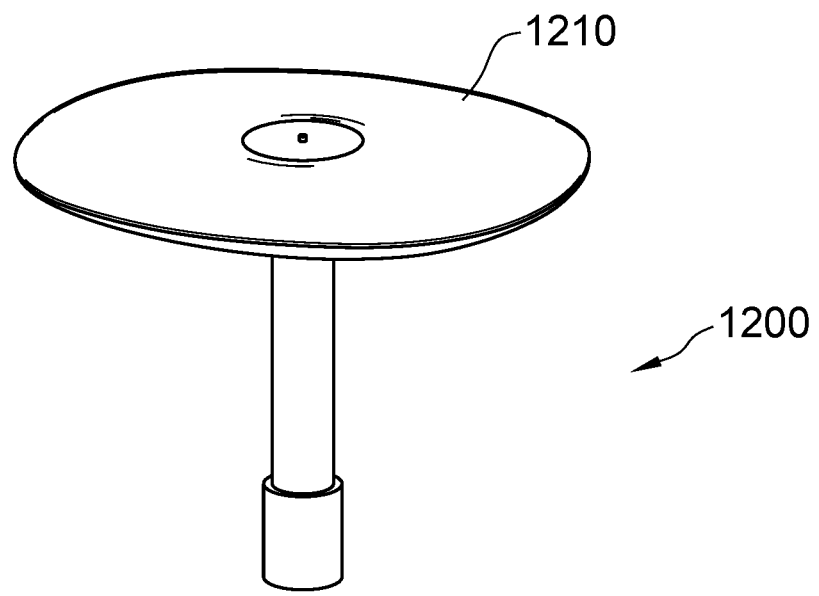
FIGS. 12A and 12B show perspective and side profile views of an alternative diffusor shape for use in systems and devices in accordance with this disclosure.
Figure 12B:
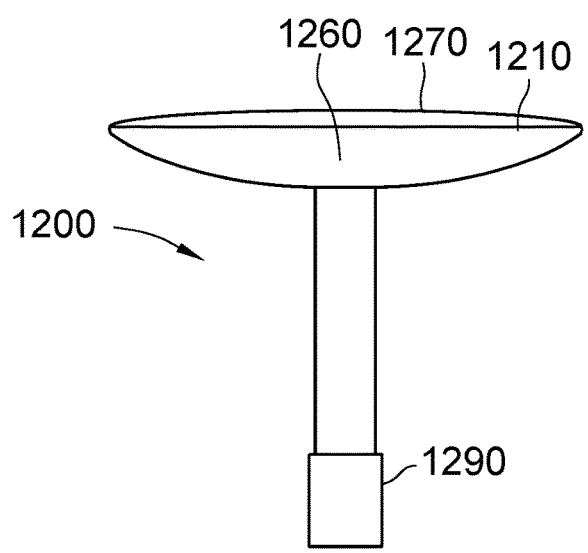
Figure 12C:
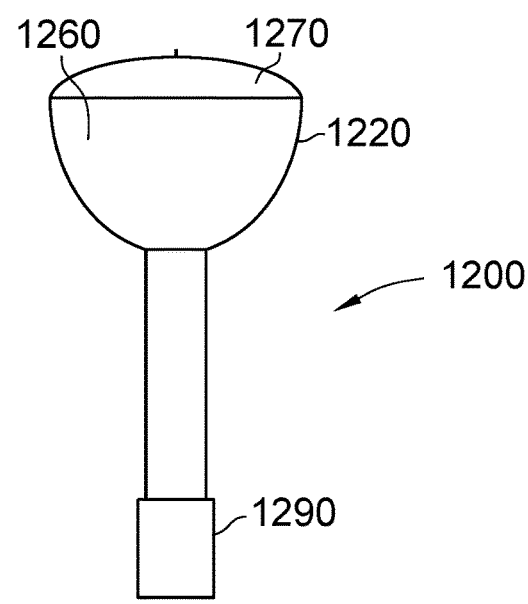
FIG. 12C is a side profile view of an alternative diffusor shape for use in systems and devices in accordance with this disclosure.
Figure 12D:
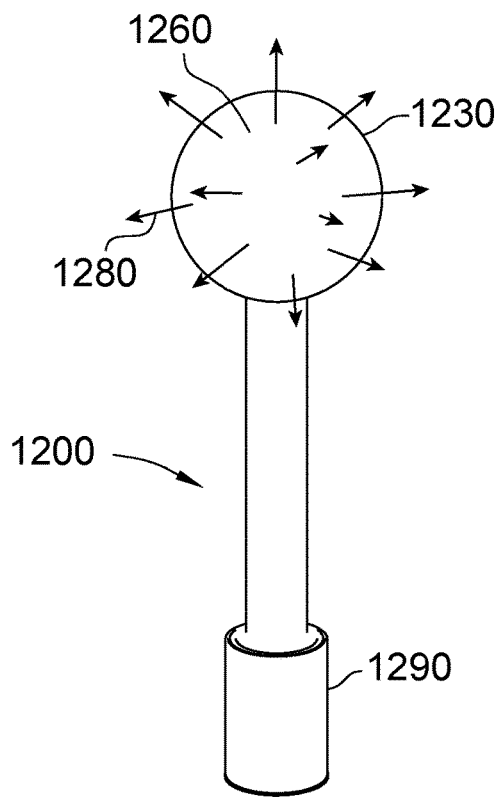
FIGS. 12D and 12E are perspective views of alternative diffusor shapes for use in systems and devices in accordance with this disclosure.
Figure 12E:
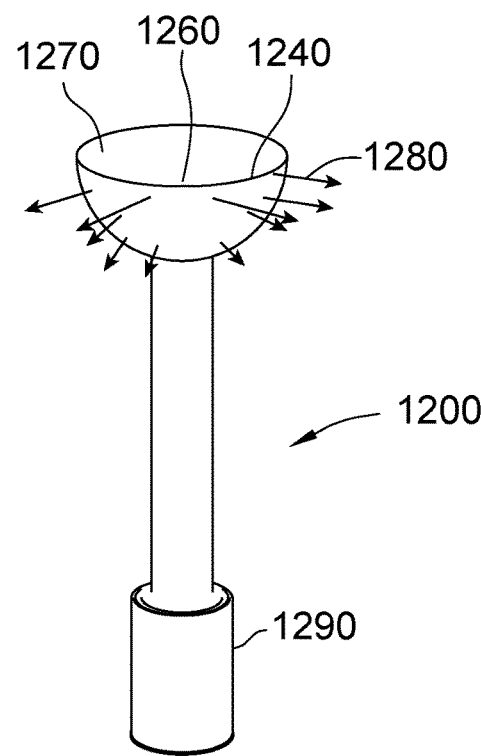
Figure 12F:
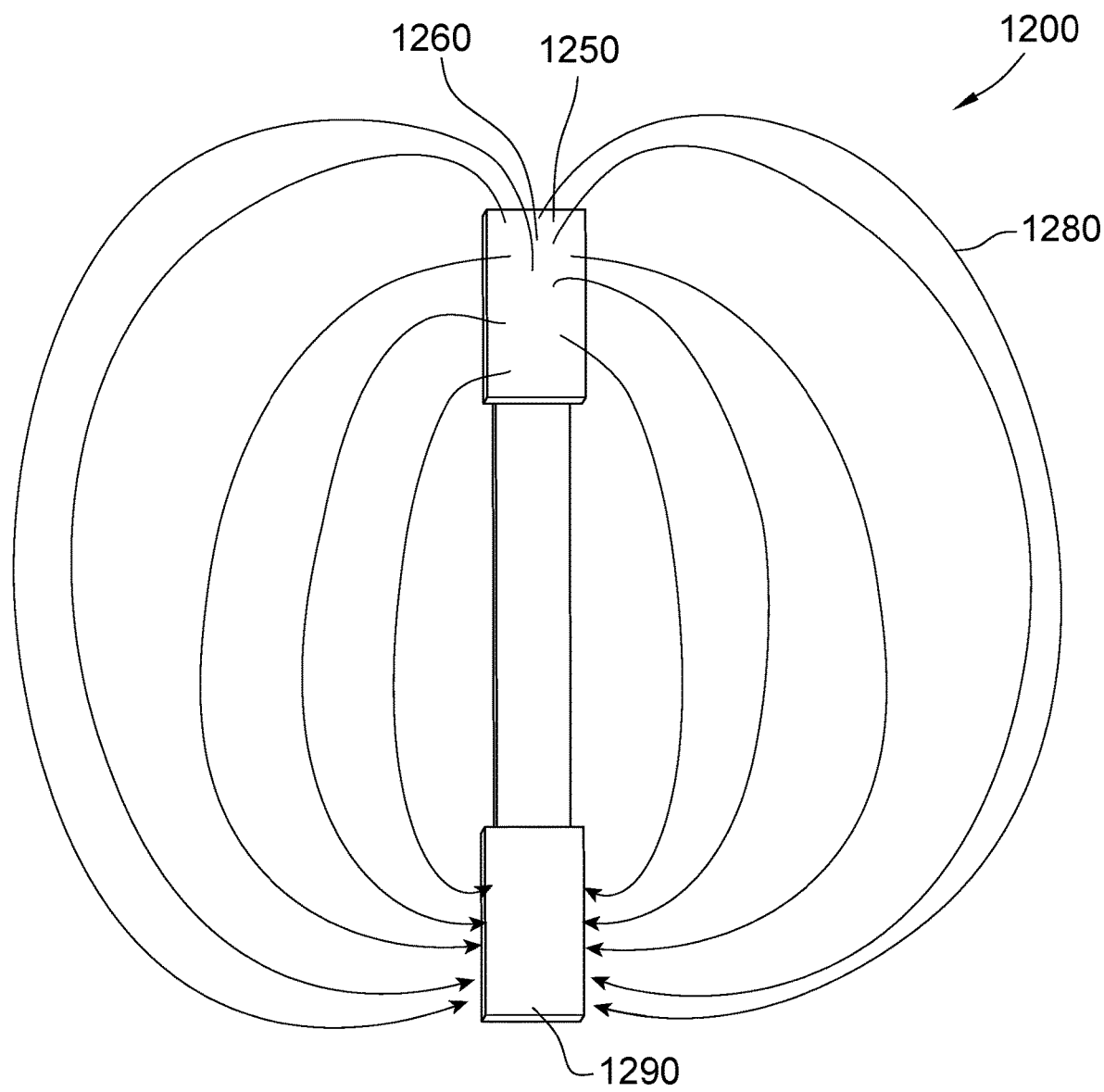
FIG. 12F is an alternative diffusor configuration for use in systems and devices in accordance with this disclosure.

FIGS. 12A and 12B show perspective and side profile views of an alternative diffusor 1210 shape for use in systems and devices 1200 in accordance with this disclosure. FIG. 12C is a side profile view of an alternative diffusor shape 1220 for use in systems and devices in accordance with this disclosure. FIGS. 12D and 12E are perspective views of alternative diffusor shapes 1230, 1240 for use in systems and devices in accordance with this disclosure. FIG. 12F is an alternative diffusor configuration including a generic diffusor shape 1250 for use in systems and devices in accordance with this disclosure.

As shown, the diffusor 1210, 1220 may be expanded to or manufactured to different sizes, and may form a spherical shape 1230, as shown in FIG. 12D, or a semispherical shape 1240, as shown in FIG. 12E. Additional shapes are possible as well, including rounded squares, tear-drop, or egg-like shapes. As shown in FIG. 12F, and as shown in earlier configurations, the diffusor 1250 may be provided as an extruded square or any other parallelepiped shape.

The flow directions and the flow speeds can be adjusted to create a more constant down-draft component and a dipole-like flow shape. Accordingly, the top and bottom, or just the bottom, of an implementation may be used as diffusor 1210, 1220, 1230, 1240 surfaces, with the entire interior of the diffusor functioning as a plenum 1260. Accordingly, the plenum may be formed from multiple materials, such that a bottom portion of the plenum is formed from a semipermeable material and functions as a diffusor 1210, 1220, and an upper portion of the plenum 1270 is not permeable, and therefore no air flow is diffused through that material. Alternatively, as shown in FIG. 12D, the entire surface of the plenum may be semipermeable or perforated, such that the entire surface functions as a diffusor 1230. In such a configuration, air flow 1280 may exit the diffusor 1230 on all sides of the plenum 1260.

In all configurations shown, an air flow intake 1290 is provided along with the diffusor 1210, 1220, 1230, 1240, 1250, such that air flow 1280 existing the diffusor is drawn by the air flow intake. As shown in FIG. 12F, where air flow 1280 exists the diffusor 1250 in various directions, including upwards from the plenum 1260, this results in the air flow taking a generally dipole shape from the diffusor to the air flow intake 1290.

While various bubble style or partial bubble style diffusors 1210, 1220, 1230, 1240 are shown, additional linear curved designs may be implemented as well.

Figure 13:
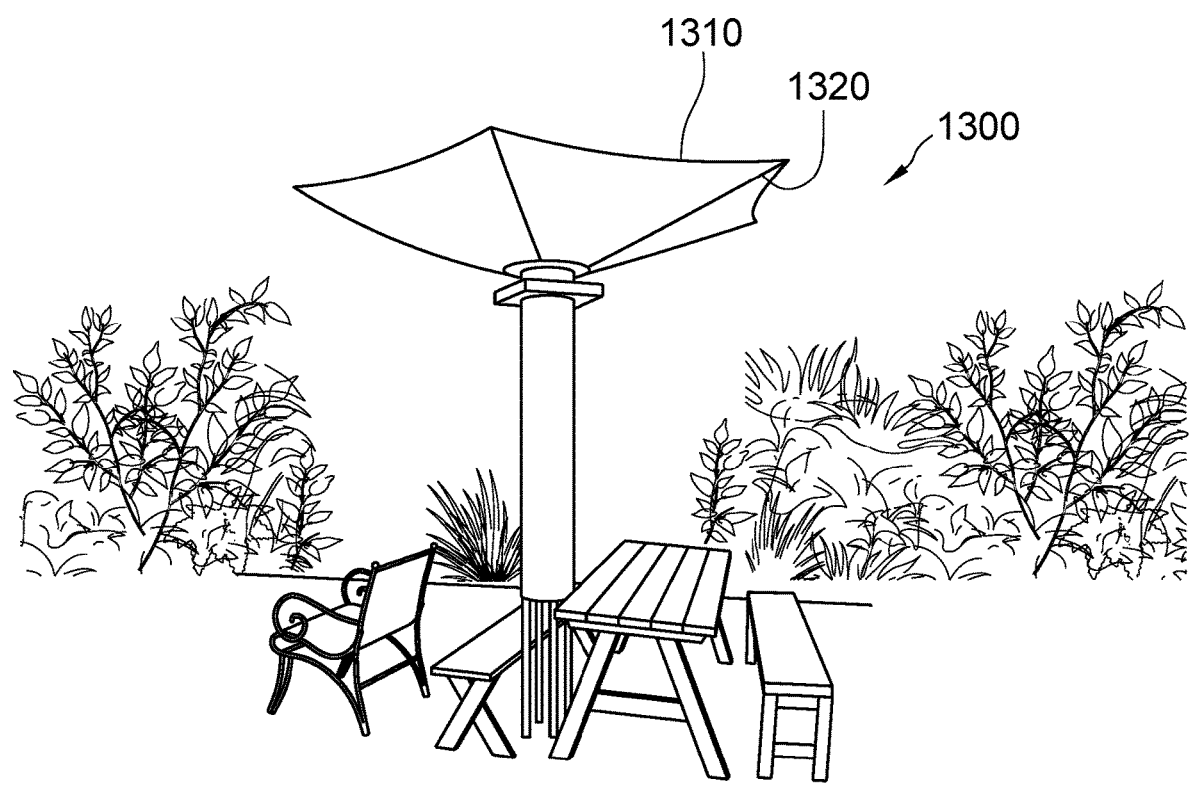
FIG. 13 is a perspective view of a diffusor structure in accordance with this disclosure.

FIG. 13 is a perspective view of a diffusor structure 1300 in accordance with this disclosure. As shown, the diffusor 1300 may be made of a semi-rigid structure 1310 with flexible elements 1320. The structure can possibly be folded for storage or adjusted in the space. Different sections can have different resistances to flow, and tension elements such as ropes/cables can be embedded to hold a shape. Additionally, the embodiment may include compression elements, such as rods, arches, tent rods, and the like, as well as any combination thereof.

Figure 14:
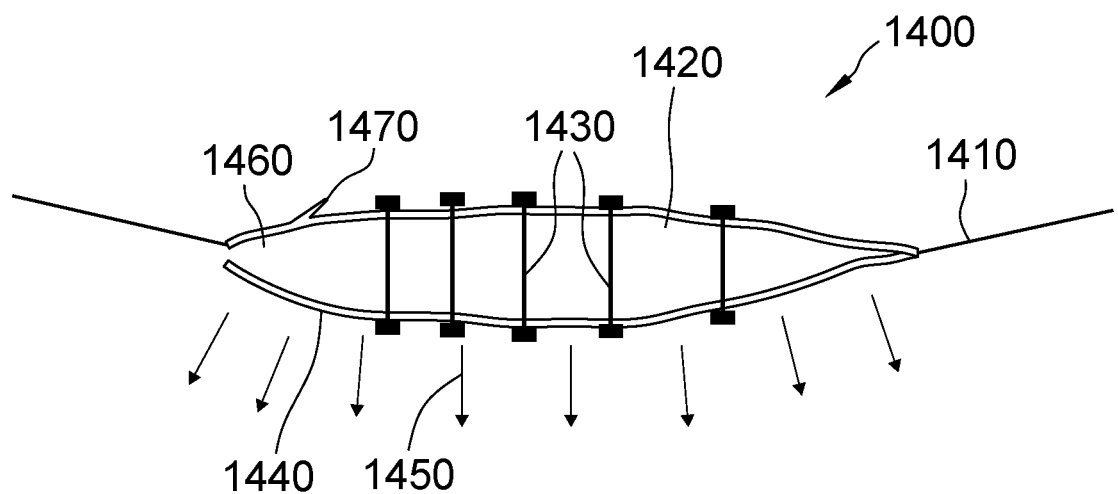
FIG. 14 is a perspective view of an alternative diffusor structure in accordance with this disclosure.

FIG. 14 is a perspective view of an alternative diffusor structure 1400 in accordance with this disclosure. As shown, the diffusor structure 1400 of FIG. 14 may be suspended. This can be using tension members 1410 which suspend a plenum 1420. Inside the plenum 1420, support members 1430 can aid in holding the shape, and differences in flow resistance in the diffusor surface 1440 can help guide the flow 1450. Note that in this embodiment, air-tight membranes 1460 can be used in parts, while the diffusor surface 1440 may be formed from a semipermeable or perforated membrane. Accordingly, flow can be directed by use of appropriate material selections. Further, in some embodiments, a vent 1470 may be provided to help control and equalize pressure within the plenum 1420. Air flow 1350 output through the diffusor surface 1440 may then be drawn by an air flow intake and then returned to the plenum 1420 by way of a conduit (not shown).

Figure 15A:
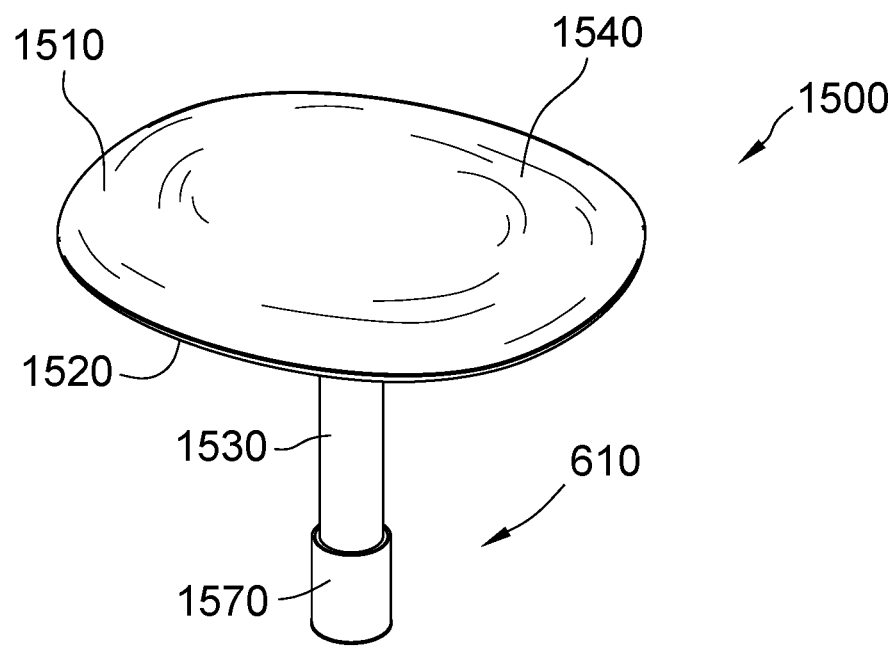
FIGS. 15A-15C show embodiments of an inflatable diffusor structure in accordance with this disclosure.
Figure 15B:
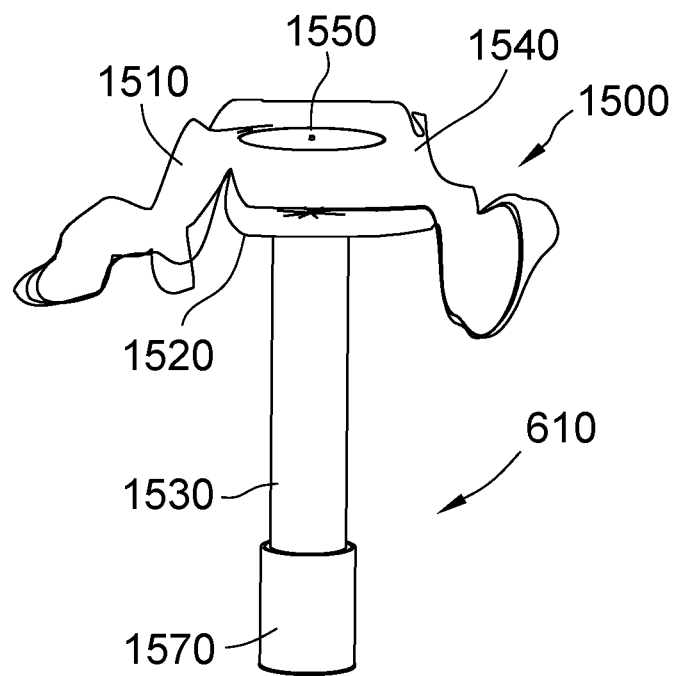
Figure 15C:
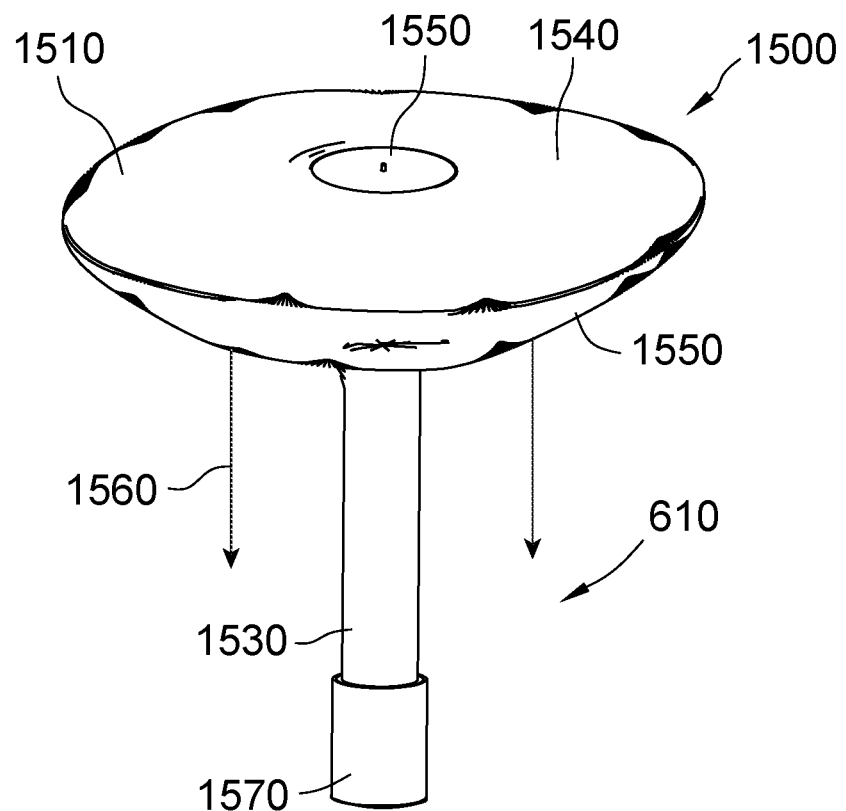

FIGS. 15A-15B show embodiments of an inflatable diffusor structure 1500 in accordance with this disclosure. FIG. 15A shows a perspective view of the diffusor structure 1500 and FIG. 15B shows a deflated version of the same diffusor structure 1500. FIG. 15C shows a different perspective view of the diffusor structure 1500 in use. As shown, in some embodiments, the air flow outlet, or diffusor structure 1500 itself comprises an inflatable plenum 1510 with a surface 1520 forming the diffusor. The plenum 1510 may then be inflated with air drawn from the conduit 1530, and perforations in, or a semipermeable nature of portions of the plenum form the diffusor surface 1520 on the side of the plenum 1510 facing the defined space 610. The support can be created by air-back-pressure, or other means.

Accordingly, a bottom diffusor surface 1520 of the inflatable plenum 1510 may be formed from a first semipermeable material while the top surface 1540 of the plenum may be formed from a second impermeable material. In some embodiments, a central support 1550 may be provided within the plenum 1510 in order to stabilize the structure as it inflates, and in some embodiments, to implement venting to maintain appropriate pressure. Accordingly, air flow 1560 output by the diffusor surface 1520 is then drawn by the air flow intake 1570, which is then fed to the plenum 1510 by way of the conduit 1530. This same air flow is then filtered or otherwise treated and output again at the diffusor surface 1520. The central support 1550 may further comprise additional functional components, such as motors, fans, and air treatment systems, such that the system 1500 is largely self contained within the inflatable plenum 1510.

Figure 16:
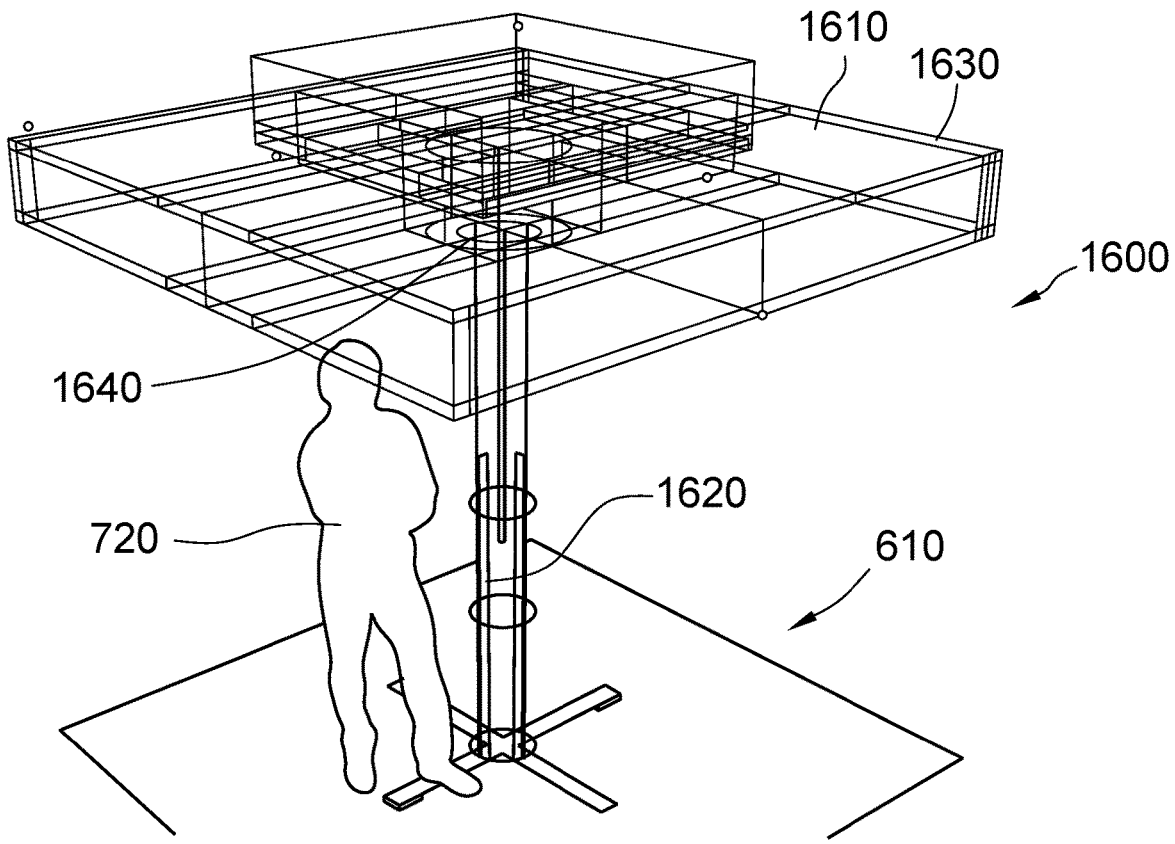
FIG. 16 shows a collapsible structure for use in the devices of the current disclosure.

FIG. 16 shows a collapsible structure 1600 for use in the devices of the current disclosure. As shown, a diffusor structure 1610 and supporting structure 1620 may use beams 1630 to build up from a central point 1640. A possible embodiment implementing such a structure 1600 can then use a fully collapsible structure for easy setup in locations and/or transport. Accordingly, a person 720 can utilize such a portable embodiment 1600 to create a defined space 610 as needed.

Figures 17A, 17B:
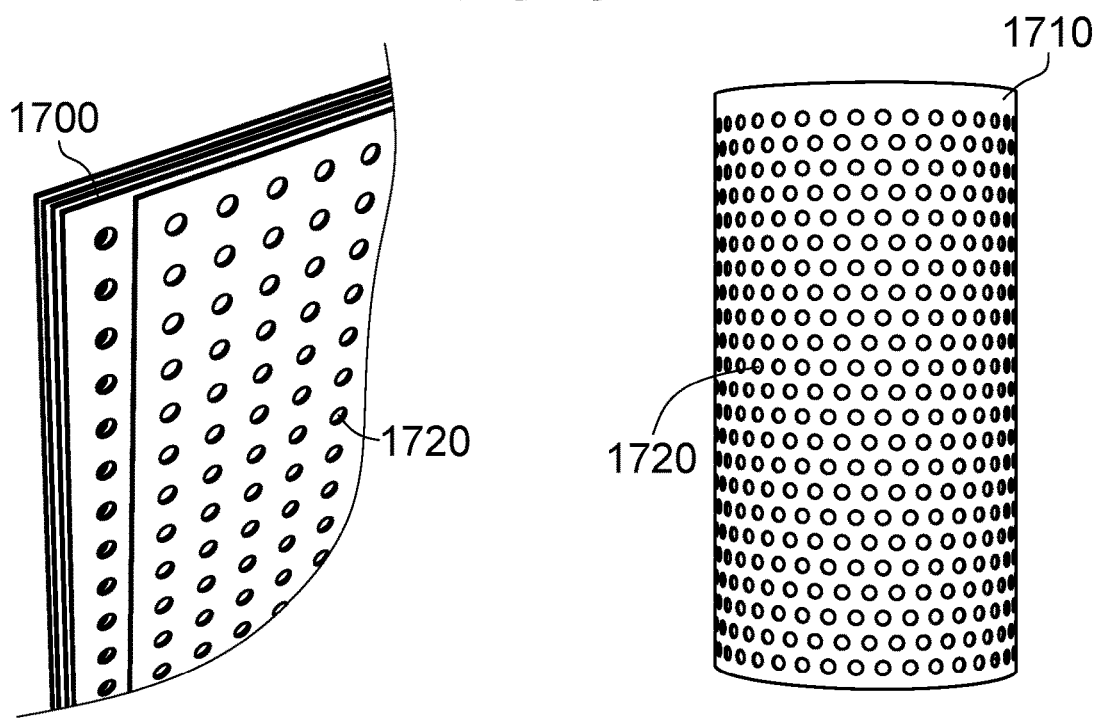
FIGS. 17A-17B show screens for use in flow control in the devices of the current disclosure.

FIGS. 17A-17B show screens 1700, 1710 for use in flow control in the devices of the current disclosure. The figures show possible means of generating required pressure drop in the diffusor. It can be using holes 1720 as shown, slots or openings of various shapes and sizes, tuned to the needed pressure drop. It can also be for example fabrics, filters or other porous or structured materials.

Not depicted, a double (or more) layer of materials in a sandwich panel-like fashion can be used. Also, small tubes or honeycomb elements can be envisioned for providing needed functionality. These materials and others can also be used inside the plenum and other parts of the device for flow direction and the like.

Figure 18A:
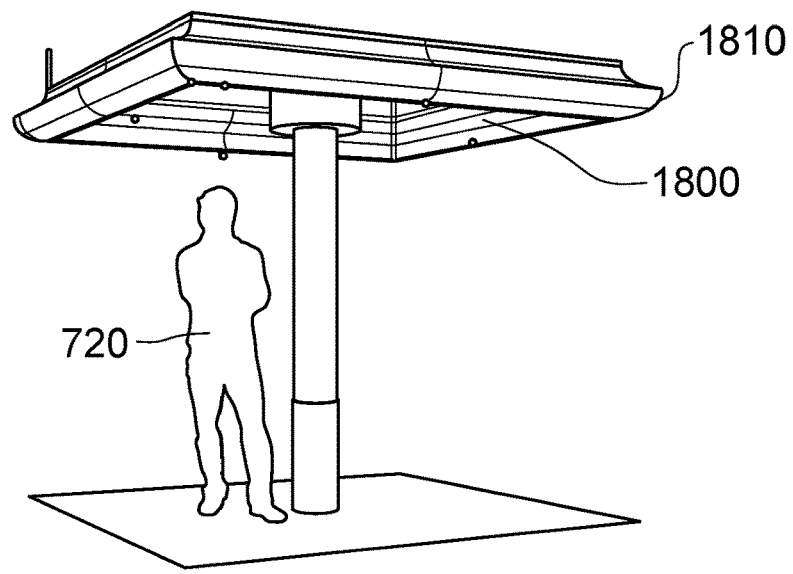
FIG. 18A shows a device in accordance with this disclosure incorporating an edge extension.
Figure 18B:
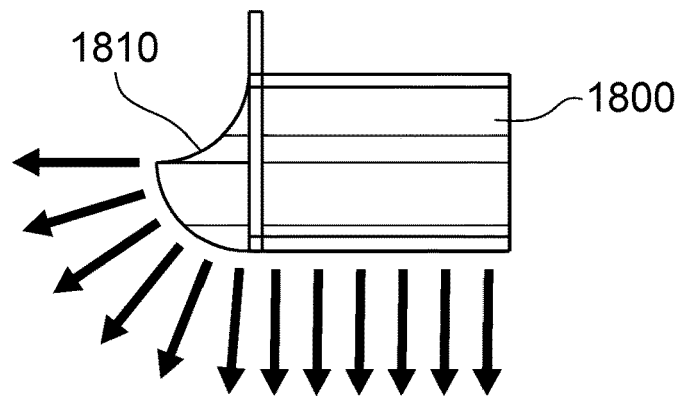
FIG. 18B shows an enlarged view of an edge of the device of FIG. 18A incorporating an edge extension.
Figure 18C:
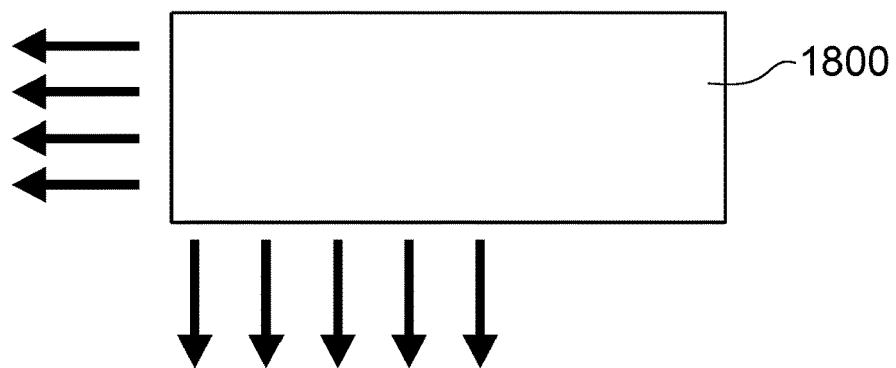
FIG. 18C shows a view of an edge profile of the device of FIG. 18A with the edge extension removed.
Figure 18D:
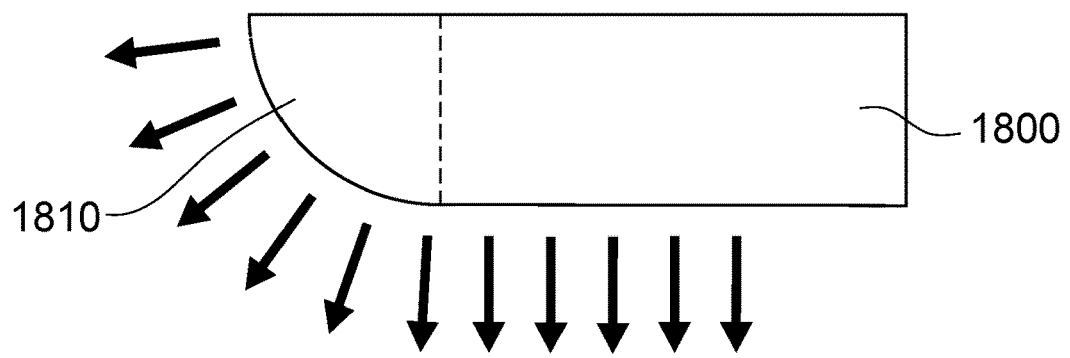
FIGS. 18D-18F show various edge profiles and edge profile extensions for use with the device of FIG. 18A.
Figure 18E:
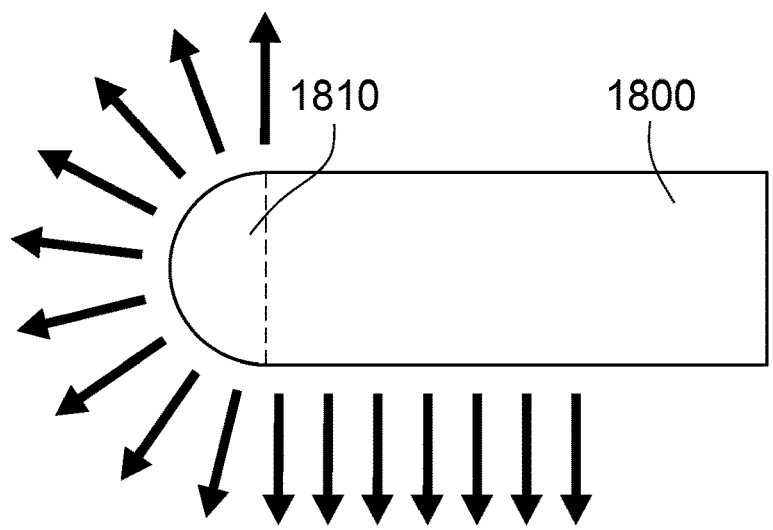
Figure 18F:
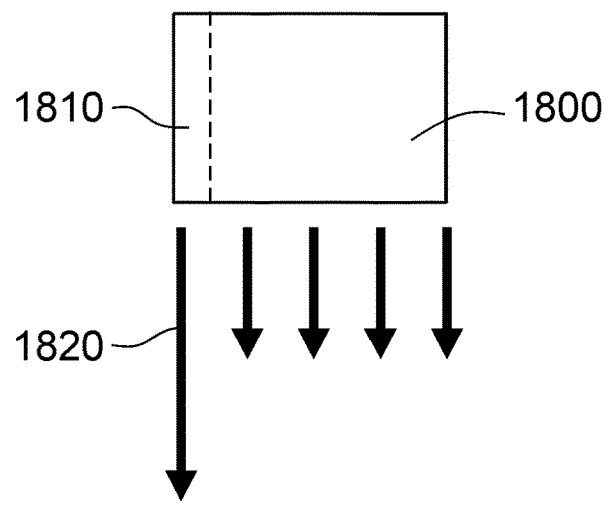

FIG. 18A shows a device 1800 in accordance with this disclosure incorporating an edge extension 1810. FIG. 18B shows an enlarged view of an edge of the device 1800 of FIG. 18A incorporating an edge extension 1810. FIG. 18C shows a view of an edge profile of the device 1800 of FIG. 18A with the edge extension removed. FIGS. 18D-F show various edge profiles and edge profile extensions 1810 for use with the device of FIG. 18A.

As shown, an add on device 1810 can be provided to extend or isolate the workable area of the diffusor 1800. This can be a removable add-on or integrated in the design.

In some embodiments, an edge or edge extension 1810 of the diffusor 1800 can generate Jet-lines 1820, which can be located to isolate the defined space 610. Flow entrainment can be used to clean the air volume in the placement location even when not in the fully protected zone. It can be used to minimize the residency time of any contamination in the space.

Figure 19:
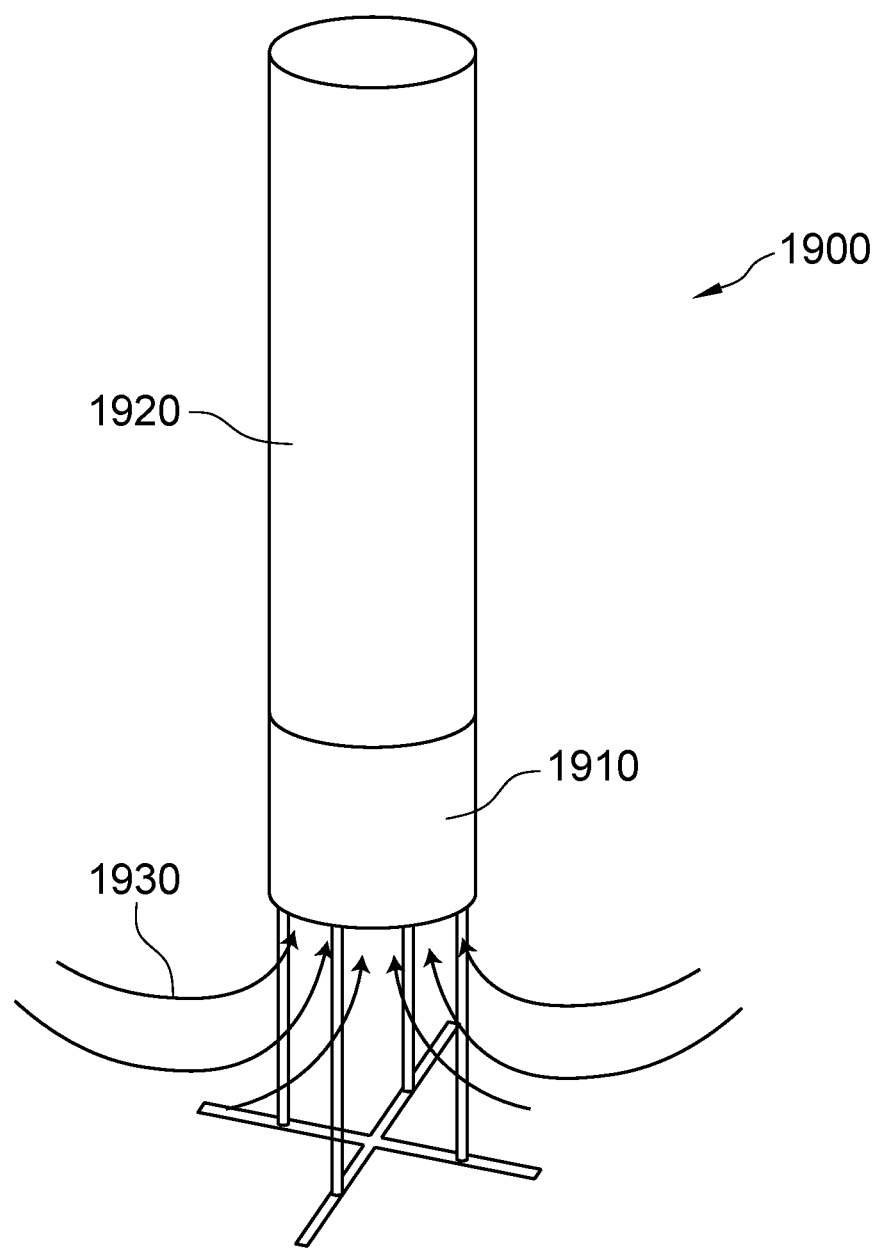
FIG. 19 shows a collector for use as an air inlet in devices in accordance with this disclosure.

FIG. 19 shows a collector 1910 for use as an air inlet in devices 1900 in accordance with this disclosure.

In order to ensure as much as possible pickup from people in the diffuser flow, the collector is placed in such a way that it sucks in as much as possible flow coming from the diffusor. This can be done by placement (central location for example), number of pickup points (multiple pillar designs), leakage flow (more volume flow to the collector than the diffusor expels), use of extensions of the room (using for example the walls to constrain, or embodiments into in-room elements (for example a porous table acting as part of the collector). The collector can be placed as low as possible to ensure minimal flow disturbance. An envisioned embodiment can include integration in the floor itself.

FIG. 19 shows an example collector, or air flow inlet 1910, for use in the device 1900. Flow 1930 is allowed to enter from multiple directions, and is then directed into a pillar-like housing 1920 for the air flow conduit.

Figure 20:
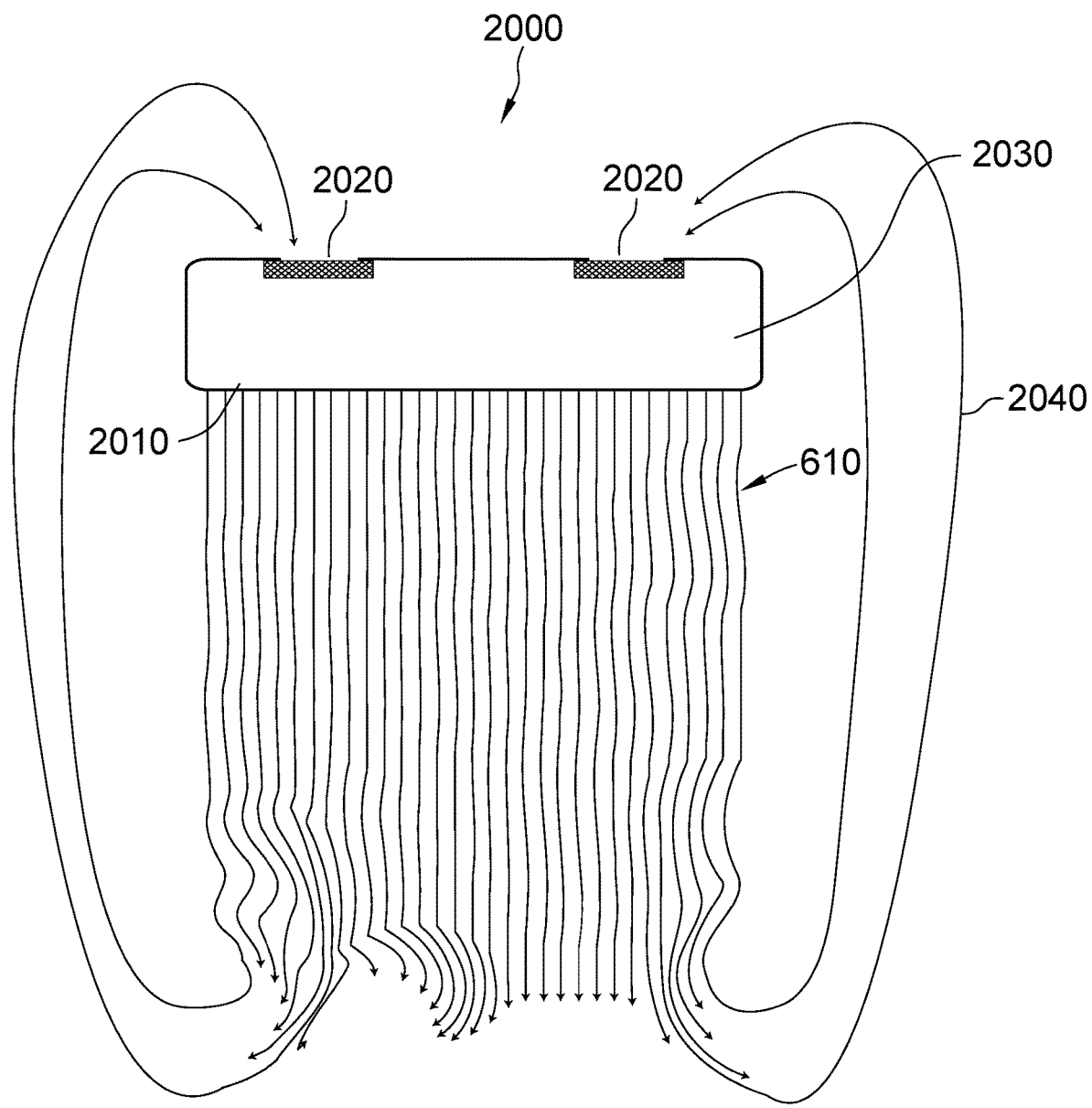
FIG. 20 shows an alternative embodiment of an air outlet paired with an air inlet in accordance with this disclosure.

FIG. 20 shows an alternative embodiment of a device 2000 with an air flow outlet 2010 paired with an air flow inlet 2020 in accordance with this disclosure. As shown, the air flow inlet 2020, or collector, is placed near or adjacent to the air flow outlet 2010, generally a plenum 2030 or diffusor section. In such an embodiment, it is understood that air flow 2040 will move upwards, instead of downwards, but by actively directing air flow from the diffusor section of the air flow outlet 2010 to the air flow inlet 2020, the airflow will remain organized and controlled. As shown, the air flow 2040 may initially move downwards, into and through the defined space 610 prior to returning upwards and moving towards the air flow inlet 2020.

Figure 21A:
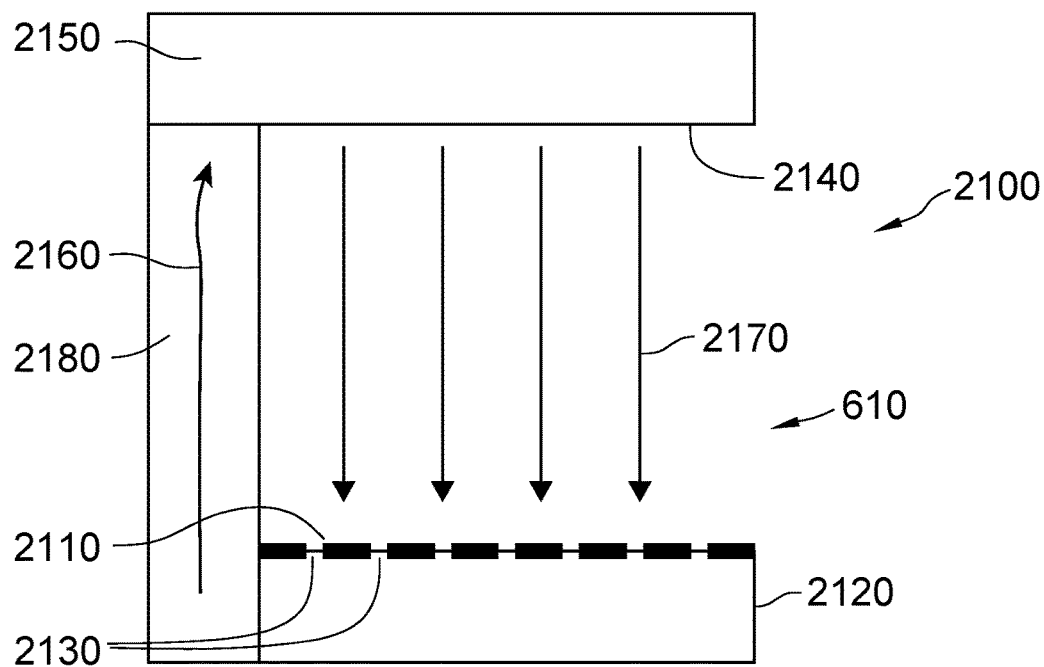
FIGS. 21A-21B shows an alternative embodiment of a system in accordance with the current disclosure.
Figure 21B:
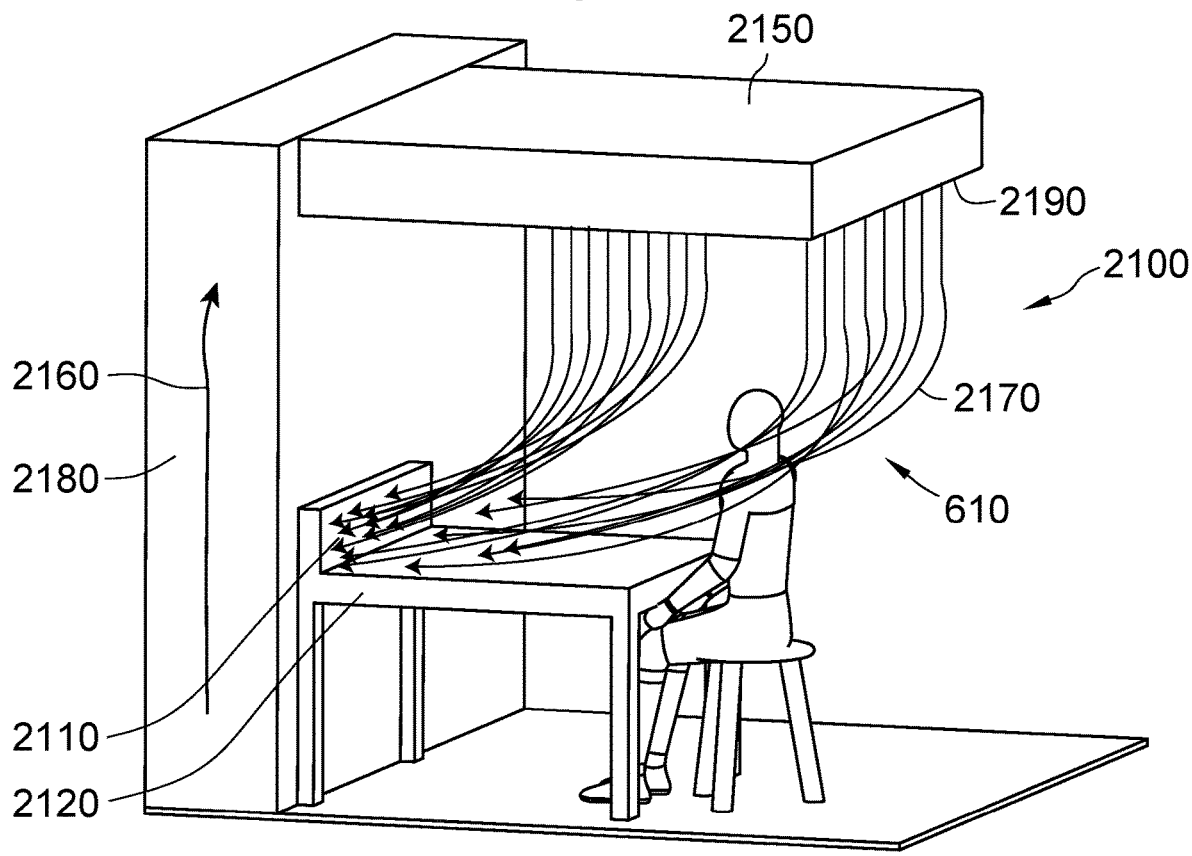

FIG. 21A-21B show alternative embodiments of a system 2100 in accordance with the current disclosure. As shown, the air flow inlet 2110 is embedded into part of the functional or aesthetic elements of a space in which the system 2100 is installed. Here, for example, the system is embedded into a table 2120. This may be done by incorporating perforations 2130 into the table 2120, or by implementing other means, such as using a porous material for the table. Similarly, as shown in FIG. 21B, the air flow inlet 2110 may be a backsplash to the table 2120.

Accordingly, in some embodiments, the air flow outlet 2140 may be incorporated into or form a partial ceiling 2150 over a defined space 610, and the tabletop 2120 may be at the second side of the defined space, in this case, the bottom of the defined space. Accordingly, in the case of a restaurant, for example, individual air flow outlets 2140 may be located within various ceiling 2150 segments or in specially formed ceiling extensions located above tables 2120. Conduits 2160 for returning air flow 2170 to the air flow outlet 2140 after passing through the defined space 610 may then be located within a wall 2180 adjacent the table 2120, or the conduit may take a more circuitous route where the table 2120 is not directly adjacent a wall.

Figure 22B:
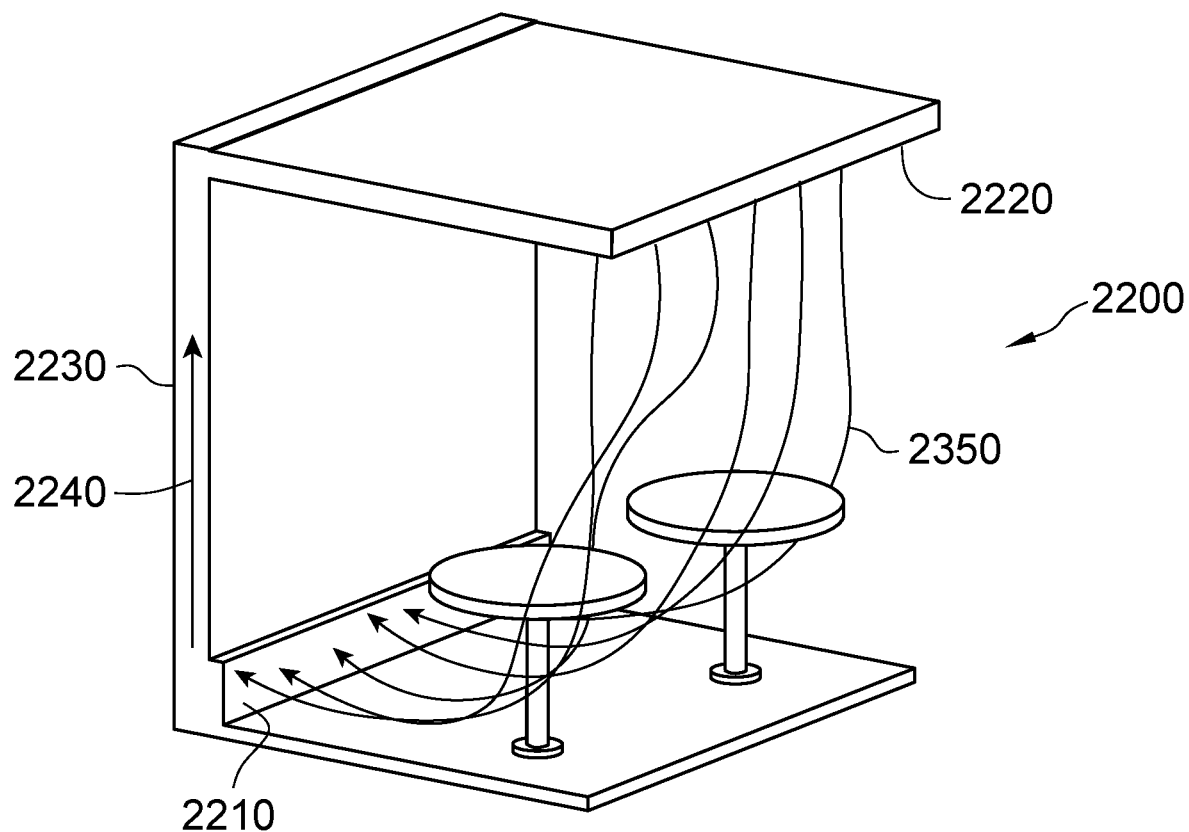
Figure 23A:
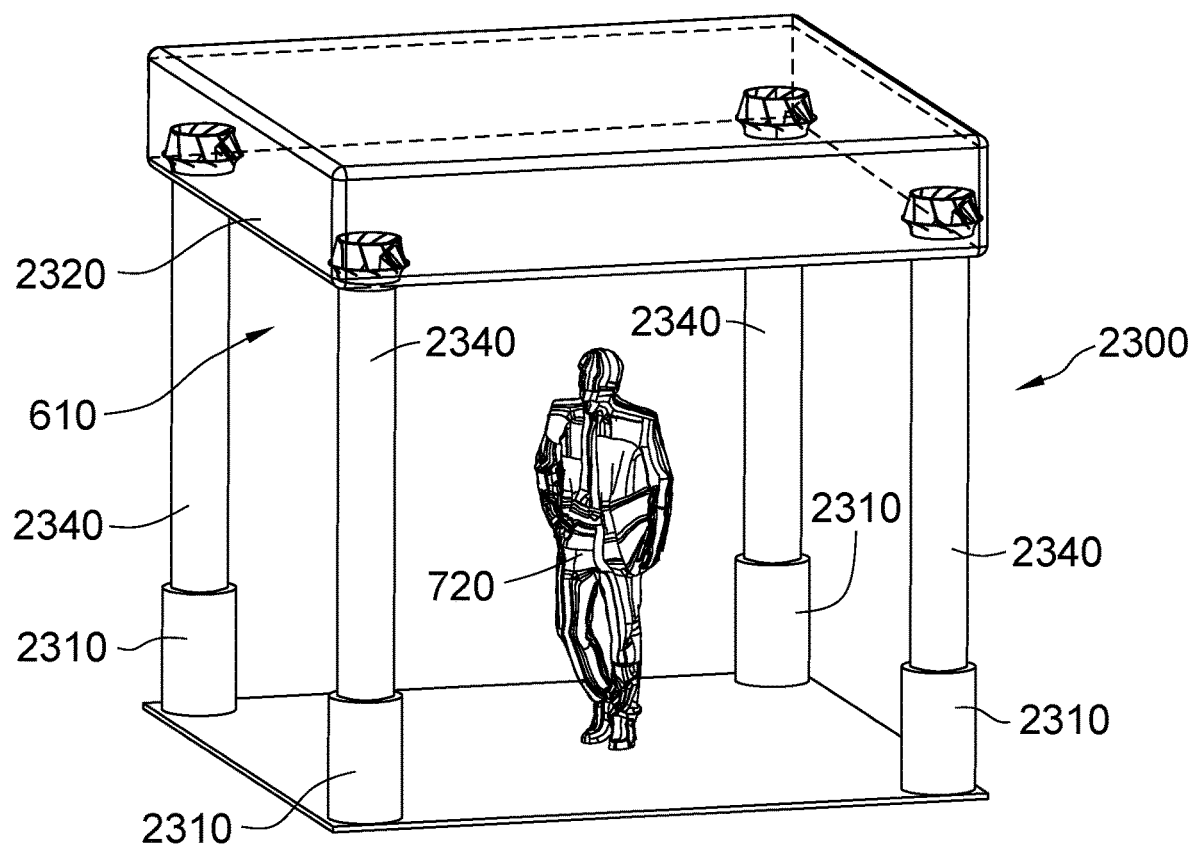
FIGS. 23A-23D show alternative embodiments of systems in accordance with the current disclosure.
Figure 23B:
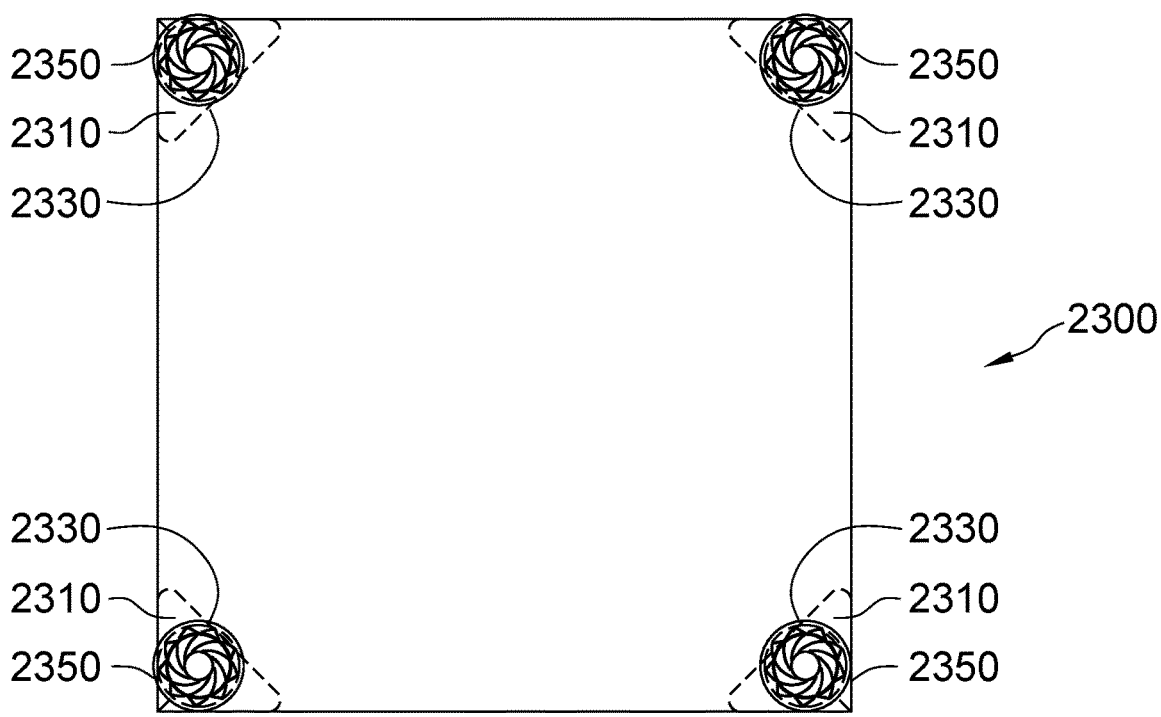
Figure 23C:
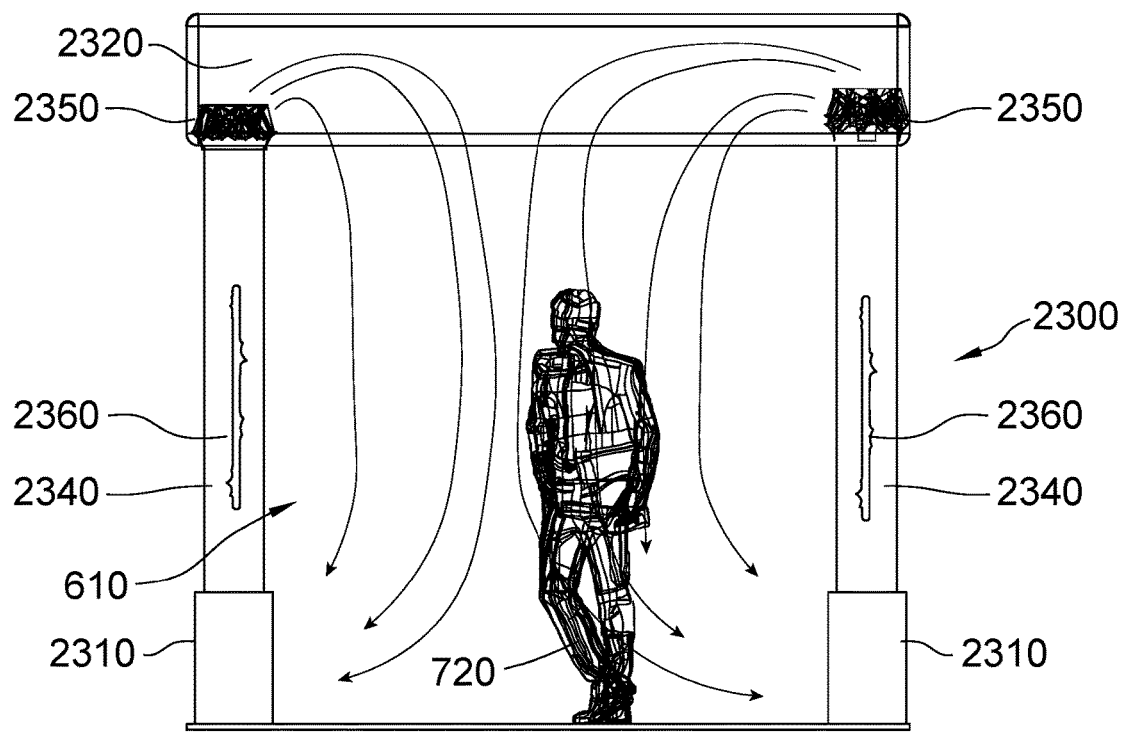
Figure 23D:
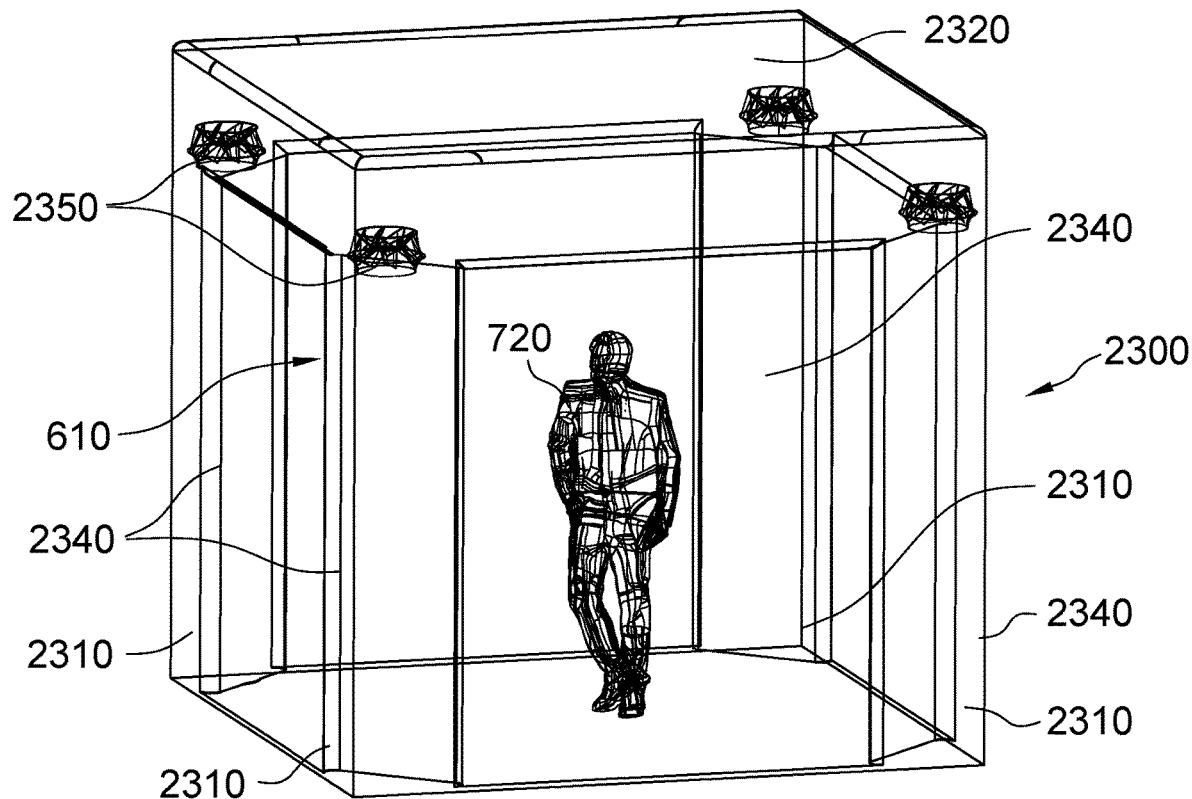

FIGS. 22A-22B show alternative embodiments of systems 2200 in accordance with the current disclosure.

Air is transported mostly between the collector, or air flow inlet, 2210 and diffusor, or air flow outlet 2220. A pillar-style design can be implemented in some embodiments, as discussed above, where the cross-section dimensions may be optimized and balanced with acoustics production and pressure drop requirements. A smaller cross-sectional area aids in minimizing lost floor area and aids in the visual impression, but at the expense of higher air flow speeds in the return channel for the same volume displacement. In the case of wall-controlled units, the return duct can have a slender shape with its width more extended than its depths. As such, the conduit 2240 may form a wall like surface within or adjacent the actual wall 2230. Also, when utilizing a wall 2230, multiple returns 2240 can be used. In order to capture flow from the diffusor, or air flow outlet 2220, the collector, or air flow inlet 2210 volume flow can be increased by adding an additional release at another location or in another direction.

Accordingly, as shown in FIG. 22A, the collector, or air flow inlet 2210 may be integrated into a wall 2230 to enable a compact return/recirculating flow structure. For acoustics and flow behavior, there is a typical minimum cross-sectional area for the return ducting 2340, functioning as the air flow conduit, based on cubic feet per minute (CFM) transferred. FIG. 22B show cross flow setup possible using a wall 2240 as a guide element. As shown, the air flow inlet 2210 may be configured as a trim for the wall 2230.

Accordingly, air flow 2250 through the defined area 610 typically initiates at the diffusor, or air flow outlet 2220, and terminates at the air flow inlet 2210, where it is then returned to the air flow outlet by way of one of several potential conduits 2240 within or adjacent the wall 2230.

FIGS. 23A-23D show alternative embodiments of systems 2300 in accordance with the current disclosure. As shown, a set of distinct collectors, or air flow inlets 2310, may be provided to assist in recirculating flow. In some of the embodiments shown, a single diffusor, or air flow outlet 2320 may be provided and may be fed by the multiple air flow inlets 2310. In other embodiments, such as that shown in FIG. 23B, distinct diffusors, or air flow outlets 2330 may be served by the different air flow inlets 2310.

Accordingly, multiple air flow inlets 2310 may be provided adjacent to or within the defined space 610, and a plurality of conduits 2340 may be provided, wherein each conduit of the plurality of conduits transports air from a corresponding air flow inlet to the single air flow outlet 2320 or to a corresponding discrete air flow outlet 2330.

The embodiments shown may contain multiple air flow conduits 2340, possibly served by multiple motors 2350 and may be serviced by multiple corresponding air treatment modules 2360. Other elements may be duplicated as well, depending on the specific implementation.

Figure 24:
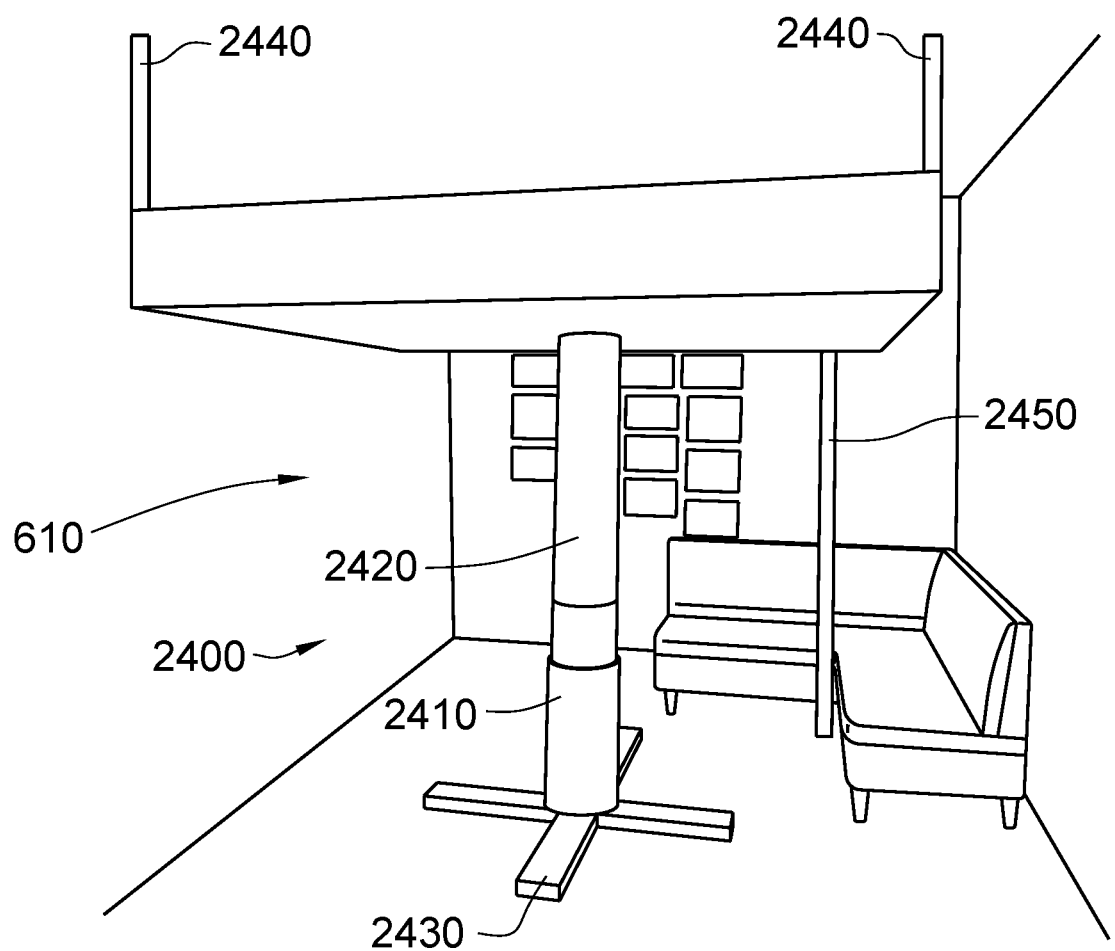
FIG. 24 shows an implementation of a device in accordance with the current disclosure.

FIG. 24 shows an implementation of a device 2400 in accordance with the current disclosure. As shown, the device has an air flow inlet, or collector 2410 and a column 2420 containing an air flow conduit acting as a structural elements holding the whole device 2400 of supporting part of the device. Any weighting, or extensions to the lower base 2430 can aid in the stability. Additional mounting to the ceilings and/or walls 2440 and/or other pillars 2450 can be envisioned to support the structure and any exerted forces on it.

Figure 25A:
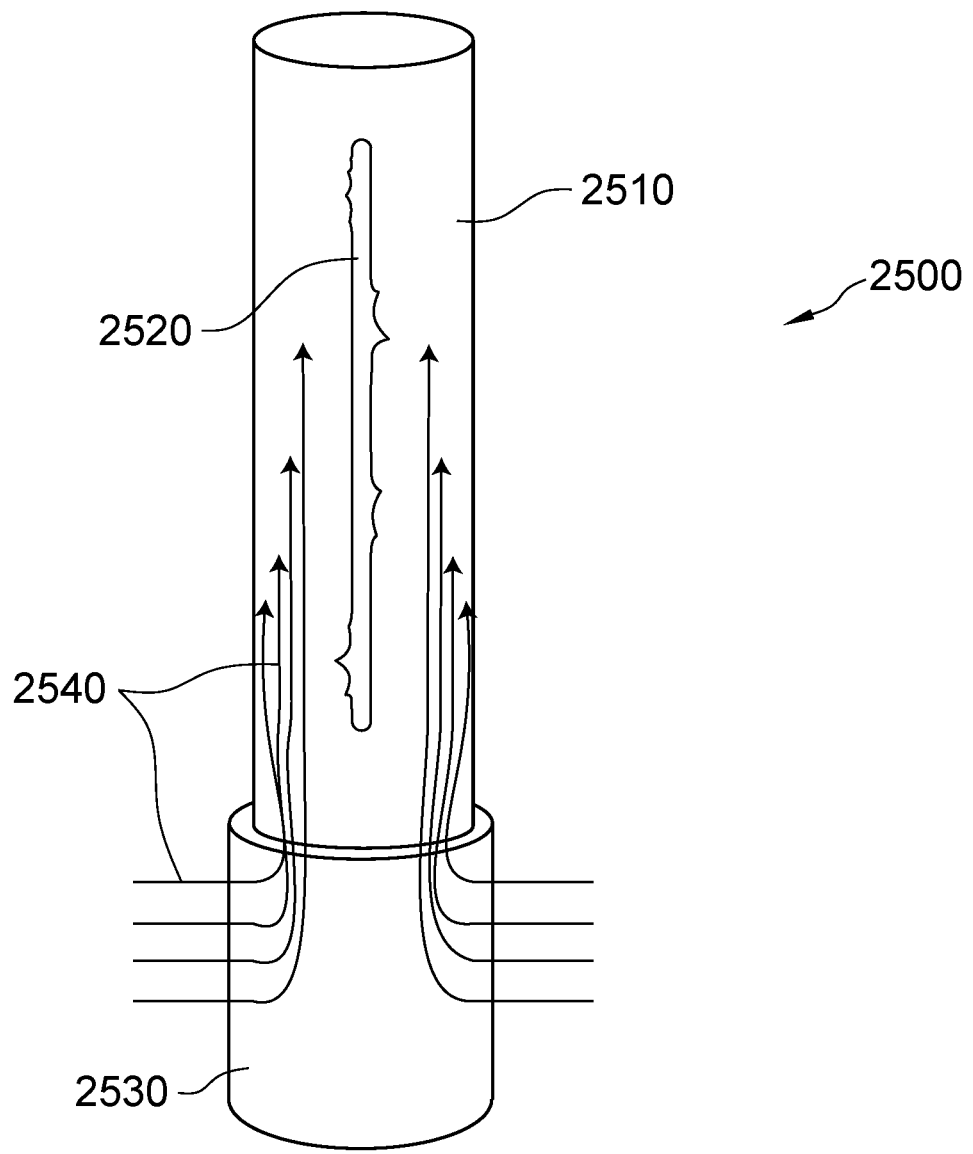
FIGS. 25A-25B show implementation of air treatment in the context of the devices of the current disclosure.
Figure 25B:
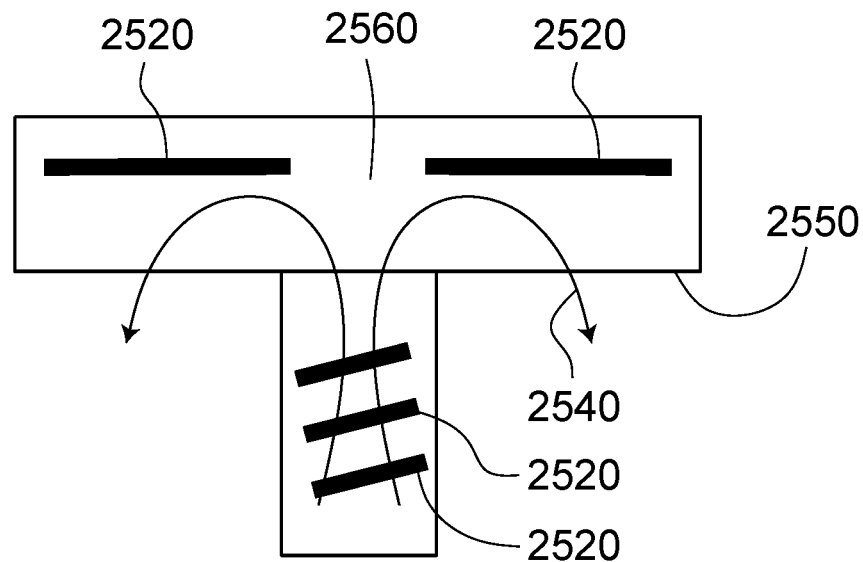

FIGS. 25A-25B show implementation of air treatment in the context of the devices of the current disclosure. Air treatment is generally implemented by one or more air treatment module, and can include a pre-filter, a filter able to capture a significant amount of microdroplets (a candidate for the Covid-19 spread, arriving from coughing, breathing and alike from infected people), a HEPA or ULPA filter to capture some of the hydraulic diameter of the virus itself. Also PCO (photo-catalytic oxidation) or UV-C (or other UV) lighting can be used to neutralize any virus and the like. In one embodiment, a UV-C germicidal lamp is used in the return pillar flow, where the placement is along the flow. The boundary layer profile of the pillar aids in having slower flows at larger distances from the light source. A dosage is calculated and the UV-C light is set to provide sufficient wattage in this range to kill or deactivate the virus.

Other options include refreshing of the flow (no circulation), fluid filters with air running through them, separators and the like. The lamp can also be placed in the diffusor. A transparent for-visible light material or port hole can be used to show or inspect the workings. Also, active electrostatic filters can be used, where a charge is used to guide particles onto plates. These plates can also then have (possible lower wattage germicidal light to deactivate viruses). Active carbon filters can also be placed.

FIG. 25A shows an embodiment of a device 2500 with a possibly central pillar 2510, one or more UV-C germicidal lamp(s) 2520 in the column, and a top motor section. Note that the frame here is optionally transparent. A transparent diffusor section can aid in not having to adjust lighting and change the design and atmosphere of a room or section of it. A certain light dosage can be calculated to deactivate viruses and the like in all sections of the flow. The flow boundary layer can aid in slowing down flow furthest from lamp(s) 2520. The collector, or air flow inlet, 2530 can be designed to ensure dosage is met, with slower flow aiding in the total light dosage. Accordingly, air flow 2540 is drawn into the air flow inlet 2530 and passes by the air flow treatment 2520 in a conduit on its way to a diffusor 2550 or air flow outlet section.

FIG. 25B shows example alternate placements and orientations of lamps 2520 for controlling flow past the lamps. As shown, the lamps 2520 may optionally be located in a plenum 2560 for the diffusor 2550 such that the air flow 2520 is further treated as it spreads out prior to being diffused.

Figures 26A, 26B:
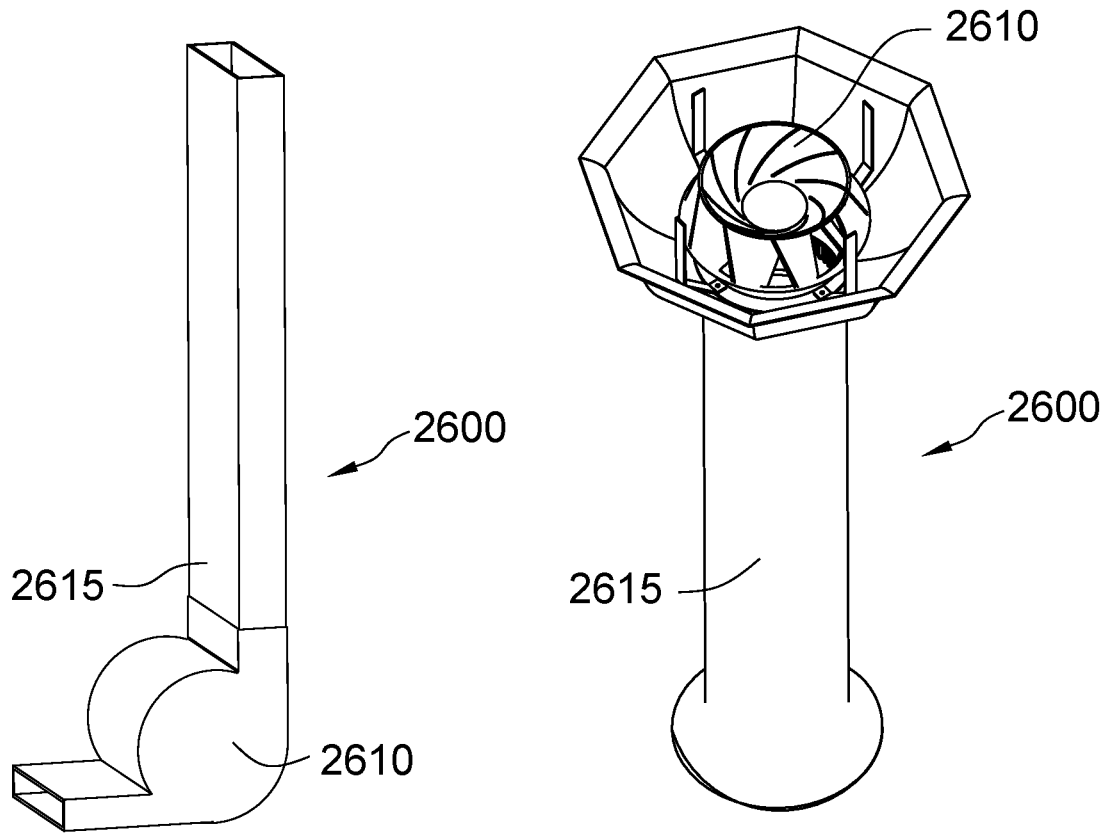
FIGS. 26A-26D show implementations of driving motors and fans in the context of the devices of the current disclosure.
Figure 26C:
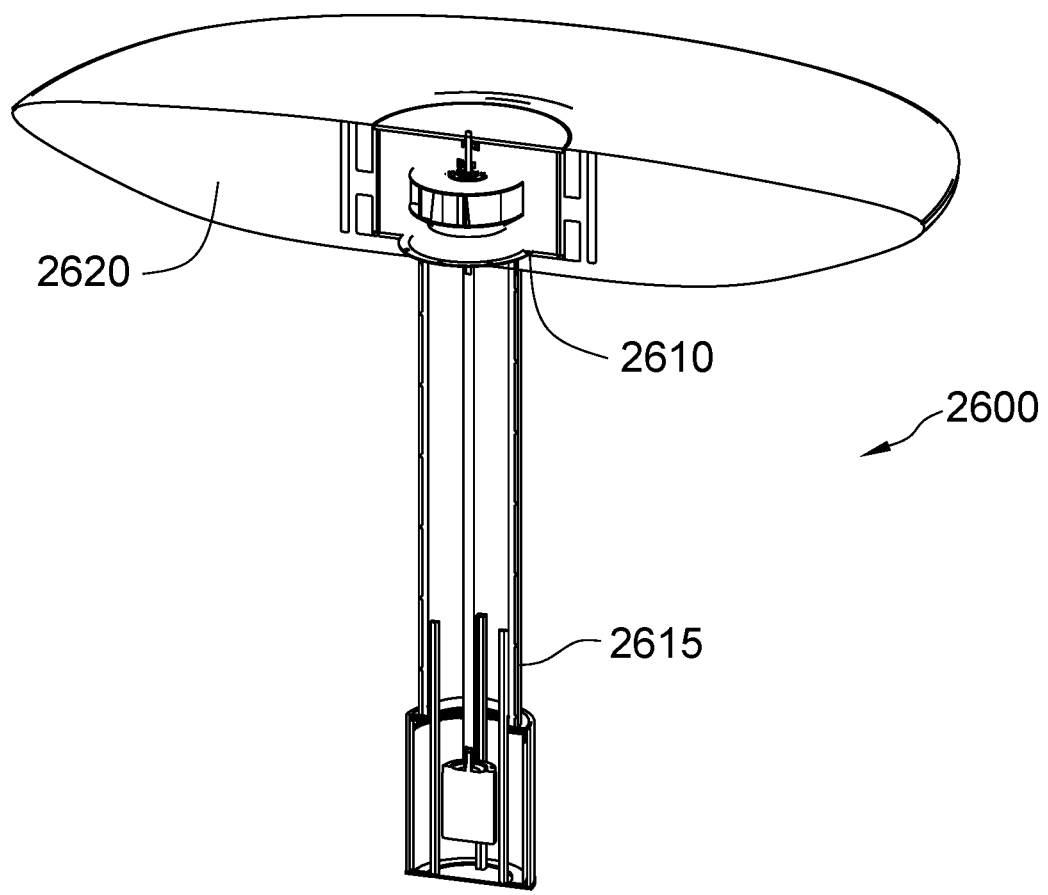
Figure 26D:
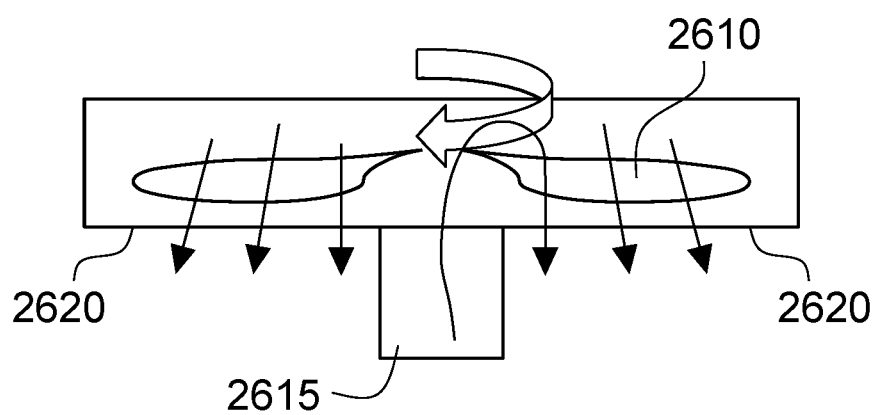
Figure 27A:
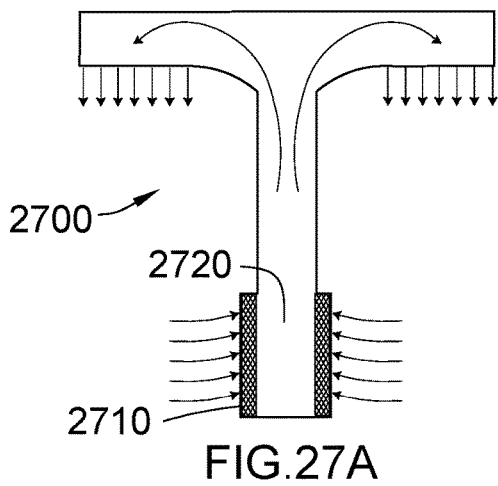
FIGS. 27A-27F show various configurations for filters at inlets of devices in accordance with the current disclosure.
Figure 27B:
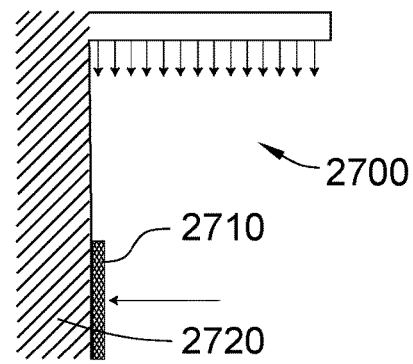
Figure 27C:
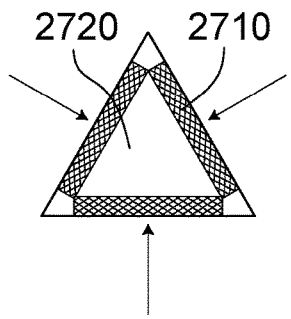
Figure 27D:
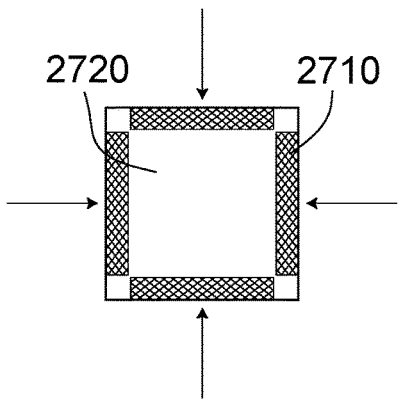
Figure 27E:
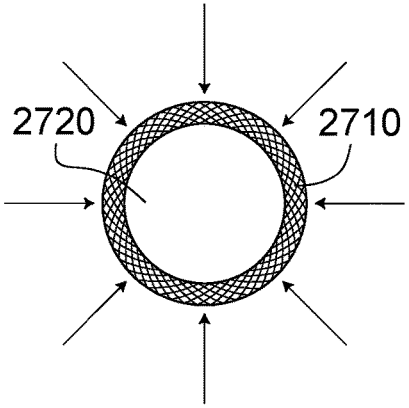
Figure 27F:
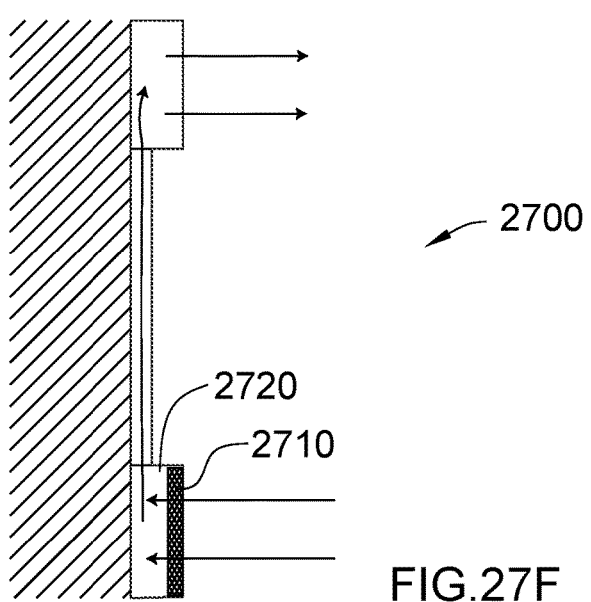
Figure 28A:
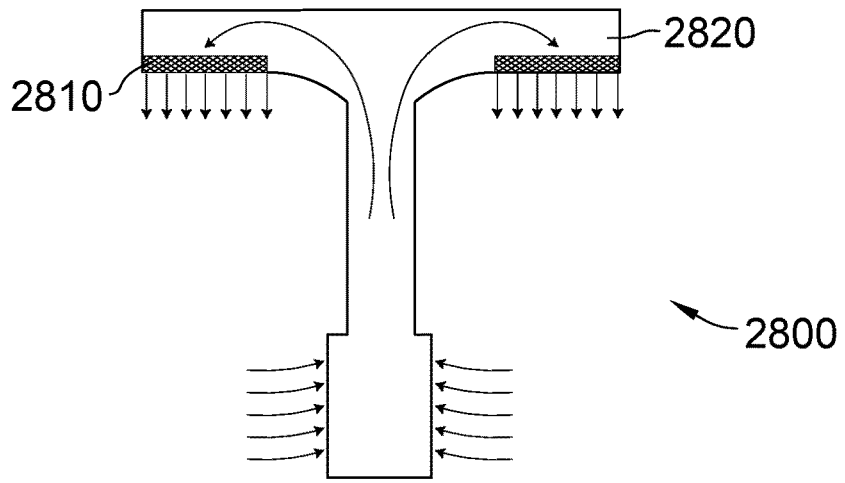
FIGS. 28A-28E show various configurations for filters at outlets of devices in accordance with the current disclosure.
Figure 28B:
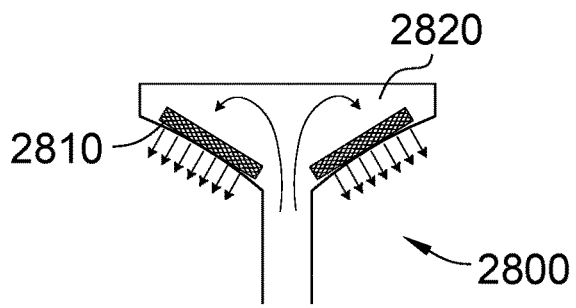
Figure 28C:
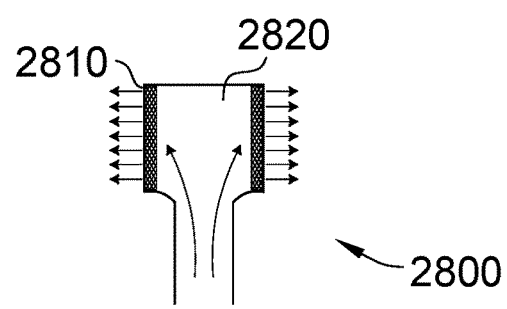
Figure 28D:
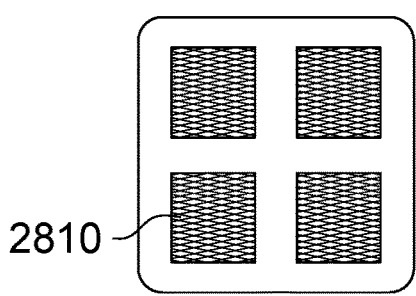
Figure 28E:
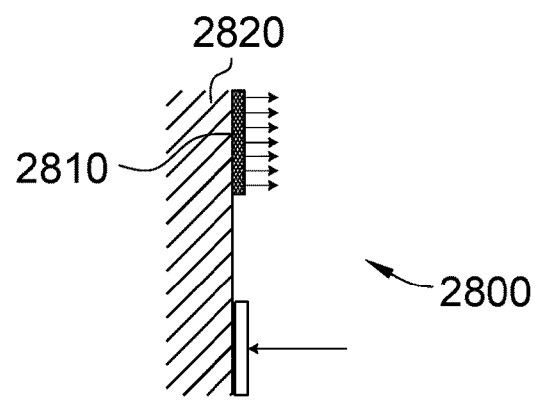

FIGS. 26A-26D show implementations of driving motors and fans 2610 in the context of the devices 2600 of the current disclosure. The driving motor 2610 in the unit should be able to handle needed pressure drop, and provide the required flow while providing a low noise profile. In order to minimize noise, acoustic insulation can be utilized. In order to minimize the return pillar cross section, a motor unit can be placed either at the base of the pillar 2615, as shown in FIG. 26A, or in the top, as shown in FIGS. 26B and 26C, near or in the diffusor section 2620. Motors 2610 can include plug fans/plenum fans, backward or forward curved centrifugal fans (including possible housing) axial fans (vane or tube axial), mixed/cross flow centrifugal fans, cross flow blowers, large propeller/ceiling fan like fans and the like.

Also, multiple devices can be used, with possible mixing between types and/or placement in a grid-like structure.

FIGS. 27A-27F show various configurations for filters 2710 at inlets 2720 of devices 2700 in accordance with the current disclosure. FIGS. 28A-28E show various configurations for filters 2810 at outlets 2820 of devices 2800 in accordance with the current disclosure. In some embodiments, the filters provided 2710, 2810, may function as elements helping in flow distributions due to placement and/or controlled resistance.

Figure 29A:
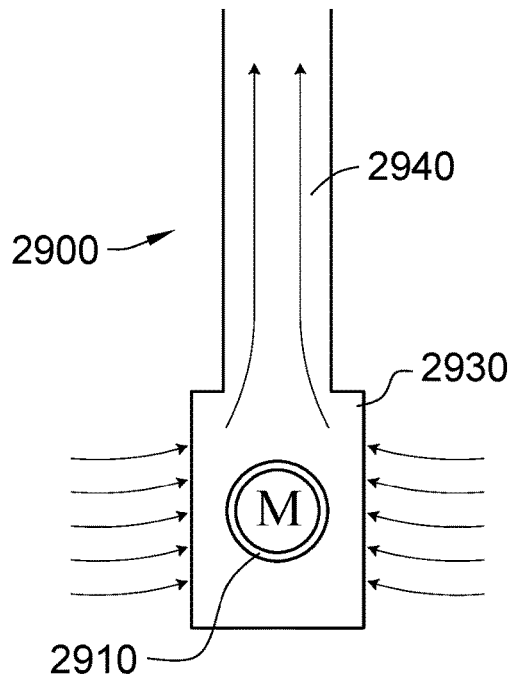
FIGS. 29A-D show various configurations for motors in the context of devices of the current disclosure.
Figure 29B:
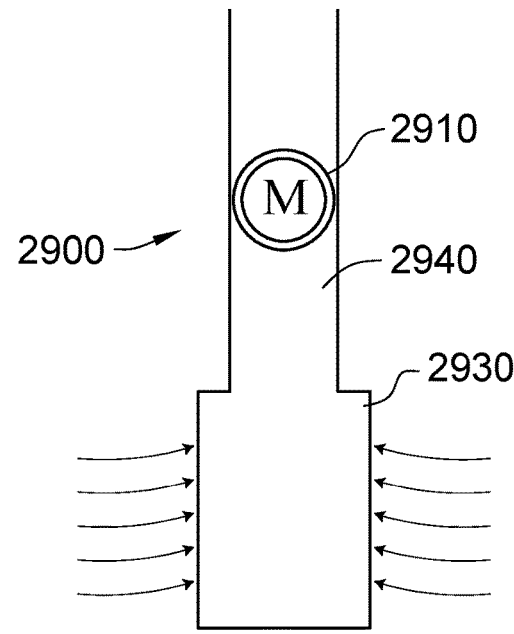
Figure 29C:
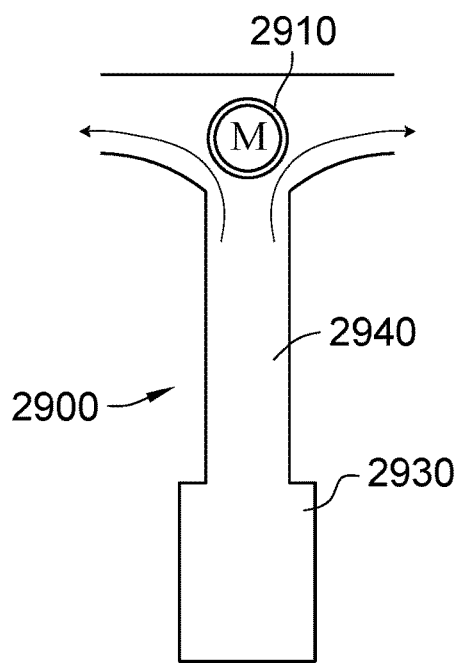
Figure 29D:
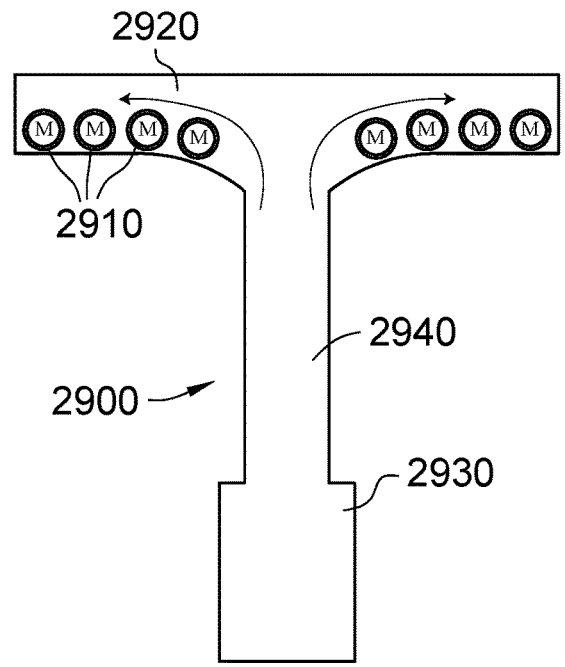

FIGS. 29A-D show various configurations for motors 2910 in the context of devices 2900 of the current disclosure. As shown, motors may be integrated into the air flow outlet 2920, namely the diffusor, the air flow inlet 2930, namely the collector, or the air flow conduit 2940 or elsewhere in the ducting. Similarly, combinations are contemplated, as well as distributed grids of motors 2910 as shown in FIG. 29D.

Figure 30A:
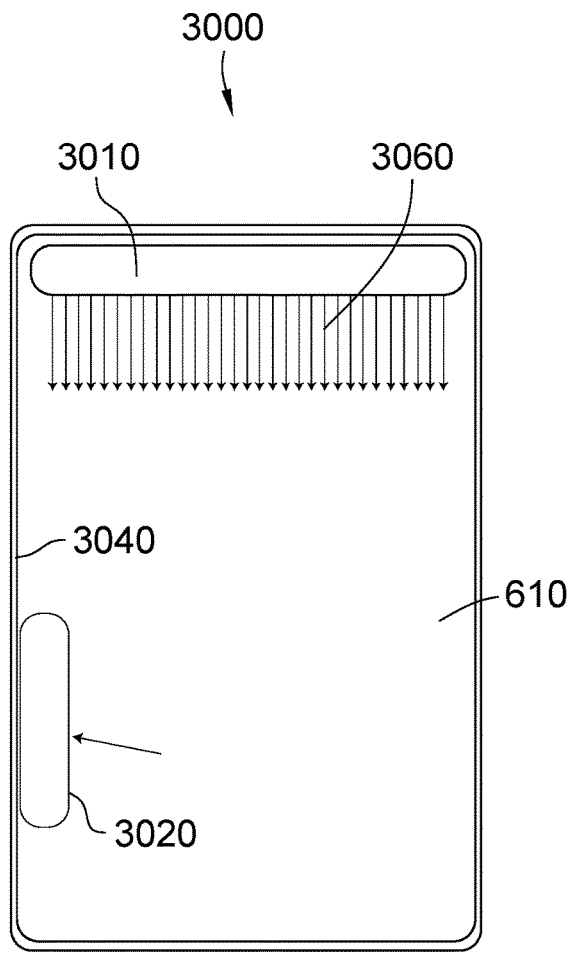
FIGS. 30A and 30B show alternative embodiments of systems and devices for controlling airflow in accordance with the current disclosure.
Figure 30B:
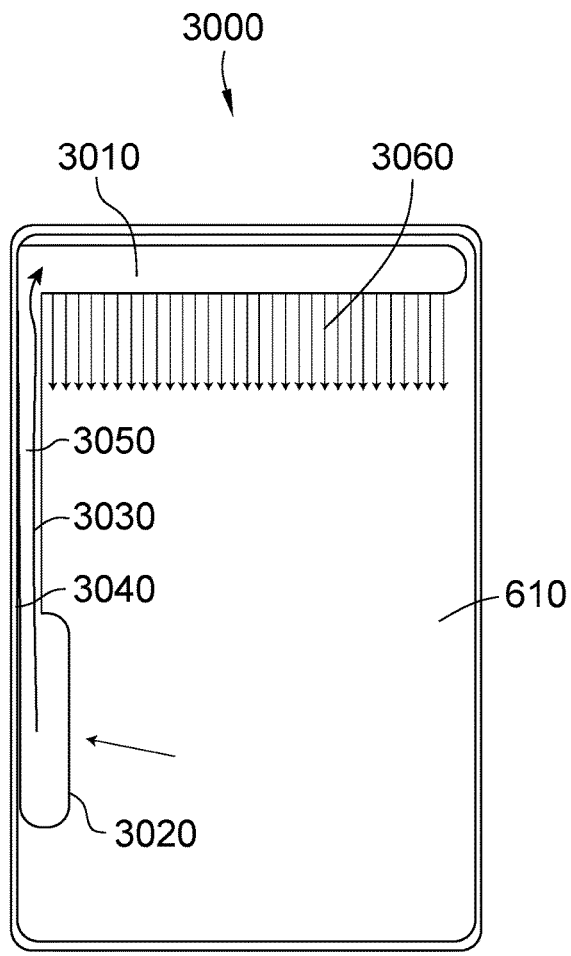

FIGS. 30A and 30B show alternative embodiments of systems 3000 and devices for controlling airflow in accordance with the current disclosure. As shown, the system 3000 may function in a closed space functioning as the defined space 610. As such, an air flow outlet 3010 may be provided adjacent to or within the defined space 610, an air flow inlet 3020 may be provided adjacent to or within the defined space, and a conduit 3030 may be provided for transporting air from the air flow inlet to the air flow outlet.

While the air flow conduit 3030 is not shown in FIG. 30A, it may be provided in any manner discussed above, such as within a wall 3040 of the defined space 610, or within a slender return 3050 located adjacent the wall 3040 of the defined space. An air treatment module, such as those discussed above, may be provided within or adjacent the conduit for extracting air-borne contaminants from air transported from the air flow inlet 3020 to the air flow outlet 3010.

As discussed above, the air flow outlet 3010 may then deposit air flow 3060 into the defined space 610 substantially evenly across an outlet area. The defined space 610 may, as shown, be an enclosed area, such as a closed room. Such an enclosed room can be a standard room, or it may be, for example, an elevator, or a cabin or compartment of a vehicle.

In some embodiments, there is an option for balance ventilation in part to substitute for some of the recirculation. An example embodiment with a closed section may have an entrance in possible form of a door, a flexible member, or other physical barrier.

Figure 31:
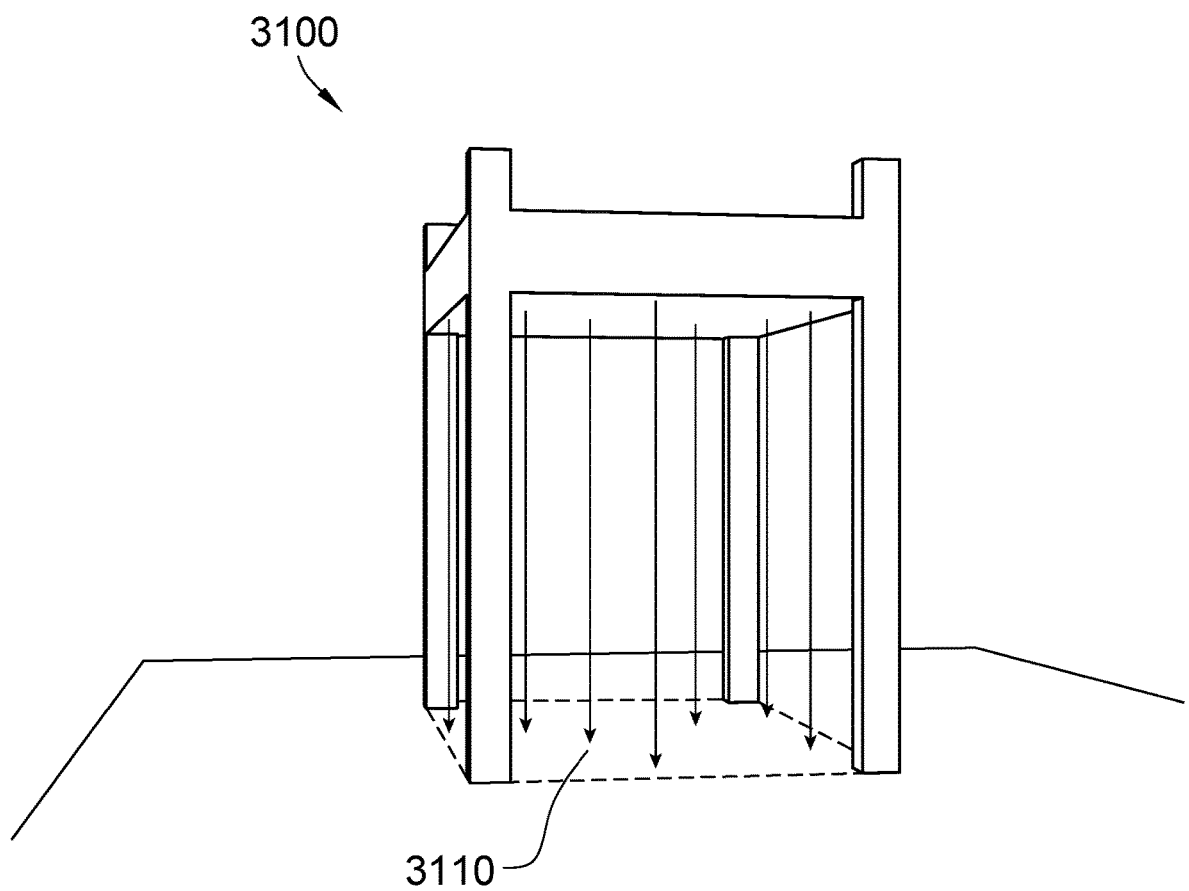
FIG. 31 shows an alternative embodiment of systems and devices for controlling airflow in accordance with the current disclosure.

FIG. 31 shows an alternative embodiment of systems 3100 and devices for controlling airflow in accordance with the current disclosure. As shown, the system 3100 has a dedicated floor section 3110 for the collector flow. Not depicted, by bleeding away some of the air at the top of the diffusor (to the sides, or top), one can tune the amount of capture by the collector to ensure that air exhaled by subjects under the device is captured. This can be tested per room scenario and adjusted based on placement of for example furniture, bars other objects, or dynamic based on timing, occupancy and the like.

Figure 32:
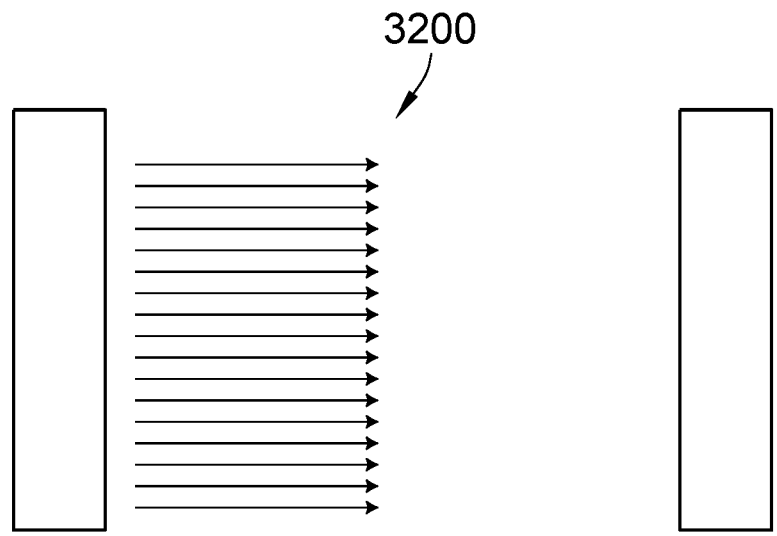
FIG. 32 shows an alternative embodiment of systems and devices for controlling airflow in accordance with the current disclosure.

FIG. 32 shows an alternative embodiment of systems 3200 and devices for controlling airflow in accordance with the current disclosure. As shown, the system may be provided as a cross-draft system, instead of for vertical flow.

Figure 33:
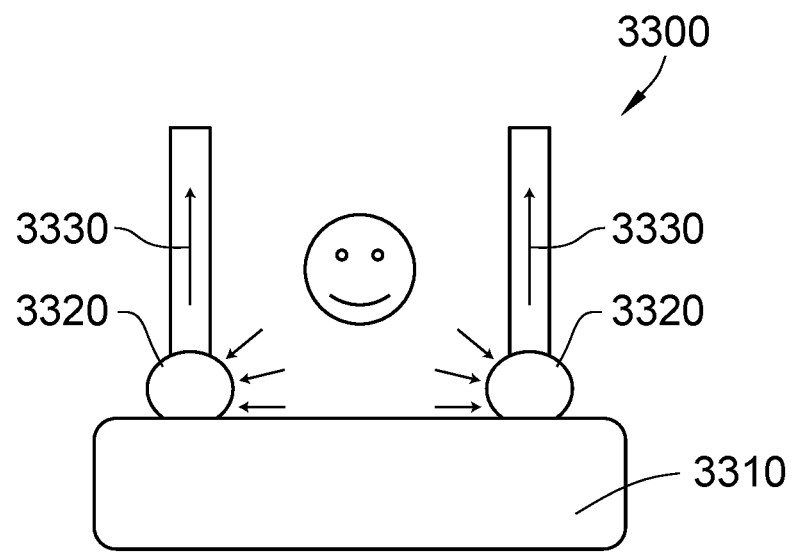
FIG. 33 shows an alternative embodiment of systems and devices for controlling airflow in accordance with the current disclosure.

FIG. 33 shows an alternative embodiment of systems 3300 and devices for controlling airflow in accordance with the current disclosure. As shown, the system 3300 may be integrated into a tabletop 3310 or a bar, countertop, or cashier, or other elongated section, with potential physical barriers between people. In such embodiments, multiple air flow inlets 3320 may be located at intervals, with each air flow inlet having an associated air flow conduit 3330. Similarly, the air flow inlets 3310 may be specifically located near a working area.

Figure 34A:
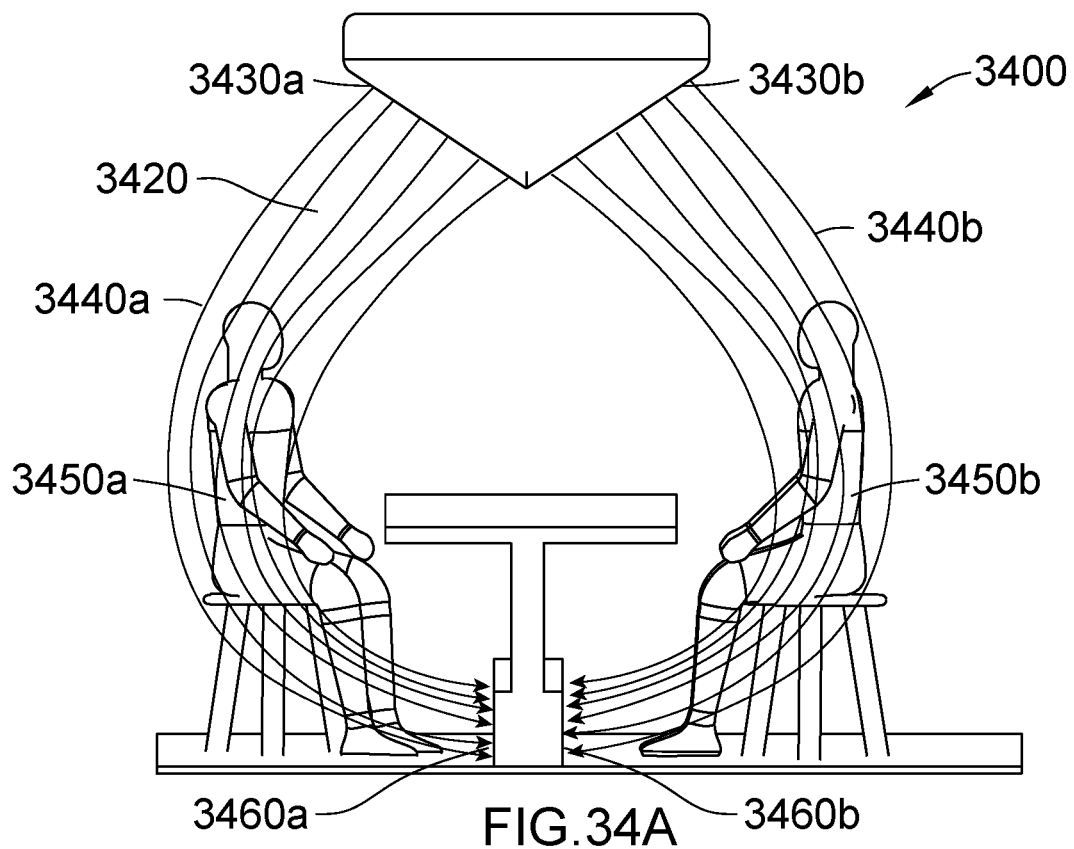
FIGS. 34A and 34B show alternative embodiments of systems and devices for use in generating and controlling air flow in accordance with the current disclosure.
Figure 34B:
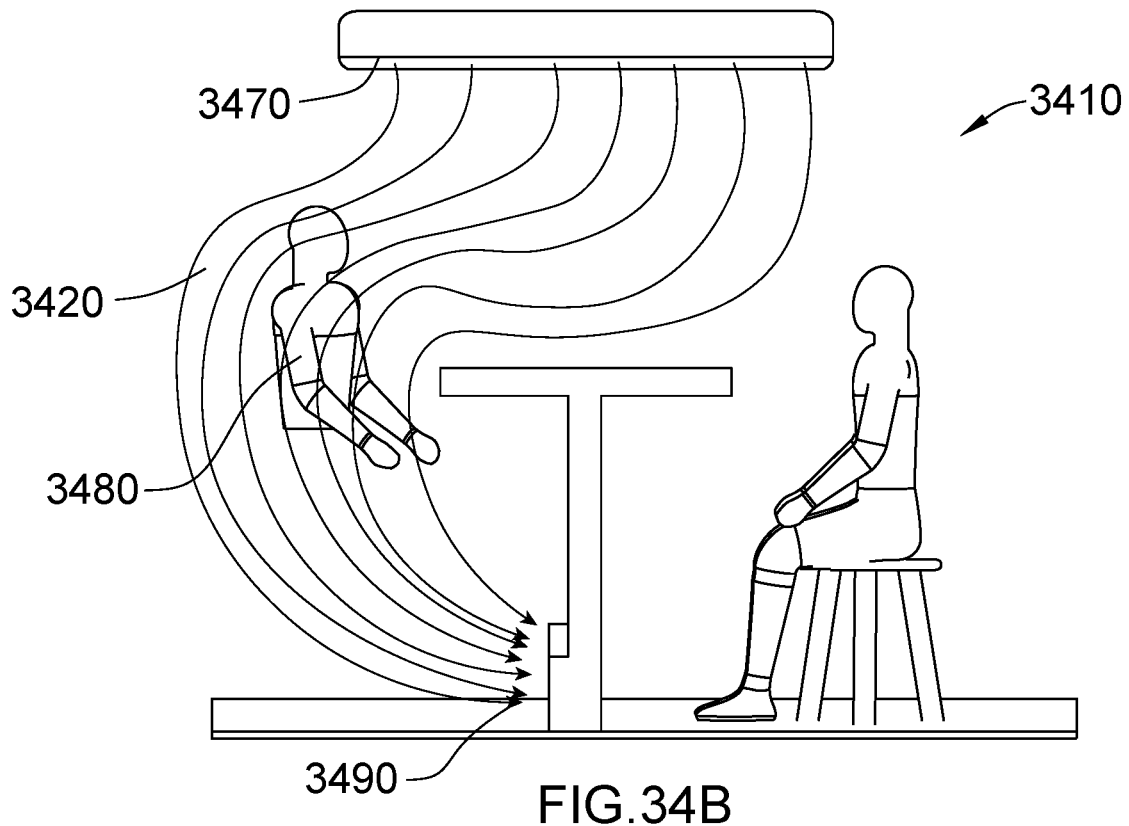

FIGS. 34A and 34B show alternative embodiments of systems and devices 3400, 3410 for use in generating and controlling air flow 3420 in accordance with the current disclosure. As shown, the device 3400 of FIG. 34A comprises distinct air flow outlets 3430a, b directed in different directions, so as to generate two distinct air flow paths 3440a, b, each passing by different people 3450a, b, and terminating at distinct air flow inlets 3460a, b.

FIG. 34B provides a device 3410 having a single air flow outlet 3470 following a single air flow route 3420 past a single person 3480 and terminating at a single air flow inlet 3490.

Figure 35:
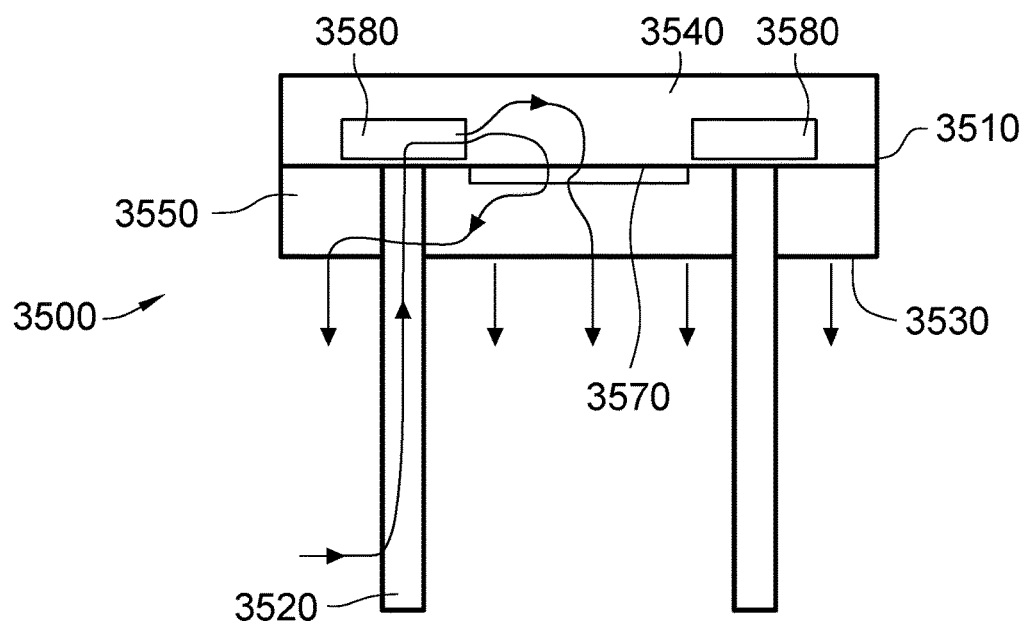
FIG. 35 shows an alternative embodiment of systems and devices for controlling airflow in accordance with the current disclosure.

FIG. 35 shows an alternative embodiment of systems and devices 3500 for controlling air flow in accordance with the current disclosure. The device 3500 provides a double top section 3510, acting as gathering for circulating flow from collector 3520, through a diffusor 3530. Possible embodiments envisions a double (or more) volume top section, with one level 3540 acting as the gathering of the flow from the collectors, and the second level 3550 (below typically, but not necessarily) as the diffusor and air flow outlet 3530. Air treatment 3570 and/or motors 3580 can be placed in such sections or between such sections 3540, 3550.

Figure 36A:
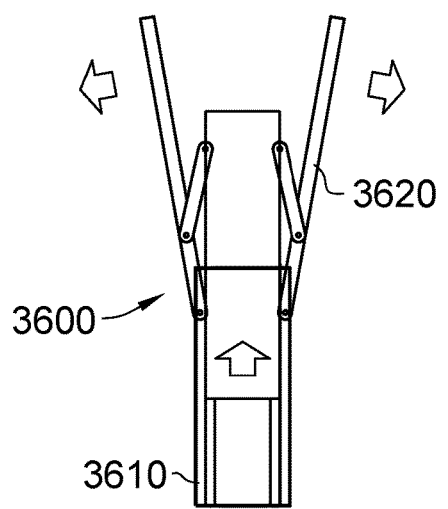
FIGS. 36A-36B show alternative embodiment of systems and devices for controlling airflow in accordance with the current disclosure.
Figure 36B:
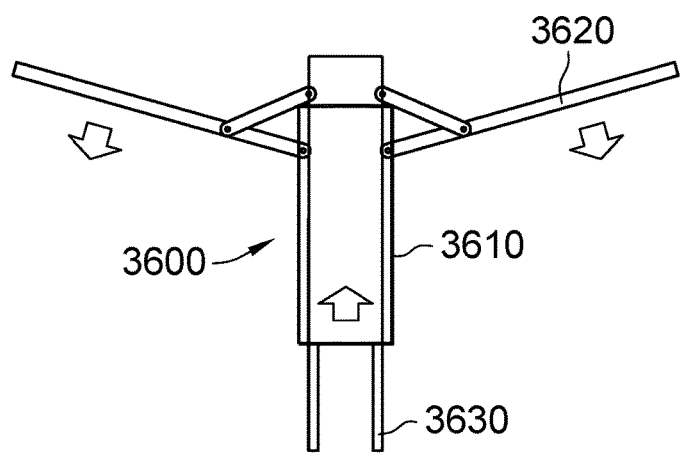

FIGS. 36A-36B show alternative embodiment of systems and devices 3600 for controlling airflow in accordance with the current disclosure. The embodiments shown are provided with a foldable structure. In this example, a sliding element 3610 is connected to a rod system 3620 that can act as the diffusor structure when extended. Possibly, the sliding element 3610 protects the collector, or air flow inlet, 3630 in folded mode.

Some embodiments can be envisioned having data handling means. This can include up-time, flow features, indications of working principle for example filter lifetime. It can also include data logger specifically for detecting specific viruses or other contaminants. One example of this could syphon off a smaller amount of air to an analyzer unit. A wireless or wired connection to can be used to store and/or access and/or the data. This could be over the internet.

In some embodiments, flow is provided below the draft limit, for example a local flow below 0.5 m/s where a subject does possibly not feel the flow.

In some embodiments, a height to diameter ratio for the collector is considered, where possibly an area rule is used to optimize the intake.

In some embodiments, a device like this can also clean and treat air not in the direct path by entrainment and or modifying the existing air flows. It can be placed in combination with current HVAC and fan. Can have own cooling, heating, humidifying, scenting, etc.

In some embodiments, a device can be provided with adjustable height to location and occasion.

In some embodiments, the device described can be integrated into a central pillar design in room. The pillar and diffusors can take a variety of shapes, such as octagon, round, square shaped, triangular pillars etc.

In some embodiments, air pushers, not depicted cross flow blowers, large axial fans in diffusor may be used. Fan placement may be optimized for insulation of acoustics.

For materials: to design a certain target resistance, optimizing pressure drop in flow transparency, tuned to flow and redistribution. This could be achieved for example by sizing and spacing of holes or openings, and/or amount of layers used Not depicted, multiple drivers distributed.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An apparatus for preventing spread of air-borne contaminants in a defined space comprising;
    an air flow outlet adjacent to or within the defined space;
    a plurality of air flow inlets adjacent to or within the defined space;
    a plurality of conduits for transporting air from the plurality of air flow inlets air to the air flow outlet; and
    an air treatment module within or adjacent the plurality of conduits for extracting the air-borne contaminants from the air transported from the plurality of air flow inlets to the air flow outlet;
    wherein each conduit of the plurality of conduits transports air from a corresponding air flow inlet of the plurality of air flow inlets to the air flow outlet,
    wherein the air flow outlet deposits air into the defined space substantially evenly across an outlet area.

2. The apparatus of claim 1, wherein the air flow outlet and the plurality of air flow inlets are on or at opposite sides of the defined space, such that the air flow outlet deposits the air into the space from a first side and the plurality of air flow inlets retrieve the air from the defined space from a second side, and
    wherein the plurality of conduits transports the air from the second side to the first side.

3. The apparatus of claim 2 wherein the air flow outlet comprises a diffusor or plenum for evenly distributing the deposit of the air across the outlet area.

4. The apparatus of claim 3 wherein the first side is a top of the defined space and the second side is a bottom of the defined space.

5. The apparatus of claim 4 wherein the diffusor or plenum forms an at least partial ceiling for the defined space.

6. The apparatus of claim 5 wherein the partial ceiling is angled towards adjacent sides of the defined space, such that at least a portion of the air is deposited in a lateral direction and such that the defined space includes space not below the partial ceiling.

7. The apparatus of claim 4 wherein the plurality of conduits pass through the defined space, forming a plurality of pillars supporting the air flow outlet.

8. The apparatus of claim 4 wherein the second side is a tabletop or other functional surface.

9. The apparatus of claim 3 wherein the plurality of air flow inlets are within the defined space and adjacent the second side.

10. The apparatus of claim 1, wherein the air flow outlet and the plurality of air flow inlets are on or at a single side of the defined space, and wherein the air deposited by the air flow outlet follows a circuitous path from the plurality of air flow inlets to the air flow outlet.

11. The apparatus of claim 10 wherein the air flow outlet and the plurality of air flow inlets are on or in a wall defining the single side of the defined space, and wherein the plurality of conduits are within the wall or within a slender return adjacent the wall.

12. The apparatus of claim 1 wherein the defined space takes the form of a substantially parallelepiped shape, and wherein the plurality of air flow inlets are at lower corners of the shape and facing inward, and wherein each of the plurality of conduits extend vertically along a corner of the shape.

13. The apparatus of claim 1 wherein the defined space is an enclosed space, and wherein the plurality of conduits are within a wall or adjacent the wall of the enclosed space.

14. The apparatus of claim 1 wherein the air flow outlet comprises an inflatable plenum, and wherein the plenum is inflated with air drawn from the plurality of conduits, and wherein a side of the plenum facing the defined space is at least partially permeable.

15. The apparatus of claim 1 wherein the air flow outlet deposits air into the defined space at a flow velocity of less than 0.5 m/s on average.

16. The apparatus of claim 1, further comprising an edge extension for extending or isolating an edge of the defined space.

17. An apparatus for preventing spread of air-borne contaminants in a defined space comprising;
    an air flow outlet adjacent to or within the defined space;
    a plurality of air flow inlets adjacent to or within the defined space;
    a plurality of conduits for transporting air from the plurality of air flow inlets the air flow outlet; and
    an air treatment module within or adjacent the conduit for extracting the air-borne contaminants from the air transported from the air flow inlet to the air flow outlet;
    wherein each conduit of the plurality of conduits transports air from a corresponding air flow inlet of the plurality of air flow inlets to the air flow outlet,
    wherein the plurality of air flow inlets generate a suction force for drawing at least a portion of an air flow deposited into the defined space by the air flow outlet.

18. The apparatus of claim 17 wherein the air flow outlet and the plurality of air flow inlets are on or at opposite sides of the defined space, such that the air flow outlet deposits air flow into the defined space from a first side and the plurality of air flow inlets retrieve air from the defined space from a second side, and wherein the plurality of conduits transport conduit transports the air from the second side to the first side.

19. The apparatus of claim 18 wherein the air flow outlet comprises a jet having a horizontal directional component and is located adjacent a top of the defined space, and wherein the plurality of air flow inlets draw the air flow from the jet downwards through the defined space.

20. The apparatus of claim 19 wherein the apparatus is located at a central location within the defined space, and wherein the air flow outlet distributes the jet in a plurality of directions.

21. The apparatus of claim 19 wherein the air flow outlet is positioned such that during use the horizontal directional component of the jet is above heads of people located within the defined space, and such that during use the plurality of air flow inlets are below the heads of the people located within the defined space.

22. The apparatus of claim 17 wherein the apparatus is located adjacent a first side of the defined space, and wherein the air flow outlet comprises a jet having a horizontal directional component and is located adjacent a top of the defined space at the first side, the horizontal directional component being in a first direction away from the first side of the defined space towards a center of the defined space, and wherein the plurality of air flow inlets are adjacent a bottom of the defined space at the first side and draw the air flow from the jet downwards through the defined space.

* * * * *